(12) United States Patent
Friedman et al.

(10) Patent No.: US 7,484,245 B1
(45) Date of Patent: Jan. 27, 2009

(54) SYSTEM AND METHOD FOR PROVIDING DATA SECURITY

(75) Inventors: George Friedman, Austin, TX (US);
Robert Phillip Starek, Austin, TX (US);
Carlos A. Murdock, Austin, TX (US)

(73) Assignee: GigaTrust, Herndon, VA (US)

( * ) Notice: Subject to any disclaimer, the term of this patent is extended or adjusted under 35 U.S.C. 154(b) by 1390 days.

(21) Appl. No.: 09/701,157

(22) PCT Filed: Sep. 29, 2000

(86) PCT No.: PCT/US00/26882

§ 371 (c)(1),
(2), (4) Date: Nov. 22, 2000

(87) PCT Pub. No.: WO01/25870

PCT Pub. Date: Apr. 12, 2001

(51) Int. Cl.
*G06F 21/00* (2006.01)
(52) U.S. Cl. .................. 726/27; 726/28; 380/283; 713/165; 713/167; 705/51; 705/57
(58) Field of Classification Search ............... 380/283; 705/51, 56–58; 713/165, 171, 167; 726/27, 726/28
See application file for complete search history.

(56) References Cited

U.S. PATENT DOCUMENTS

| | | | | |
|---|---|---|---|---|
| 5,283,828 | A | 2/1994 | Saunders et al. | 380/4 |
| 5,444,780 | A | 8/1995 | Hartman, Jr. | 380/30 |
| 5,559,883 | A | 9/1996 | Williams | 380/4 |
| 5,559,960 | A * | 9/1996 | Lettvin | 726/24 |
| 5,848,158 | A | 12/1998 | Saito et al. | 380/21 |
| 5,910,987 | A | 6/1999 | Ginter et al. | 380/24 |
| 5,933,498 | A * | 8/1999 | Schneck et al. | 705/54 |
| 6,055,236 | A | 4/2000 | Nessett et al. | 370/389 |
| 6,163,859 | A * | 12/2000 | Lee et al. | 714/38 |
| 7,092,908 | B2 * | 8/2006 | Schull | 705/51 |

OTHER PUBLICATIONS

International Search Report in connection with corresponding PCT application (PCT/US00/26882) mailed on Apr. 10, 2001.

* cited by examiner

*Primary Examiner*—Matthew Smithers
*Assistant Examiner*—Paul Callahan
(74) *Attorney, Agent, or Firm*—DLA Piper LLP (US)

(57) ABSTRACT

A system and method protects security of data. The data is packaged together with one or more permissions that designate what actions are allowed with respect to the data. The package can be opened when there is approval for doing so and the allowed permissions are maintained. The data is stored within a vault and there are a number of available security procedures that prevent the unauthorized access of the data.

137 Claims, 33 Drawing Sheets

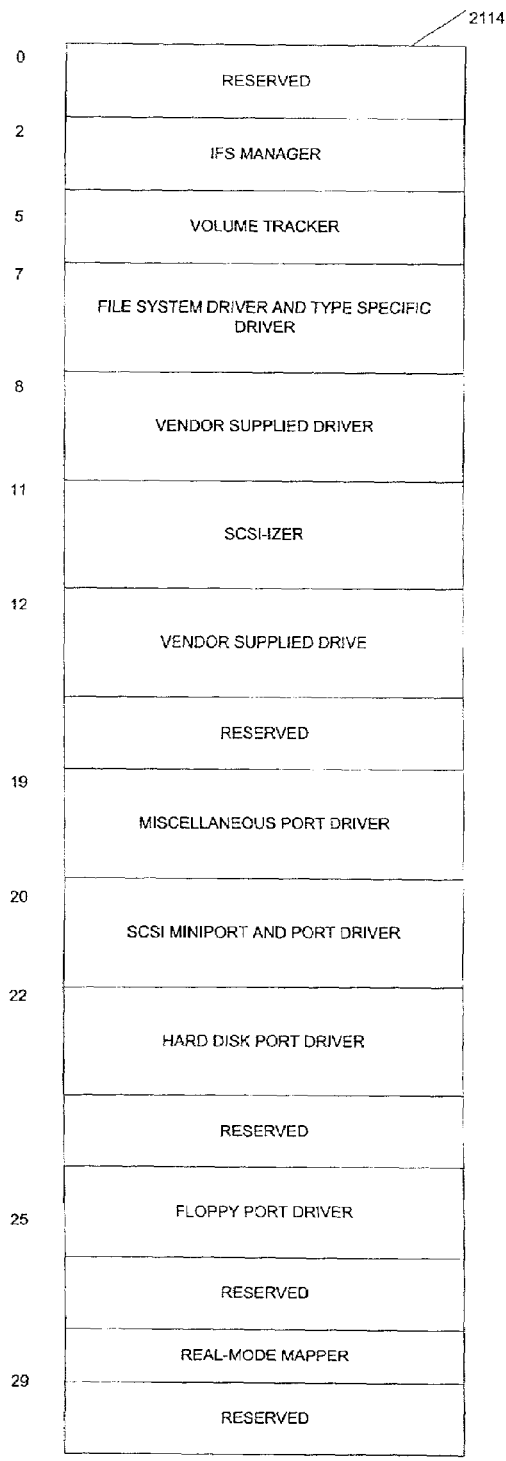
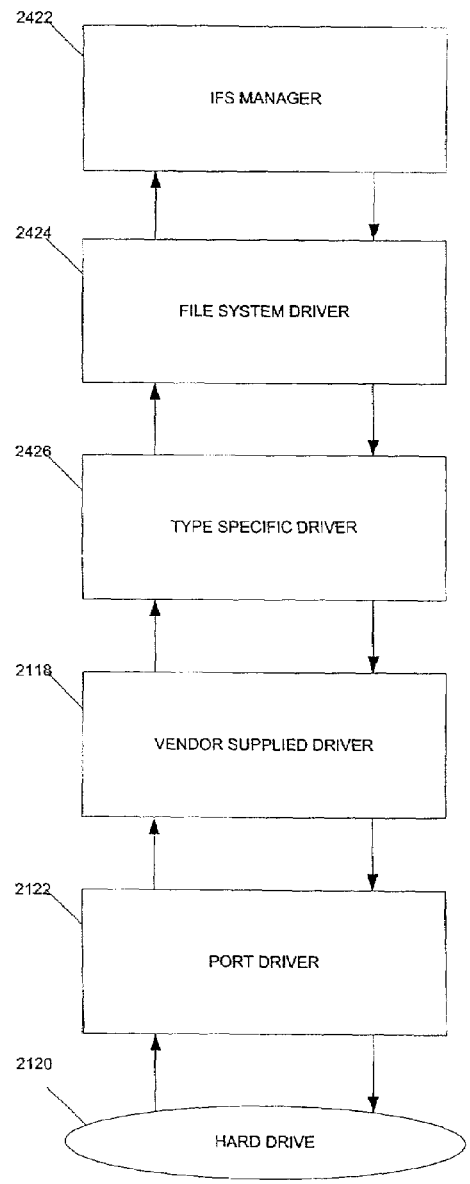
FIG. 24
FIG. 25

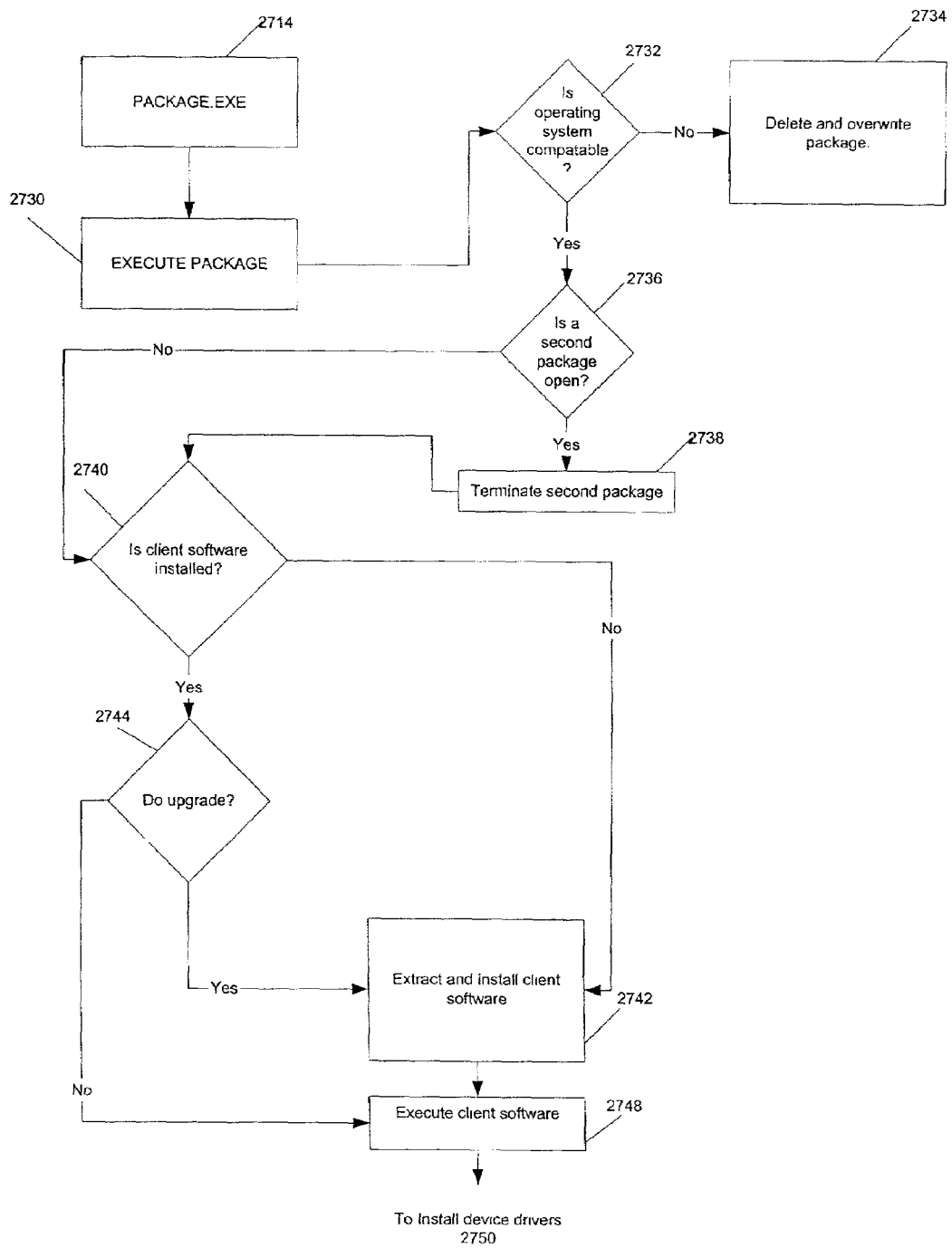
FIG.
28a

SYSTEM AND METHOD FOR PROVIDING DATA SECURITY

BACKGROUND OF THE INVENTION

1. Field of the Invention

This invention is directed to the protection of data stored in a computer and in particular data which has been imported from an outside source.

2. Brief Description of the Prior Art

Data can be loaded onto a computer from several sources including electronic transmission such as Internet and Intranet transmission, downloading from CD-ROM, floppy disk or other input/output devices. Once these files have been downloaded, there has been no way for the sender or creator of the file to retain control of the information. This has become extremely important as more confidential documents and materials including propriety content are being transmitted in this manner.

The present invention has been developed in view of the foregoing and to overcome the deficiencies of the prior art.

SUMMARY OF THE INVENTION

This invention provides a system and method for data security, such as for preventing subsequent transmissions of the file or unauthorized opening of the file.

BRIEF DESCRIPTION OF THE DRAWINGS

FIG. 24 is a diagram of the file system logical layers of the WINDOWS 95 operating system;

FIG. 25 is a diagram of a typical file system request chain within the file system logical layers of the WINDOWS 95 operating system.

FIGS. 28A-28B is a flow diagram of a method for communicating an electronic package according to another embodiment of the invention.

DETAILED DESCRIPTION OF THE INVENTION

Figure 1:
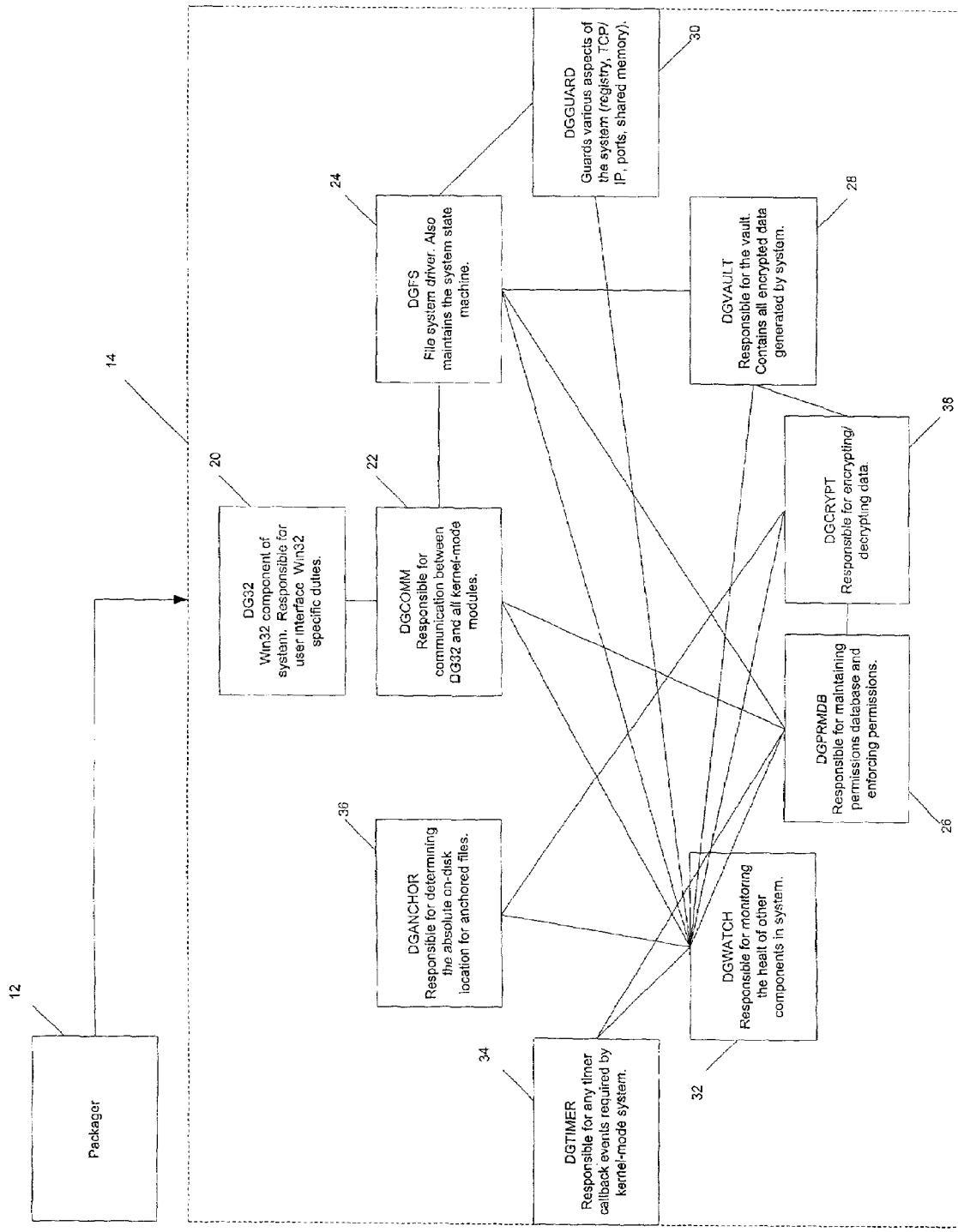
FIG. 1 is a block diagram illustrating one embodiment of a system and method for data security.

Referring now to the drawings in detail, wherein like reference numeral correspond to like elements throughout the several views, there is illustrated in FIG. 1 an embodiment of a system and method for data security comprising a data security system 10. In the present embodiment, the data security system 10 as illustrated preferably comprises a packager 12 and a client or a receiver 14. As will be described in detail herein, the packager 12 in the present embodiment operates to create secure data content and the receiver 14 operates to regulate use of the secure data. In a preferred embodiment, the packager 10 and receiver 14 operate in combination over a computer network to both create and maintain data security. Although not shown, in other embodiments, the packager 10 and receiver 14 can be utilized independent of one another where desired. The terms "computer", "computer system", or "system" as used herein should be broadly construed to include any device capable of receiving, transmitting and/or using information including, without limitation, a processor, microprocessor or similar device, a personal computer, such as a laptop, palm PC, desktop or workstation, a network server, a mainframe, an electronic wired or wireless device, such as for example, a telephone, an interactive television, such as for example, a television adapted to be connected to the Internet or an electronic device adapted for use with a television, a cellular telephone, a personal digital assistant, an electronic pager, and a digital watch. In an illustrative example, information is transmitted in the form of e-mail. Further, a computer, computer system, or system of the invention may operate in communication with other systems over a network, such as, for example, the Internet, an intranet, or an extranet, or may operate as a stand-alone system.

The packager 10 in this embodiment preferably operates by creating an executable that can securely deliver data to a recipient. The receiver 14 preferably comprises one or more device drivers and an application programming interface, such as a Win32 process in this embodiment, that regulates use of the secure data. As will be described in detail herein, there are nine device drivers comprised of kernel-mode modules in this embodiment as a part of the receiver 14. The terms "data" or "information" as is used herein are interchangeable and should be broadly construed to cover any type of information, data or other content, such as text, graphics, audio, video or any combination, as examples, and in any desired format, such as in any suitable computer file format.

When a sender of the protected information wishes to send a package of proprietary or sensitive data to an outside source, in general, a file to be packaged is selected in response to on screen prompts. The permission rule sets for operating on that package of data are then selected. These permission rule sets can be any of a variety of different types, for example, the particular operation to be performed (such as prohibiting copying), the number of copies allowed (such as 2) or the time limit for possession (such as 1 hour). These can be basic permission rules or customized. The Package is then constructed by creating an executable bundle having data and rules therein. A preferred embodiment of a packager 12 in accordance with the present embodiment will be described herein.

When the end user receives the data from the packager 12, the end user opens the file and a sensor program in the executable package preferably checks to verify whether the receiver 14 is running, and then upon confirmation, signals the receiver 14 that it should process the package. In this embodiment, the sensor program searches for a driver capable of reading the executable package. The receiver 14 comprises in the present embodiment at least one device driver and preferably nine device drivers, which will be described in more detail below. In other embodiments not shown, a greater or fewer number of device drives and/or different types of device drivers can be utilized where desired. For purposes of this illustration, the following will initially describe the functional aspects of the nine device drivers in this embodiment with respect to a single device driver, since the number of device drivers can vary. In general, in this embodiment the security of the file to be downloaded is maintained by the receiver 14 through use of a protective driver and associated vault in which secured data files are contained. All data files which are to be protected are preferably stored within the vault. In effect, the vault is a depository of the protected files. If the driver cannot be found, the package informs the user that a driver is needed, and/or overwrites itself thereby destroying itself or provides some other desired option. If the driver is found, then the driver parses the rules from the data stored in the vault, creates a "tag" file for use by the computer and overwrites (shreds) the executable file which existed outside of the vault to remove all traces of the executable file and data. In this embodiment, the driver creates the tag file which the driver maps to the actual file using a virtual table stored in the vault to act as a place holder for the computer processes.

In the present embodiment, the vault is space on the hard drive and contains the files to be protected as well as internal security, such as Vault Control Block, File Control Block, Vault Allocation Table and Vault Data Block, which will described below. In this embodiment, the files contained within the vault include the computer name for the file, a driver generated or data-creator generated name for the file and the actual data file itself. The Vault Allocation Table acts as a linking table addressable by the driver to link the computer name to the name assigned to the file and stored within the vault. Furthermore, the data within the vault in this embodiment is preferably encrypted and/or may be compressed, padded and then interlaced to provide further security. The vault is also preferably protected by various levels of external protection as well, as will be discussed in detail below.

The driver is a vault specific driver which when downloaded places itself between the computer user and the vault. The vault and the driver are loaded onto the hard drive. The driver monitors low level calls in the computer and operates on the files in the vault using the virtual table and inputs from the computer user to protect the file system regardless of the contents. The driver loads on the boot up of the computer. The driver knows its own location and that of the vault and assigns itself and the vault new tag names which are utilized by the Computer operating system user. Because the computer operates on these tag (false) names and does not know the true file name or location of the drive when residing on the hard drive of the computer, the existence and location of the driver and vault are invisible or "cloaked" to the user of the system. Because they are invisible, they are non-addressable after boot by the user of the computer. In effect, the driver monitors low level call instructions addressed to files in the computer. When the file corresponds to the tag of a vault stored file, or the driver itself, the driver preferably intercepts that instruction so as to block access to specified files from the user.

The driver is on a hard drive and boots into memory. The driver forces the computer to boot the cloaked driver first so that it is the first driver up and also causes the computer to close the cloaked driver last. Because it initializes first or boots up first, the driver is always working and therefore is always able to cloak both the driver and the vault and the elements within the vault. In this way, the elements are always protected and ready for operation.

Because the driver is first, it can always cloak what is required to be cloaked. This is a first level of defense which makes it difficult to locate the files to be hacked within the system. If the cloaked driver is not hooked first, then this is a very good indication that an unauthorized user is trying to hack or break into the driver or sensitive data contained in the vault files. The cloaked driver working with the data is the first to boot. As the computer boots, it is hooked into the file system. The hooks are identifiable and the driver senses the hook and counts them. If the driver senses that it is not the first hook, then the driver preferably attempts to hook over the existing hook. In other embodiments, the system can be arranged so that the driver destroys itself and the vault by repeatedly overwriting the portions of the hard drive where it is situated. In this way, the data cannot be tampered with.

During operation, the driver creates tag or place holders for the actual operating system of the computer. The tags are also the entries into the driver which translates the tag names to the actual name. The driver intercepts the low level call for the operating system to determine whether or not the process is to be performed on a file within the vault. If the process is to be performed on the file within the vault, then the driver compares the function and the actual file name to a permission table in the Vault Allocation Table to determine whether or not that process can be performed on the identified file. If permission is denied, then the driver can either return a message through the WIN 32 layer that the file cannot be found, or that an illegal command has been performed and prevent processing, or can destroy itself by overwriting. If permission is permitted, then the driver goes to the table for the vault address of the particular file. The driver uses the address and the encryption's compression and padding information in the Vault Allocation Table to pull the file from the vault and operated on it as instructed. The Vault Control Block monitors how the file is used to determine whether it is in compliance with rule sets regarding the number of times or duration of use permitted for a file.

It may be possible for a hacker to enter the system before booting and locate the vault and therefore, layers of protection are provided to prevent unauthorized copying, movement, transmission or manipulation of the file or driver. Accordingly, mutually independent and layered protection mechanisms are incorporated in the driver and the vault.

A first mechanism is to anchor the vault, driver and/or the permissions database to the authorized computer. The anchor points for these items are preferably determined the first time the system is run. The anchor points are defined as the addresses at which the starting clusters of the vault, driver or the permissions database reside. The various anchors are preferably combined in this embodiment and used as a key for encryption/decryption. If the key does not subsequently "work" in this embodiment, then that is an indication that one or more of the files has been moved or modified. Therefore, prior to operating, the system will check to see whether the driver, the vault and/or the permissions database has been moved. If so, in this embodiment it will instruct the driver to overwrite itself and the vault because this would have been an indication of tampering or movement. The starting point of a stored file or driver on a hard drive of the computer will ordinarily be a function of the computer make, computer model, and amount of data and files previously stored in the computer hard drive. Therefore, this is the equivalent of a random generator recognition code. If the driver or vault is booted and it does not recognize its own anchor position, it will overwrite itself. Furthermore, if it does not recognize the address of the corresponding element (corresponding driver or vault) it knows that either it or the other has been moved and therefore tampered with and will overwrite themselves.

Additionally, the driver can send a CRC type check sum to the vault. The vault confirms the integrity and identity of the driver utilizing the check sum before allowing operation on a file. If either does not recognize the other, they then will overwrite themselves in effect preventing unauthorized use of the file.

During processing, the computer program operating on the file data within the vault will preferably create data files needed for other software to operate thereupon. One example is for printing. The print files creates intermediate data files within the vault so that "back-channeling" does not occur outside of the vault. As a result, the other software programs which create temporary files for their use in effect work through the driver to perform their operations in the vault.

If the vault and/or driver are somehow to be retransmitted to an unauthorized computer, the invention operates at the port management system level to prevent exiting of any data, as will be discussed in detail below.

One attempt to circumvent such a protection may be to copy a protected file into an overall document which would correspond to files not found in the vault. In effect, using "a clip board" function as known from Microsoft Word®. The driver monitors the low level operating system calls. When a copy command for a vaulted file is monitored by the driver, the driver tells the user, by displaying a message through the WIN 32 layer that either the memory is full, or no memory or illegal operation.

As indicated above, there are preferably nine device drivers in the present embodiment. The nine device drivers in this embodiment are identified in FIG. 1 as DGCOMM 22, which is primarily responsible for communications between the Win 32 process (identified as DG32 20) and the drivers; DGFS 24, which operates as the file system driver; DGPRMDB 26, which is responsible for maintaining the permissions database and enforcing permissions; DGVAULT 28, which is responsible for the vault and contains all encrypted data; DGGUARD 30, which protects access to input/output ports, registry, TCP/IP and shared memory; DGWATCH 32, which regularly checks system integrity; DGTIMER 34, which provides regular timer intervals; DGANCHOR 36, which prevents moving or hacking components and DGCRYPT 38, which provides encrypting/decrypting of data.

DG32 20 is the Win 32 process that acts as command center for the receiver 14. In this embodiment, DG32 20 watches for packages to be executed and prompts the user for the file name to save package pay load; notifies DGFS 24 that a package payload should be absorbed into the vault; presents the end user with dialog when DGFS 24 notifies DG32 20 that an application is attempting to open a secured file; notifies device drivers when applications exit; blocks clipboard access and terminates applications at the reques of the permissions device driver when permissions expire.

DGCOMM 22 handles all the communication between the Win 32 layer and the device driver layer. In this embodiment, DGCOMM 22 preferably provides a single set of device driver input/output control functions that are called from the Win 32 layer to send information to or receive information from the device driver layer and provides functions that are used by other device drivers to signal to the Win 32 layer that it should call a device to retrieve some information from the device driver layer.

DGFS 24 in this embodiment is responsible for maintaining the file system calls that go through the installable file system manager. The DGFS 24 preferably provides the primary functions of enforcing application access to secured files, channels data into and out of the vault, spoofs file sizes for tag files and hides or "cloaks" the secured system files.

DGVAULT in this embodiment is a self-contained file system for storing secured files and temporary files that are created by applications that open DCCRYPT files. Preferably all data in the vault is encrypted and consists of the components including a Vault Control Block, a File Control Block, a Vault Allocation Table and a Vault Data Block.

DGPRMDB 26 in this embodiment contains information about the files in the vault; for example, file permissions including, but not limited to, length of time data file may be open, number of times that a file may be opened, data after which a file may no longer be opened, file printing permissions and clipboard permissions. In addition, the permissions database preferably includes file names used in the vault, package ID of every package ever opened and the system ID.

DGCRYPT 38 in this embodiment provides encryption and decryption services for the system, for example, heavy decryption to get the secured file data from a secured package, light encryption/decryption for data going into or coming out of a vault managed by DGVAULT 28 and light encryption for the permission data base managed by DGPRMDB 26.

DGANCHOR 36 in this embodiment provides another layer of security for the system. For example, in this embodiment DGANCHOR 36 determines a unique identifier (anchor) for each file in the system based upon the physical location of the file and the combination of all anchors used as a key for encryption/decryption.

DGGUARD 30 in this embodiment is responsible for blocking access to various registry entries, for example, serial and parallel port connections, network connections, data drag and drop and forward e-mail connections.

DGWATCH 32 functions as a watchdog for the system. In this embodiment, the DGWATCH 32 polls all of the device drivers in the system at preferably regular intervals to insure system integrity.

DGTIMER 34 in this embodiment provides an internal timer service for the system. In the present embodiment, DGTIMER 34 calls DGWATCH 32 at preferably regular intervals to make sure all of the components are still running properly, calls DGPRMBD 26 at preferably regular intervals so timer and permissions can be updated and calls DGPRMBD 26 at short intervals, such as a few seconds, after set up to do an overall system integrity check. The capabilities of the nine device drivers in the present embodiment and relation between the various device drivers in operation will be described in more detail below.

Another protection mechanism in accordance with the present embodiment is to monitor the system registry. A registry is a hierarchical repository for configuration data. The registry may keep track of all software stored on the computer, and the relationship between programs. The registry may keep track of a plurality of users and hardware configurations. Preferences may vary among the plurality of users.

Each piece of data in the registry has a key-value associated with it. Together the name and value is referred to as a value entry. A key is analogous to a folder and may itself contain one or more folders, which may be referred to as subkeys, and one or more name-value pairs. The key may also be referred to as a name or a handle. To access the data and retrieve the stored value the correct key is needed.

Because the registry is a database, and thus, is a data storage location, it may be exploited for leaking data. "Leaking data" as used herein means transferring data out of a system in which it is desired to have the data secured. A process may write information to the registry, for example, for temporary storage. Another process may then access the information from the registry and write the data to a registry key. Another process may then read the data from the registry key and write it to a disk or other storage device, thereby leaking data. Accordingly, for applications wherein data security is important, there is a need to limit data leakage from the registry.

The following illustrates several embodiments of a method and system for monitoring a registry which may reduce or eliminate data leakage from the registry. The invention secures processes to deny data transfer to non-visual aspects of the system. This includes, for example, restricting writing to a file system, transferring data over communication ports, sharing memory with other processes and writing data to the registry.

An exemplary embodiment of the registry monitoring method comprises requesting a handle for a registry key to a calling process, requesting a registry key value for the handle, and obtaining security clearance to complete the requests by checking secured process lists and rejection lists. Because the ability to add to the registry is blocked, the ability to delete from the registry is also blocked. Therefore, the system includes a method for modifying and deleting keys and values with a security check incorporated therein.

Figure 2:
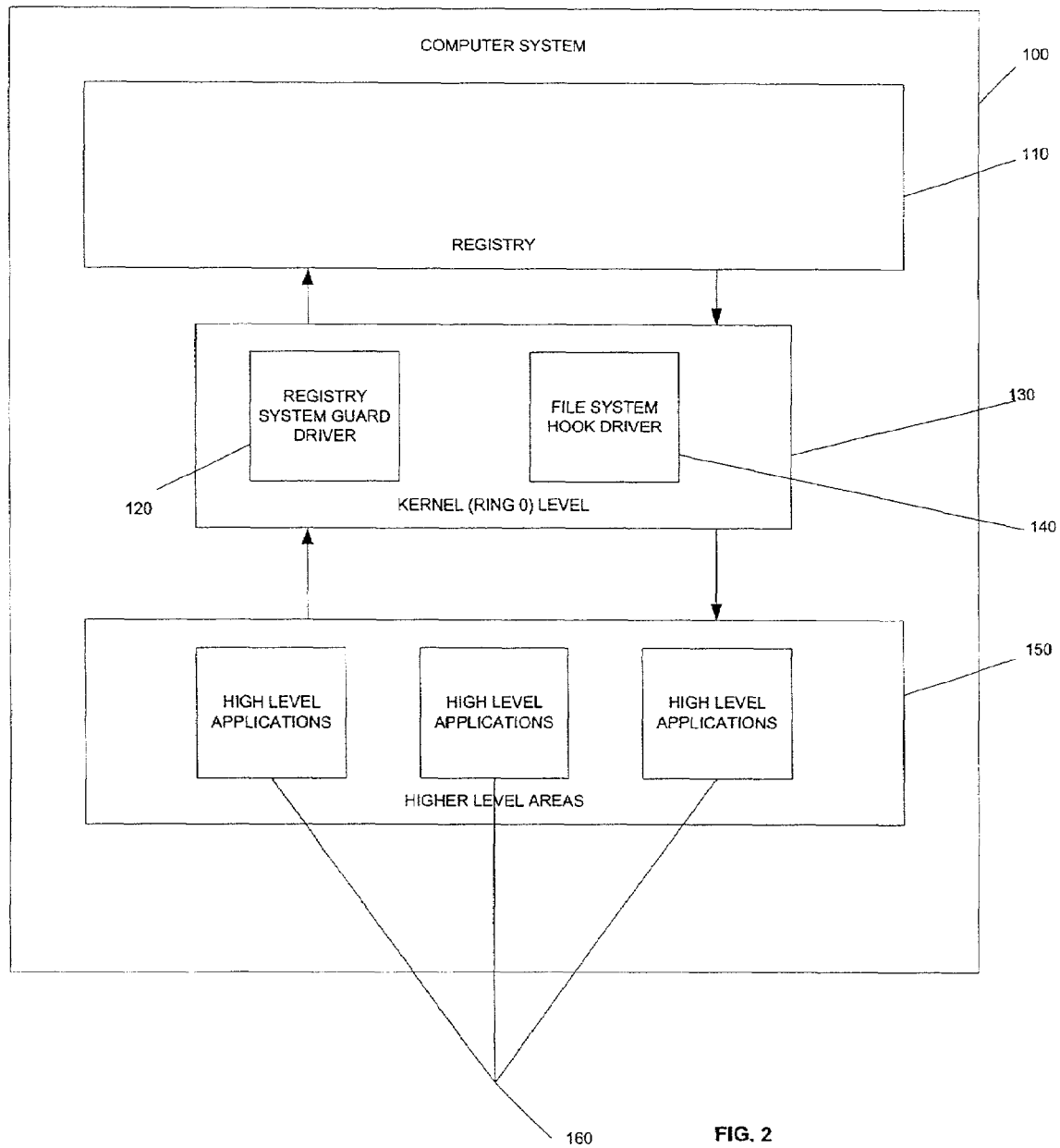
FIG. 2 is a block diagram of a portion of a secured data transmission system according to an illustrative embodiment of the invention.
Figure 3:
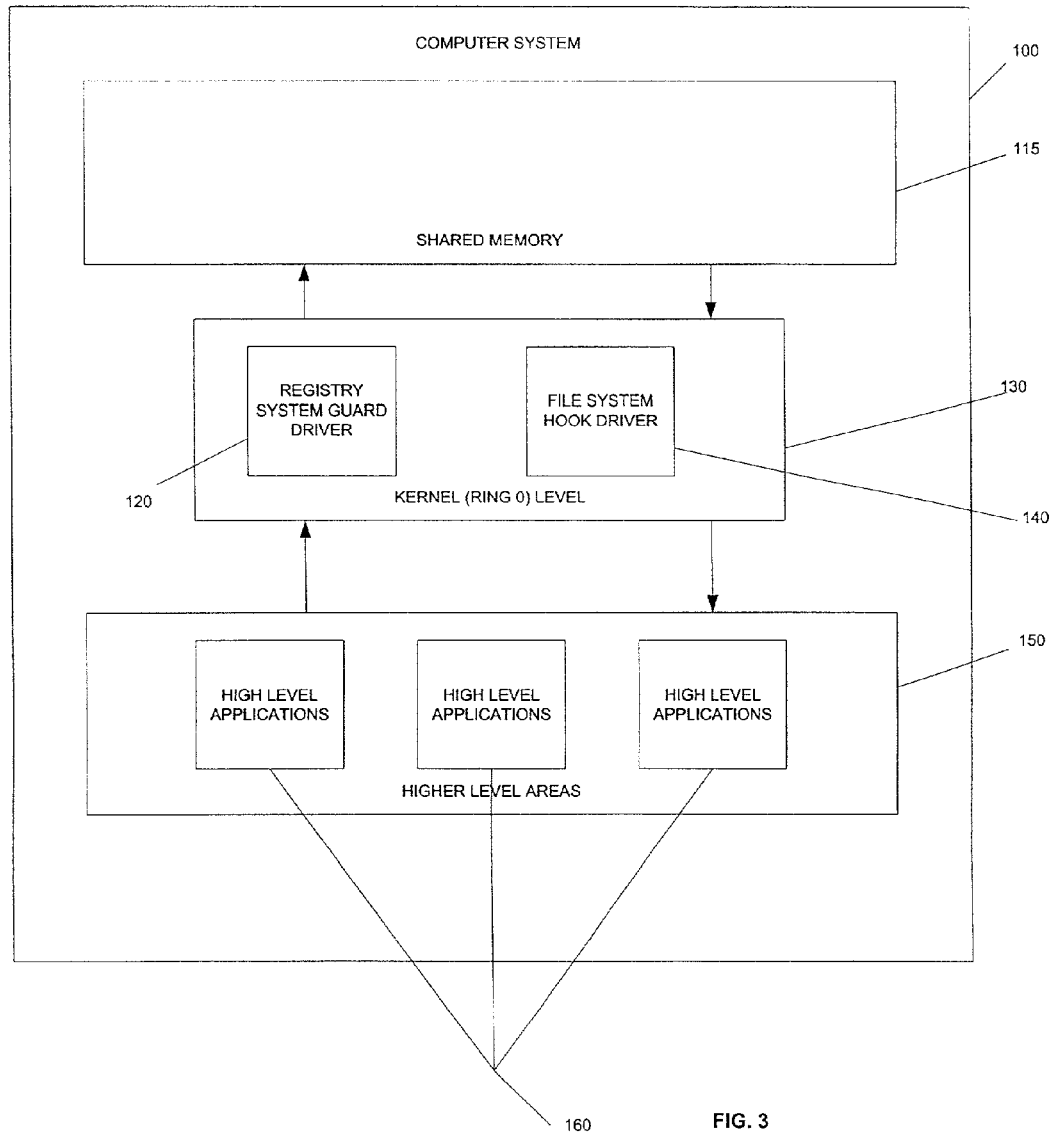
FIG. 3 is a block diagram depicting the interaction between an application programming interface component with device drivers according to an illustrative embodiment of the invention.

FIGS. 2 and 3 depict an illustrative computer system 100 according to an embodiment of the invention. A registry entry guard driver 120 is in communication with file system hook driver 140. Both drivers exist on the kernel (ring 0) level 130. Applications 160 run on higher levels 140. When applications 160 request access to registry 110 or shared memory 115, guard driver 120 in conjunction with hook driver 140 monitors and handle the requests.

A package carries data and provides associated information to a command center which is a component of an application programming interface, such as a Win32 process. A communication driver handles communication between the application programming interface and a plurality of device drivers. It provides a single set of device driver I/O control functions that are called from the application programming interface to send information to or retrieve information from the device drivers. The communication driver is called by a hook driver to notify the command center that a process is trying to open a packaged file. The device drivers, together with the application programming interface, marshal the packaged content into a vault and support access to the content, subject to an originator's permission selection. The command center may watch for packages to be executed and prompt users for file names to save a package payload. It may notify the file system hook driver that a package payload should be absorbed into the vault. It may present users with dialog indicating that an application is attempting to open a packaged file. It may also notify device drivers 106 when applications exit. The command center may block clipboard access and terminate applications at the request of a permissions device driver when permissions expire. Permission information is contained in a database and may include, for example, file names, package ID, file system ID and file permissions. File permissions may include, but are not limited to, length of time or number of times a file may be open, date after which a file may no longer be opened, and printing and clipboard permissions.

File system hook driver 140 obtains a data request initiated from a user who is looking to access a packaged or absorbed file. When hook driver 140 receives the requests it performs a security check on the process and then queries the user. The process is then added to a secured process list. The registry monitor is notified that the process is secured so it may block access in the future.

Figure 4A:
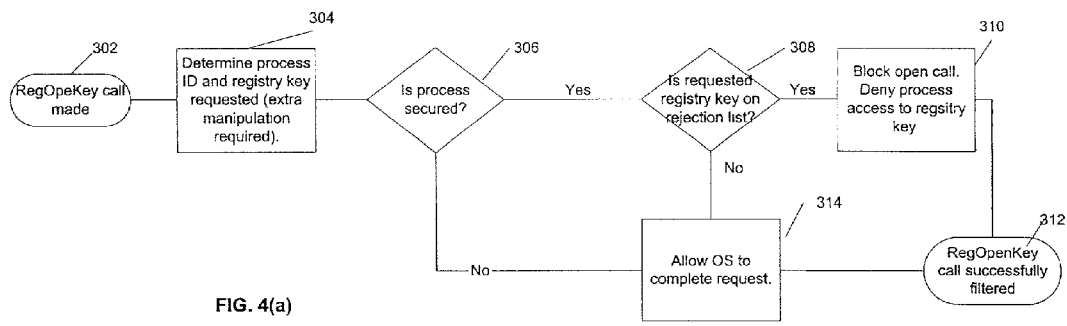
FIGS. 4A-C are flow charts of a registry monitoring system according to an illustrative embodiment of the invention.
Figure 4B:
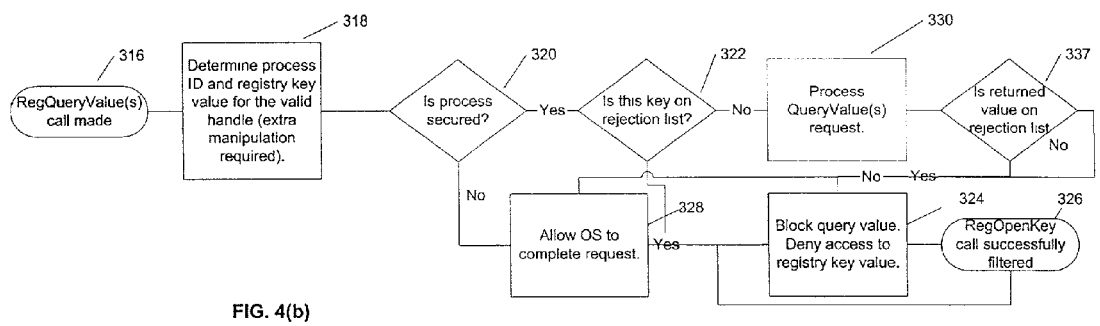
Figure 4C:
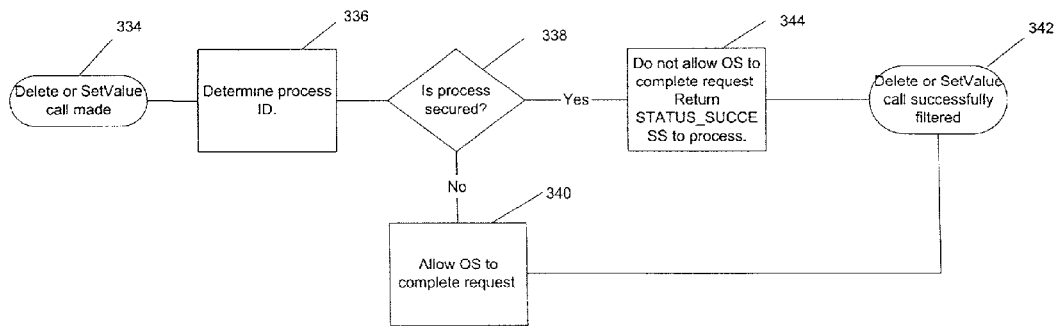

FIGS. 4A-C depict an illustrative embodiment of the invention. Those skilled in the art will understand that variations on the registry monitoring system that include security checks to block access to keys and values are equivalent to the steps described herein, and thus, are within the spirit and scope of the invention. FIG. 4A depicts an illustrative filtering sequence for a registry open key call. The call is made to obtain a handle for a registry key to a calling process. The registry key handle call is made in step 302. In step 304 a process ID and registry key are determined. Based on this information it is determined in step 306 whether the process is secured by checking a secured process list. The secured process list is continually updated as calls are initiated. If the process is secured, then in step 308 it is determined whether the registry key is on a rejection list. The rejection list is also continually updated. If the registry key is on the rejection list, the process is denied access to the registry key in step 310 and the call is successfully filtered in step 312. If the process is not on the secured list or if the registry key name is not on the rejection list, then in step 314 the request is completed and the call is successfully filtered in step 312.

FIG. 4B is an illustrative flow chart for a registry key value call filtering sequence. A registry key value for the handle is requested in step 316. The process ID and registry key value are determined in step 318. In step 320 the secured process list is again consulted to determine whether the process is secured. If the process is secured, it is determined in step 322 whether the registry key is on a rejection list. If the registry key is on the rejection list, the process is denied access to the registry key value in step 324, and the call is successfully filtered in block 326. If the process is not on the secured list, the request is completed in step 328, and the call is successfully filtered in block 326. If the registry key is not on the rejection list, the value request is processed in step 330 and it is determined whether the value is on the rejection list in step 332. If the value is not on the rejection list the request is allowed to be completed in step 328, and the call is successfully filtered in block 326. If the value is on the rejection list then in step 324 access is denied to the registry key value, and the call is successfully filtered in block 326.

Handles and values may then be deleted or modified. An exemplary flow chart for a deletion or modification sequence is depicted in FIG. 4C. A delete or set-value call is made in step 334. The process ID is then determined in step 336. In step 338 it is then determined whether the process is secured by checking whether the process is on the secured process list. If the process is not on the secured process list, the request is completed in step 340 and the call is tracked in step 342 by creating a record and entering the record on the secured process list. If the process is on the secured process list, the request is not allowed to be completed in step 344. The call is tracked in step 342 by creating a record and entering the record on the secured process list.

Further disclosed is a registry monitoring system wherein the registry is monitored according to methods described herein. Additionally, an embodiment of the invention includes a computer configured to monitor a registry according such methods. Embodiments of the invention still further include a machine-readable medium comprising a program to monitor a registry according to methods described herein.

Another protection mechanism is to monitor and regulate shared memory. Shared memory may be used to communicate between two or more concurrently running jobs or threads. One program creates a memory segment which other processes may access.

Shared memory may also be exploited for leaking data. A data leak may occur if a process writes information to a shared memory location and another process accesses the information from that location.

It is known to lock shared memory, usually to avoid processes accessing data out of sequence to ensure use of only updated shared data. Access to shared memory space is prohibited during use by a first process and thereafter unlocked to allow processes sharing the space access to updated data. Memory locking as known in the art is not a solution to data leakage. Accordingly, where data security is important, there is a need to limit data leakage from shared memory.

The embodiments disclosed herein may prohibit processes with shared pages from accessing secured data. Blocking processes from sharing pages may reduce or eliminate data leakage from shared memory. Embodiments include a security check before a process is allowed to open a secured data file. The security check may comprise ascertaining the shared memory state of the process and determining whether the process is on a secured process list.

The shared memory blocking process may be broken down into two primary parts. The first part comprises hooking service calls, including reserve, commit and free calls, used to collect data. The second part includes using data to govern access to secured data.

With respect to FIGS. 2 and 3, when hook driver 202 receives the requests it calls to a registry entry guard driver 204 to determine whether the process is secured and whether there are shared pages. Guard driver 204 checks secured process and shared memory records. If there is no sharing the request can be granted, and if there is sharing, guard driver 204 informs hook driver 202 that the process is not secured, and therefore, the request is rejected. If the pages are not shared then the user is allowed to access the secured data and the process is put on the secured process list.

Figure 5A:
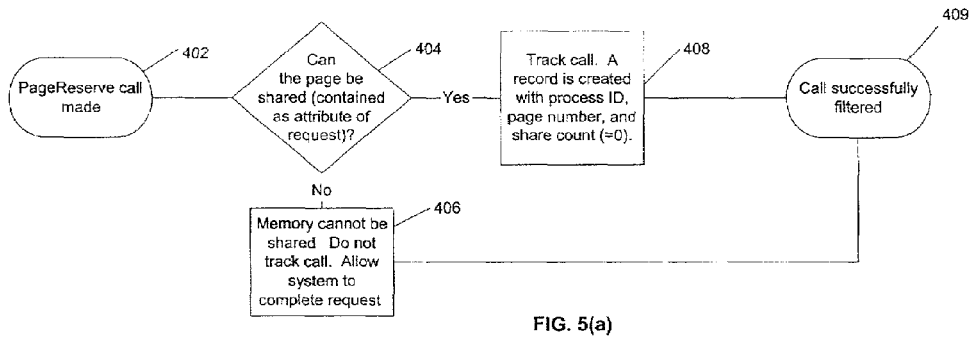
FIGS. 5A-D are flow charts of a shared memory blocking method according to an illustrative embodiment of the invention.
Figure 5B:
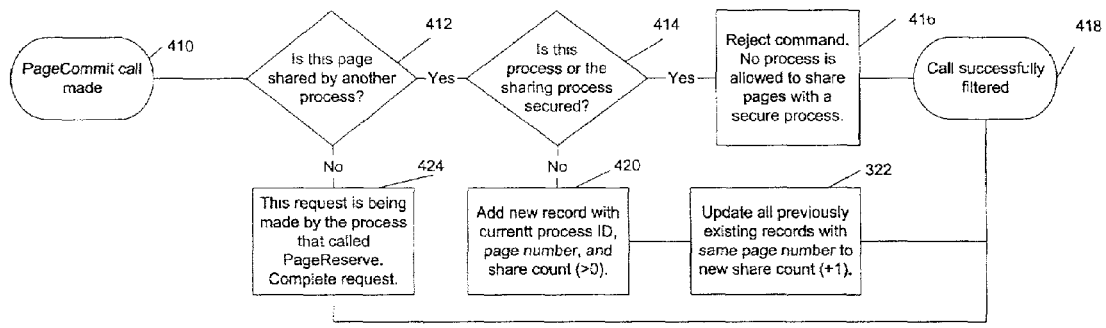
Figure 5C:
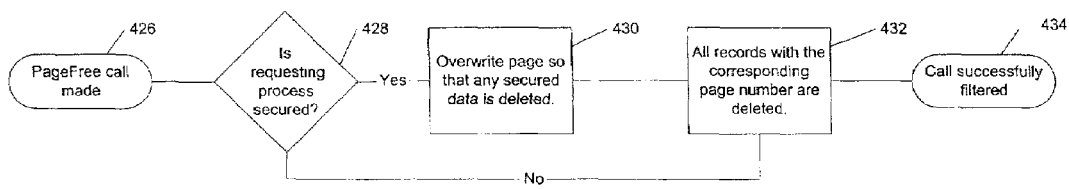

The following is an illustrative embodiment of the invention. Those skilled in the art will understand that variations on the shared memory blocking that include security checks to determine whether processes are secured and whether pages are shared are equivalent to the steps described herein, and thus, are within the spirit and scope of the invention. The illustrative embodiment of shared memory blocking is depicted in FIGS. 5A-D. FIG. 5A is a flow chart of an exemplary page reserve call filtering sequence. The reserve call reserves a page of memory for a requesting application. The filtering sequence begins by providing the call in step 402. The call is then filtered by first determining whether the page can be shared based on request parameters in step 404. If the page cannot be shared the request is allowed to be completed in step 406. If the page can be shared, the reserve call is tracked in step 408 by creating a record and entering the record into a shared memory list. The record may include a process ID, page number and share count. FIG. 5B depicts an exemplary sequence for filtering a page commit call. The page commit call is provided to commit the memory page for the requesting process or for a subsequent requesting process in step 410. In step 412 it is determined, by accessing the shared memory list, if the page is shared by another process. If the page is shared, it is determined whether either of the sharing processes are secured in step 414 by accessing a secured process list. The secured process list is created by continually compiling records produced when a user attempts to open a protected file. If either process is secured, page sharing is not allowed as shown in step 416, and the commit call is tracked in step 418. If both processes are not secured, a new shared memory record is created in step 420, and the shared memory list is updated with information contained in the new record in step 422. The share count is also updated for any processes sharing the page. If the page is not shared, the commit request is completed in step 424. The committed application is then performed. FIG. 5C depicts an illustrative filtering sequence for a page free call. The page free call may be used to free the memory page of some or all address spaces. The call is provided in step 426. In step 428 it is determined whether the process is secured by checking the secured process list. If the process is secured, the page is overwritten to delete secured data in step 430, and all records in the shared memory list with a page number the same as the overwritten page are deleted in step 432. If the process is not secured all records from the shared memory list with a page number corresponding to the unsecured process page are also deleted in step 432. Once pages are deleted, the page free call is tracked in step 434.

Figure 5D:
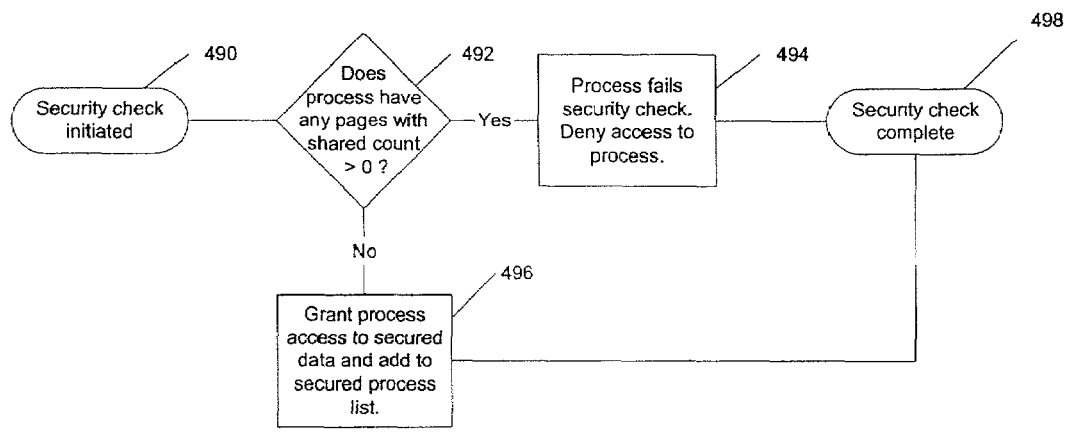

Before a process is allowed to open packaged data via the hook driver, a security check is performed to determine the shared memory state of the process, and hence, to determine whether access to the process should be granted. No process with shared pages is allowed to access packaged data. FIG. 5D is a flow chart of a shared memory state security check. In step 490 the security check is initiated. In step 492 it is determined whether the process has any pages with a share count greater than zero. If the process has any pages with a share count greater than zero the process fails the security check and access is denied to the process in step 414. If the process does not have any shared pages with a shared count greater than zero then in step 416 access to the secured data is granted and the process is added to the secured process list.

A further illustrative embodiment is directed to a shared memory blocking system wherein the system blocks memory according to methods provided herein. The illustrative shared memory blocking system embodiment comprises an applications programming interface to marshal one or more packaged files into a secured vault and support file content access. The applications programming interface includes a command center to monitor package access. A file system hook driver is in communication with the command center and with a registry entry guard driver to carry out shared memory blocking.

Further disclosed is a secured data transmission system having a receiver component to access secured file content provided by a sender, wherein the receiver includes a shared memory blocking system.

Still another protection mechanism in accordance with the present invention is back-channeling of data, as will be described herein.

In order to secure data from unauthorized access, the data may be encrypted. Encryption algorithms are commonly designed to use a key pair—one key for encryption and one key for decryption. Encryption is used to encode information and send it as an encrypted file. Encryption may also be used to set up a secure connection between two computers so that eavesdroppers will not be able to intercept data being exchanged.

An encrypted container may be used to protect data within a computer system. An encrypted container is a reserved area on a disk to which protected files are copied and saved. This may be implemented by creating a file which is encrypted, and which is mounted as and acts as a file system. Prior art encrypted containers allow content distributors to distribute content to users without endangering the security of the content. A client side container-opener application is used to access the encrypted container. The client side container-opener may limit the accesses to data in the encrypted container in any number of ways. For example, it may allow the data to be accessed only at certain times or with a proof of payment key.

Prior art encrypted container systems contain limited security once the container is opened and the data released. When a file is opened in a computer running prior art software and operating systems, the data may leak to applications (such as clipboard or other system applications) and may be copied and left insecure during system operations, such as printing. This compromises the system.

Some client side container-openers may come with integrated data-display mechanisms which allow the user to view the secure data. For example, Folio (NextPage, Inc.) provides a viewer browser to display files and the viewer browser prevents unauthorized use of data by turning off application level controls. However, this means that when documents in Folio are displayed, data can still be saved to the clip board and attacked in other ways from the system level.

Watermarking or digital fingerprinting by the client side container-opener application can be used to trace the origin of content which has been opened and removed from an encrypted container. This will allow tracing of content which has been distributed in an unauthorized way. However, this still allows the data to be viewed by unauthorized users.

The embodiment disclosed allows a computer system including a memory vault system to include the use of secured data from the vault by insecure applications without modification of these applications or security breaches. This is done by implementing back-channeling of data used or produced by these insecure applications (in other words, the segregation of this kind of data and the creation of any of this data in the vault rather than elsewhere in system memory) and thereby protecting in the same way that the original secured data is protected.

Figure 6:
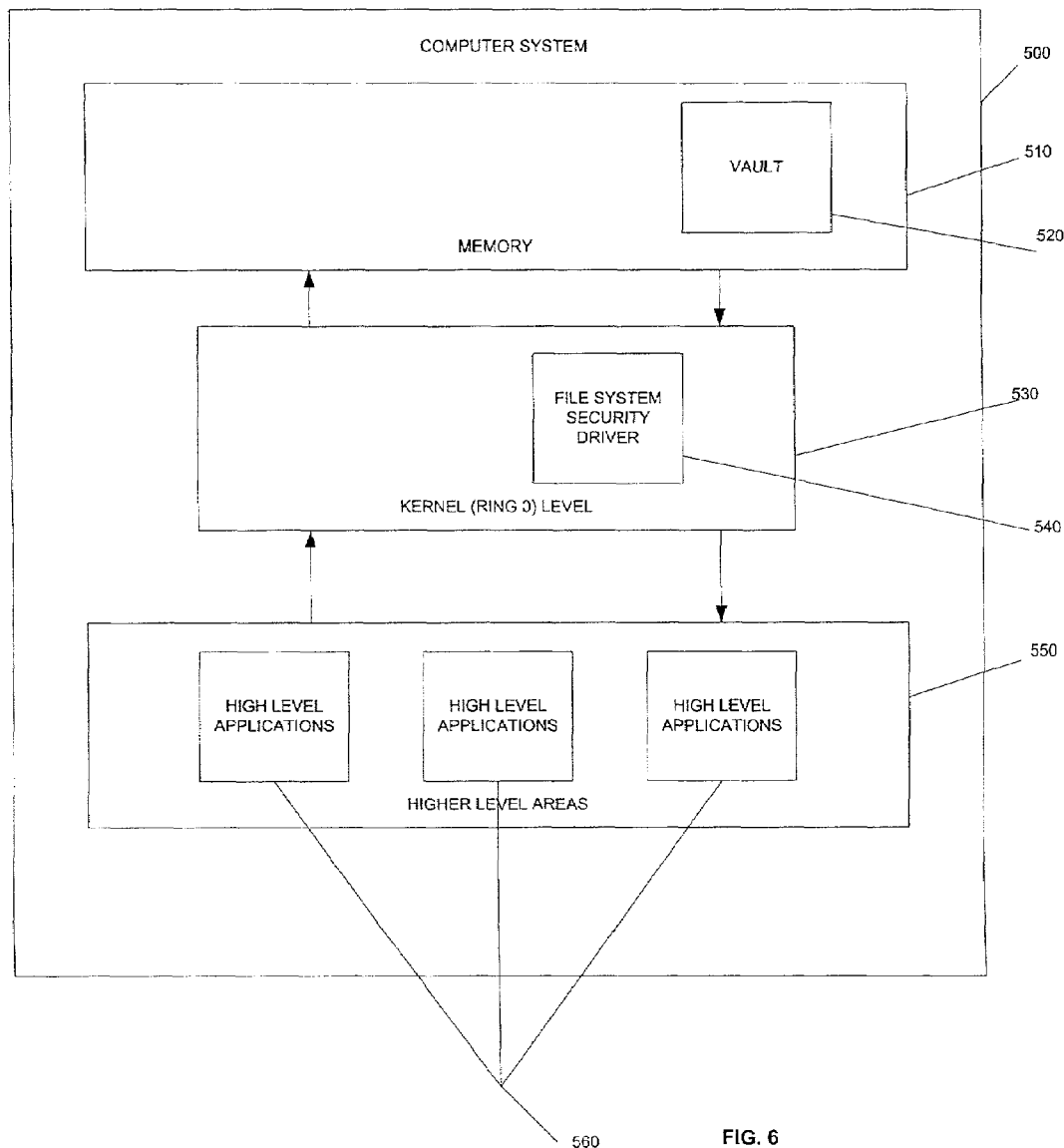
FIG. 6 is a block diagram of a computer system operating according to an illustrative embodiment of the back-channeling method of the invention.

With reference to FIG. 6, in a preferred embodiment, the back-channeling method is implemented on a computer system 500. Computer system 500 contains memory 510, which may be configured in any number of ways and may include several memory systems and kinds of memory media. Resident in memory 510 is at least one vault 520. In a preferred embodiment, a vault 520 uses the logical construct of a file, and within it is embedded a simple, robust file structure able to manage data from heterogenous file sources. Memory 510 and hardware are directly accessed only by kernel-mode applications resident in the kernel (ring 0) level 530. One such kernel-mode application is the file system security driver 540. Higher-level applications 560 which are in any higher level (collectively shown in FIG. 6 as 550) access memory only via applications resident in the kernel (ring 0) level 530, as shown by the arrows. In a preferred embodiment of the invention, the security system associated with file system security driver 540 ensures that requests for data by higher-level applications 560 are always handled by file system driver 540. The file system security driver 540 keeps information on secured processes running, file handles that higher-level applications use to reference secured files and other vault files, and vault file handles which file system security driver 540 can use to access secured files and other vault files. The file system security driver 540 uses this information to ensure that access to vault information is possible but restricted. It does this by intercepting and acting on file open, file read/write, file information, and file change requests. These requests are handled as shown in FIGS. 7 through 10.

Figure 7:
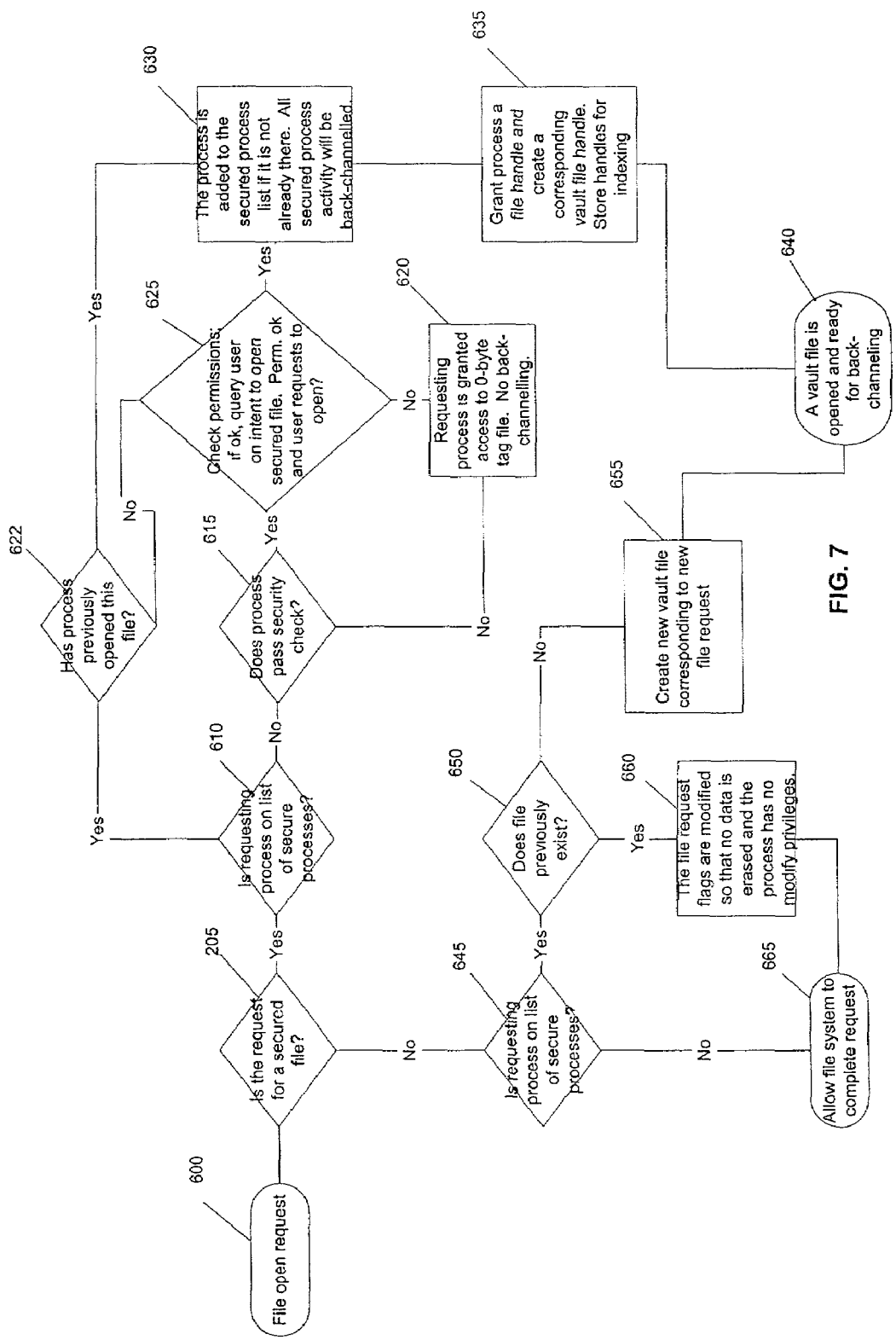
FIG. 7 is a flow chart of a file open in a memory vault system according to an illustrative embodiment of the back-channeling method of the invention.

With reference to FIG. 7, a process sends a file open request which is received by file system security driver 540 (FIG. 6). Upon receipt of a file open request 600, the request is examined to see if it is for a secured file 605. If it is, then the request is examined to see if the requesting process is on the secured process list 610.

If the request is for a secured file, and the requesting process is not on the secured process list, then a security check is performed by a security driver on the requesting process 615. If the process does not pass the security check, then the requesting process gets access to a 0-byte tag file instead of the file requested 620. If the process does pass the security check, then permissions are checked, and the user is queried about whether the user wants to open a secured file 625. If permission is not allowed, or if the user does not want to open it, then the requesting process gets access to a 0-byte tag file instead of the file requested 620. If the user does want to open it, the process is added to the secured process list 630. (Information about the opening of a secured file will be passed to the part of the security driver in order to monitor the number of file opens permitted.) The process will be granted a file handle and a corresponding vault file handle will be created; these handles will be stored for indexing on the opened file list 635. In this way, a file is opened and ready for back-channeling 640.

If the request is for a secured file, and the requesting process is on the secured process list then if the process has not previously opened the requesting file the check and query 225 will occur. If the process has opened it before, the process activity is back channeled. The process is granted a file handle and a corresponding vault file handle will be created; these handles will be stored for indexing on the opened file list 635. A file is open and ready for back-channeling 640.

If the request is not for a secure file, then the secured process list is consulted to see if the request was made by a secure process 645. If it is, then a check is made to see if the file exists 650. If it does not, then in order to back-channel, a file is created in the vault which corresponds to the file request 655. In this way, a secured process is not allowed to create a file outside of the vault (an insecure file). This is back-channeling—not permitting a secured process to "leak" secure information to a file which is not protected by the vault.

If the request is by a secure process, but for a file which is not secure, then the file request flags foi the file open request are modified so that no data in the insecure file can be erased or modified 660. In this way a secured process can access non-secure data outside of the vault, but can not write to it—preventing secure data from being written to an insecure (non-vault) file. The modified request is passed to the file system for completion 665.

If the request is not for a secure file and not made by a secure process, then the request has no security implications, and the request is passed to the file system for completion 665.

In this way, secured data can only be accessed by secured processes, new files opened by secured processes are always created in the vault, and insecure files opened by secured processes can not be written to.

Figure 8:
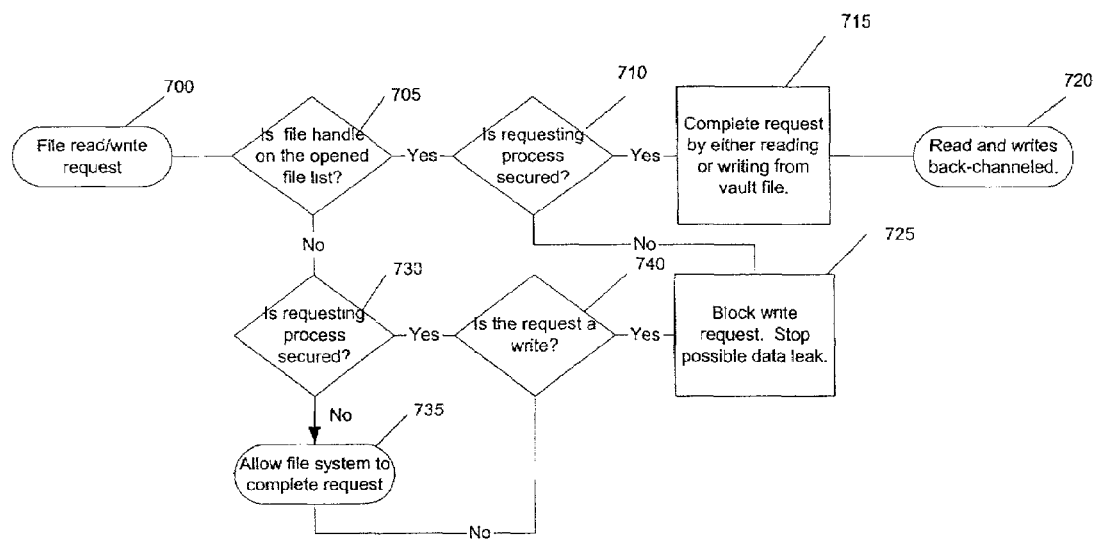
FIG. 8 is a flow chart of a file read/write in a memory vault system according to an illustrative embodiment of the back-channeling method of the invention.
Figure 9:
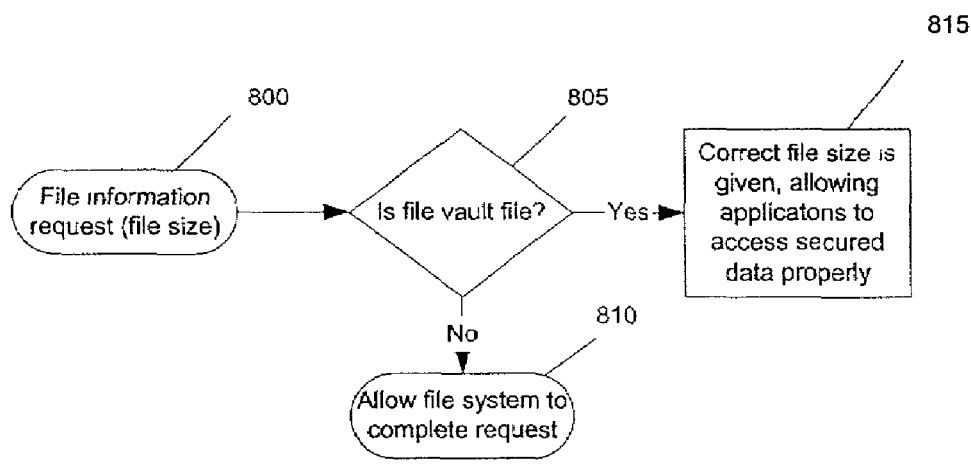
FIG. 9 is a flow chart of a file information request in a memory vault system according to an illustrative embodiment of the back-channeling method of the invention.

As shown in FIG. 8, back-channeling is also enforced when file read/write requests are intercepted by the file system security driver (540, FIG. 6). When such a request is received at 700, a check is performed to see if the file handle is on the opened file list at 705. If it is, then the file is in the vault. A check is performed to see if the requesting process is on the secured process list 710. If it is, then the request is completed by performing the request on the corresponding vault file 715, thus back-channeling the read or write request 720. If it is not, then the request is for a secured file by an insecure process, and the request is denied 725.

If the file handle was not on the opened file list at check 705, a further check is done to see if the process is on the secured process list 730. If it is not, then the file system is allowed to complete the request 735. If it is, then the request is examined to see if it is a write request 740. If it is not, the file can be opened, even though it is insecure and the process is secure, since no secure data can be leaked by reading an insecure file. The request is passed to the file system 735. If the file is insecure, the process secure, and the request is a write—in this situation there is the danger of a data leak. Therefore the write request is blocked 725.

File information requests are handled differently—the correct file size can be accessed even by insecure processes. This is file size spoofing—in the preferred embodiment, the file system sees the secured file's reference as pointing to a zero-byte file, and if a file-size request were handled by the file system, it would return a size of zero. In the preferred embodiment, non-secure processes are allowed to see the size of secure files, and therefore, with reference to FIG. 9, when the request is received 900, a check is performed to see if it is a vault file 805. If it is not a vault file, then the request is passed to the file system to complete 810. If it is a handle for a vault file or the name of the vault file, then size of the corresponding actual vault file is checked and returned 815.

Figure 10:
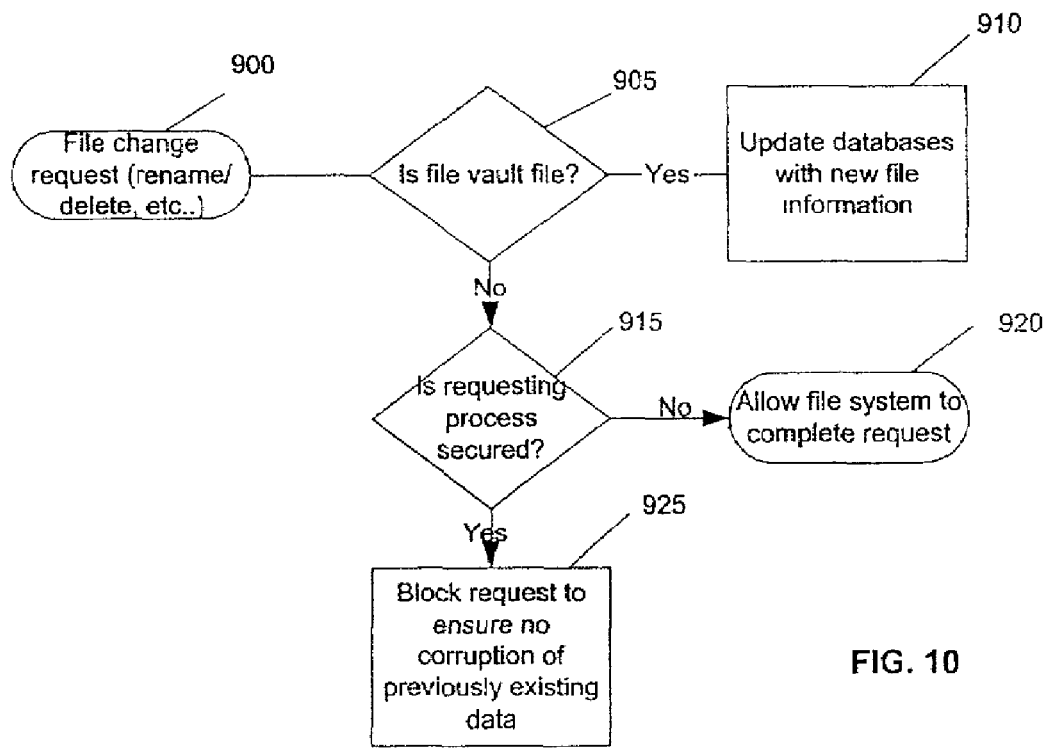
FIG. 10 is a flow chart of a file change request in a memory vault system according to an illustrative embodiment of the back-channeling method of the invention.
Figure 11:
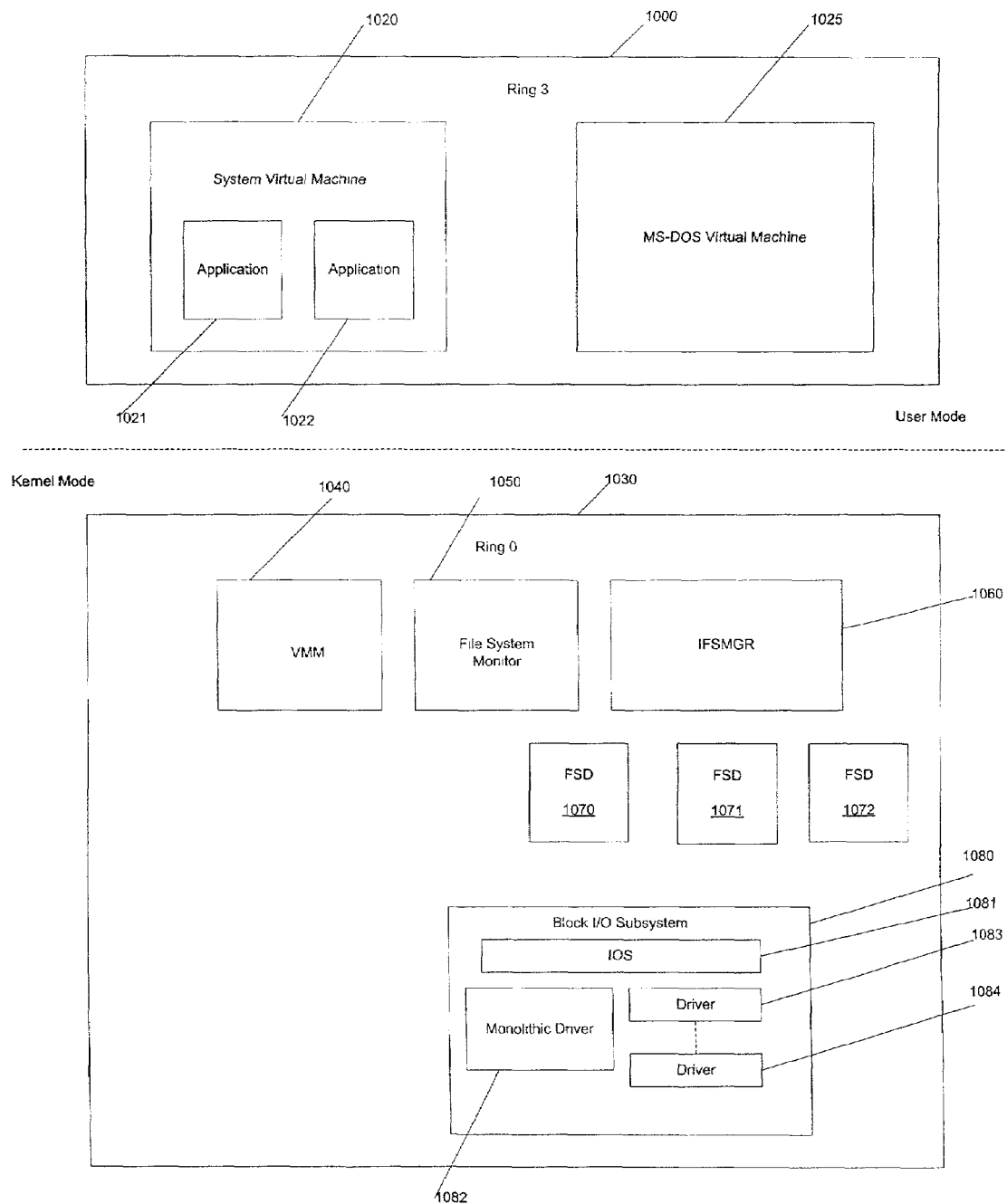
FIG. 11 is a block diagram of the system architecture layout of the Windows 9x operating system.

File change requests—change requests which are not reads, writes, or opens—are handled similarly to file writes. With reference to FIG. 10, when a file change request is received 900, the request is examined to see if the file referenced is a vault file 905. If it is, then the opened file list and other databases are updated with new file information 910. If the file is not a vault file, then the process is checked to see if it is a secured process 915. If it is not a secured process, then no security concern at all is implicated, and the request is passed to the file system for completion 920. If it is a secured process but the file is not secured, then the request is blocked, to ensure that the secured process will not corrupt previously existing data 925.

A further illustrative embodiment of the invention is directed to a file system security driver wherein the driver implements a vault system with back-channeling according to the methods provided herein. The illustrative file system security driver comprises a driver resident on the kernel level which monitors file system requests and allows limited access to files resident on the vault and creation of vault files when necessary.

Further disclosed is a secured data transmission system having a receiver component to access secured file content provided by a sender, wherein the receiver includes a vault system and a file system security driver acts according to the methods provided herein.

Still further disclosed is a computer configured to include a vault system and a computer-readable medium programmed to monitor file system requests and allow limited access to files resident on the vault and creation of vault files, according to the methods provided herein.

Another protection mechanism in accordance with the present invention is stack positioning, which will be described in detail herein.

Computer systems typically include one or more local or networked data storage devices. A typical application program executing on such a computer system accesses such data storage devices by calling standard file system services provided by an operating system, such as services for creating, reading, and writing files on the data storage devices.

A device driver is a set of computer-implemented instructions that implements the device-specific aspects of generic input/output operations. In typical operating systems, software applications such as device drivers run in either "kernel mode" or "user mode." A virtual device driver is a type of device driver that has direct access to an operating system kernel, such as by running in kernel mode. "Kernel mode" is a highly privileged memory access mode of the processor. "User mode" is a less privileged memory access mode of the processor. The memory access mode is a part of the hardware state of the processor. The kernel mode privilege level is also known as "Ring 0," and the user mode privilege level is also known as "Ring 3." Kernel mode access allows the virtual device driver to interact with system and hardware resources at a very low level.

In conventional operating systems, device drivers may be represented as layered on top of one another. The layered architecture is also sometimes referred to as a stack or a calling chain. It is the lowest-level device driver that typically controls a hardware device. If there is only a single device driver above the hardware device, the driver is called a monolithic driver. However, a plurality of drivers may be placed above the lowest-level driver. Input and output requests ("I/O requests") to the hardware device or devices controlled by a lowest-level driver are handled first by the highest-level driver, then seriatim by any lower-level intermediate drivers, and finally by the lowest-level driver.

A file system driver is generally a highest-level driver, layered above a device driver for a data storage device such as a hard disk drive. The file system driver implements high-level aspects of I/O requests directed to the file system, such as requests to create, open, extend, and delete files and directories. A plurality of file system drivers may exist in a single computer, and file system drivers may be specific to different types of file systems, such as the FAT and NTFS file systems.

It is known in the art to monitor file I/O requests in operating systems having an installable file system manager and layered device drivers, such as the Windows 95, Windows 98, and Windows Me operating systems available from Microsoft Corporation of Redmond, Wash., and collectively referred to herein as "Windows 9x". In Windows 9x operating systems, file system monitoring may be accomplished by registering a file system applications programming interface hook with the installable file system manager. Windows 9x provides a function called IFSMGR_InstallFileSystemApiHook which is designed to be used for monitoring I/O requests to a file system. This service allows virtual device drivers to monitor all file system activity by hooking into the file system calls. By means of a call during system initialization to IFSMGR_InstallFileSystemApiHook, a virtual device driver may insert itself onto the stack of all file system requests.

A somewhat different approach has been used to monitor file systems on object-oriented operating systems, such as the Windows NT operating system and successor operating systems such as Windows 2000, available from Microsoft Corporation of Redmond, Wash., and collectively referred to herein as "Windows NT." In Windows NT, I/O requests are described by data structures known as I/O Request Packets ("IRPs"), which are used for communication between software applications and drivers. All IRPs to hardware devices are handled by device drivers operating in kernel mode. High-level, intermediate, and low-level drivers exchange IRPs to complete a given I/O request. The lowest-level driver calls an NT layer known as the Hardware Access Layer (HAL) to gain direct control of the hardware. It is known on a Windows NT system to implement a file system monitor as a device driver object that creates filter device objects and attaches those objects to target file system device objects, so that the file system monitor will see all IRPs directed to the monitored data storage devices.

There is a need in the field of file systems in electronic computers to prevent unauthorized activity. Unauthorized activity includes, without limitation, the release of data from a secured file or a secured file system to an insecure file system device driver, and the malicious, unauthorized, or accidental modification or corruption of data, such as by computer viruses. Conventional file system drivers, such as file system monitors that are used to detect and monitor activity in file systems, have not typically included effective security measures to prevent unauthorized activity by a software application or device driver that is layered, or attempts to layer itself, at a higher level than the highest-level device driver above the targeted data storage device.

It should also be understood that the terms "device driver" or "driver," as used herein, include any computer-implemented instructions for directly or indirectly accessing or controlling hardware devices, including, without limitation, device drivers, virtual device drivers (VxDs), instructions using NT kernel mode architecture, instructions using Win32 driver model (WDM), and other instructions, in any computer language, directed to any computer, computer architecture, network, or operating system.

Although the embodiment illustrated in the figures comprises a device driver described for illustrative purposes as a "file system monitor," the term "file system monitor" as used herein refers generally to a device driver of any kind using the stack positioning of the present invention. Device drivers within the scope of the invention may perform any sort of useful function that may be performed by a device driver, including, without limitation, general-purpose monitoring, permission monitoring, filtering, encryption, decryption, virus detection, data mirroring, I/O functions directed toward any device, and other functions, and are not limited to either monitoring or to functions related to file systems. Any device driver which accomplishes stack positioning appropriately falls within the scope of the present invention.

One embodiment of the present invention may be implemented on a Windows 9x operating system. Referring now to FIG. 1, components of the Windows 9x operating system are divided between user mode code 1000 and kernel mode code 1030, which provide different levels of system protection. For one embodiment, the user mode code 1000 includes a system virtual machine 1020 capable of running 16-bit and 32-bit software applications 1021-1022, and a plurality of MS-DOS virtual machines 1025. In this embodiment, the kernel mode code 1030 comprises low-level operating system services and virtual device drivers, such as a virtual machine manager 1040, a file system monitor 1050 of the present invention, and an installable file system manager 1060.

Beneath the installable file system manager 1060 are a plurality of file system drivers 1070-1072 for file systems such as FAT and NTFS. Beneath the file system drivers 1070-1072 is a block I/O subsystem 1080. The block I/O subsystem 1080 includes an I/O supervisor 1081 which manages requests as they pass through the file system hierarchy, a monolithic driver 1082 for port I/O, and a layered plurality of device drivers 1083-1084.

In this embodiment, the first device driver 1050 intercepts all I/O requests from user mode code 10 and from applications 1021-1022 running in user mode 1000, before the I/O requests are sent to the installable file system manager 1060. The first device driver 1050 is able to monitor and, if desired, filter all file system activity occurring in the installable file system manager 1060, file system drivers 1070-1072, and block I/O subsystem 1080. By means of a call during system initialization to IFSMGR_InstallFileSystemApiHook, the first device driver 1050 is hooked into such calls when the operating system is started or restarted, at which time it is inserted into a functionally uppermost position on the stack of all file system requests. From the installable file system manager 1060 down through each driver in the layered plurality 1083-1084, an I/O request is passed from the highest level to the lowest level, and the devices can also view the result of a request as it passes back up the stack to the source of the I/O request. Each device driver on the stack may service an I/O request itself and not pass the I/O request to lower levels, or may, if desired, itself generate a new I/O request. Such device drivers may implement functions that require waiting, such as for an interrupt, or for a device to become available. During such waiting periods the device driver simply returns to its caller, allowing the calling application or device driver to perform other work in parallel with the I/O request. In the alternative, the calling application or device driver can simply wait ("block") until the I/O request is complete.

Figure 12:
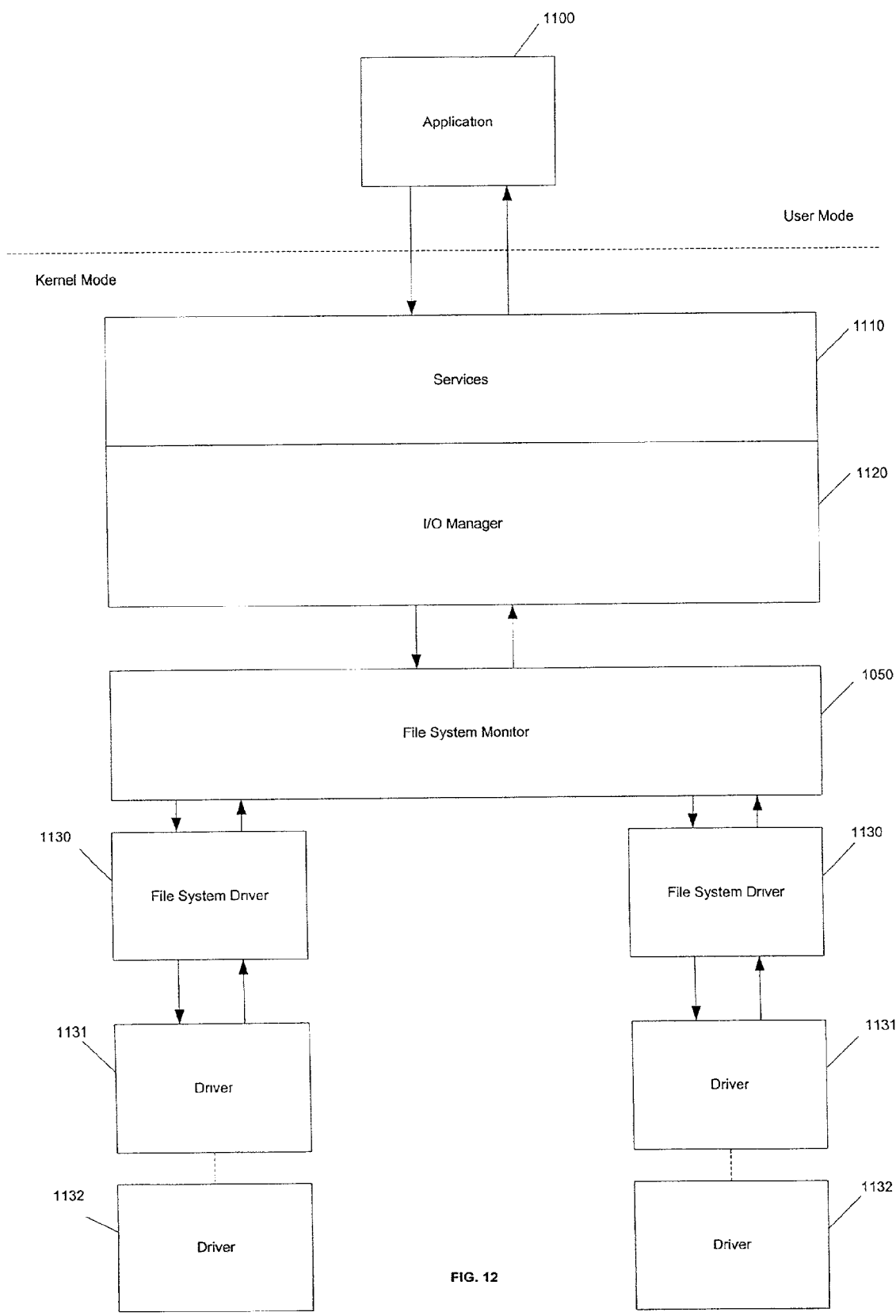
FIG. 12 is a block diagram of the system architecture layout of the Windows NT operating system.

In another embodiment, illustrated with reference to FIG. 12, the present invention may be implemented on a Windows NT operating system. As is well known in the art, an application 1100 running in user mode under Windows NT may send an I/O request to operating system services 1110. I/O manager 1120 receives I/O requests, and coordinates the transfer of I/O request packets among various drivers. In the alternative, the various drivers may communicate directly with each other without using an I/O manager 1120 or other device to coordinate transfer of information among the various drivers.

The conventional input/output system of operating systems such as Windows NT comprises a plurality of device drivers 1130-1132 for processing I/O requests. Such device drivers are illustrated, for example, by file system drivers 1130, and a layered plurality of device drivers 1131-1132. The I/O manager 1120 typically delivers I/O request packets to the file system driver 1130 responsible for managing the target of the I/O request. However, as is known in the art, a file system monitor 1150 can attach to other device drivers 1130-1132 in an object-oriented fashion. Thereupon, the I/O manager 1120 routes I/O request packets intended for the target device driver 1130-1132 to the file system monitor 1150 that has attached to the target device driver 1130-1132. In this illustrative embodiment, the file system monitor 1150 attaches to each of the plurality of file system driver objects 1130.

Figure 13:
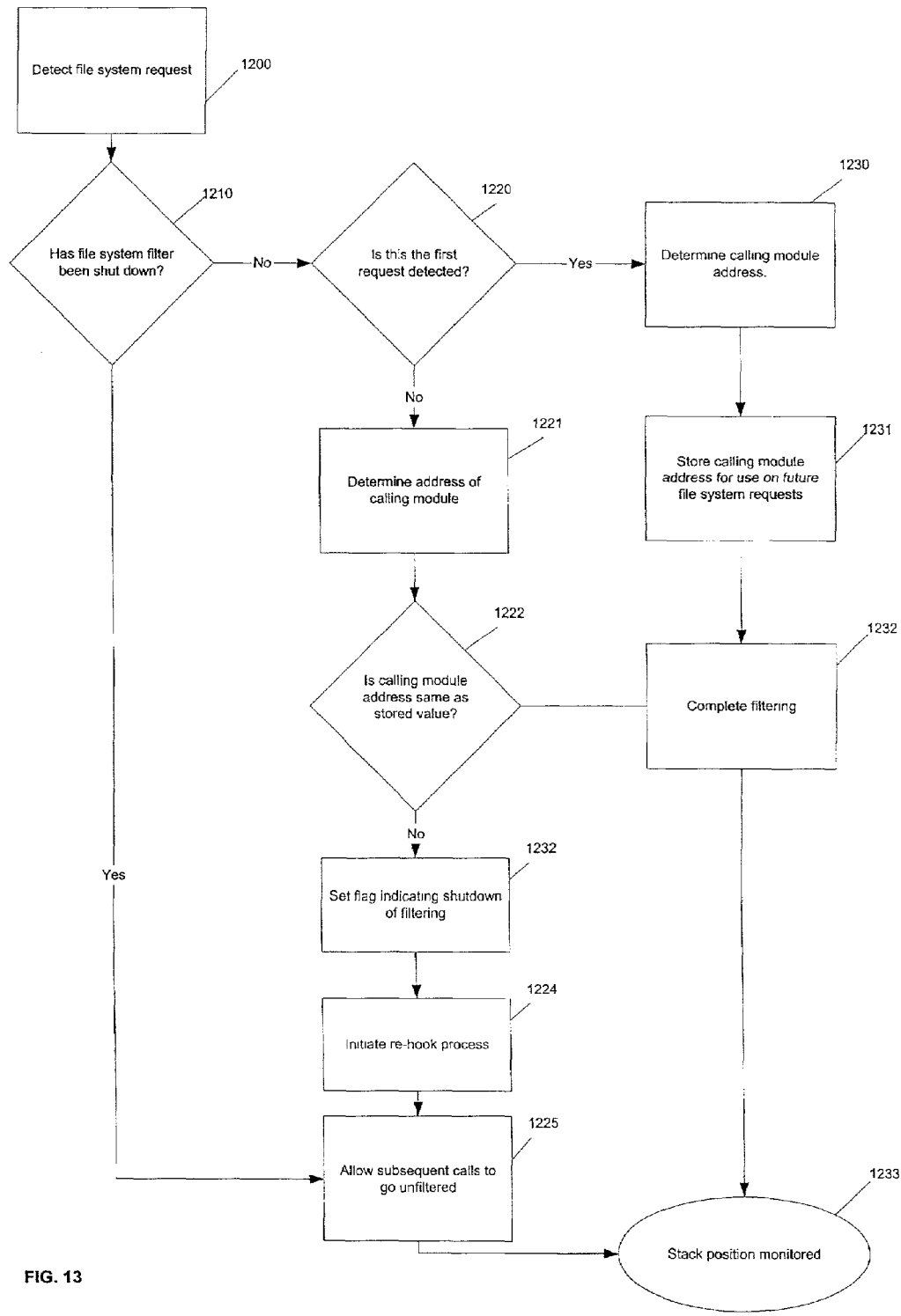
FIG. 13 is a flow chart illustrating an embodiment of the stack positioning method of the present invention.

FIG. 13 is a flow chart of one embodiment of a method for providing data security in a file system monitor 1250 using stack positioning. For illustrative purposes, an embodiment is shown in which the file system monitor 1250 filters file system requests, which are I/O requests directed to a file system. It should be understood, however, that the present invention may be usefully implemented in any device driver, regardless of the purpose of such device driver, without regard to file systems or monitoring functions.

As shown in FIG. 13, the stack positioning process of the present invention is initiated, in step 1200, each time a file system request is detected. In step 1210, the process determines whether or not the file system filter has been shut down by a previous iteration of step 1223. If so, the process continues at step 1225, allowing subsequent calls to go unfiltered, and exits at step 1233.

Returning to step 1210, if the file system filter has not been previously shut down, the process continues at step 1220 and determines whether this is the first file system request detected by step 1200. If so, the process continues at step 1230 and determines the calling module address. Because this is the first file system request, it is logically guaranteed that the file system monitor 1250 has just been loaded, and therefore is functionally uppermost in the stack of device drivers relating to the file system. In a Windows NT embodiment, the calling module is determined by reference to an attached device field of the file system monitor 1250, which will be zero when the file system monitor 1250 is functionally uppermost in the stack of device drivers. Continuing to step 1231, the process stores the calling module address determined at step 1230. The process continues at step 1232 and completes the filtering functions or other useful functions implemented in file system monitor 1250. The process then concludes at step 1233.

Returning to step 1220, if this is not the first file system request detected by step 1200, the process continues at step 1221 and determines the calling module address. In a Windows NT embodiment, the calling module is determined by reference to an attached device field of the file system monitor 1250, which will be non-zero if any device object has attached to the file system monitor 1250. At step 1222, the calling module address is compared to the address that was previously stored at step 1231. By comparing the calling module addresses at this point, the file system monitor 1250 will be able to detect any other driver which attempts to obtain priority over the file system monitor 1250 by interposing itself between the calling module and the file system monitor 1250. If the two calling module addresses are the same at step 1222, the process continues at step 1232.

If the two calling module addresses are not the same at step 1222, the process continues at step 1223, and sets a flag indicating shutdown of filtering. This flag is the same flag that is checked at step 1210. The process continues at step 1224 and initiates the re-hook process, which is described below with reference to FIG. 14. After step 1224, the process continues at step 1225, allowing subsequent calls to go unfiltered, and exits at step 1233.

Figure 14:
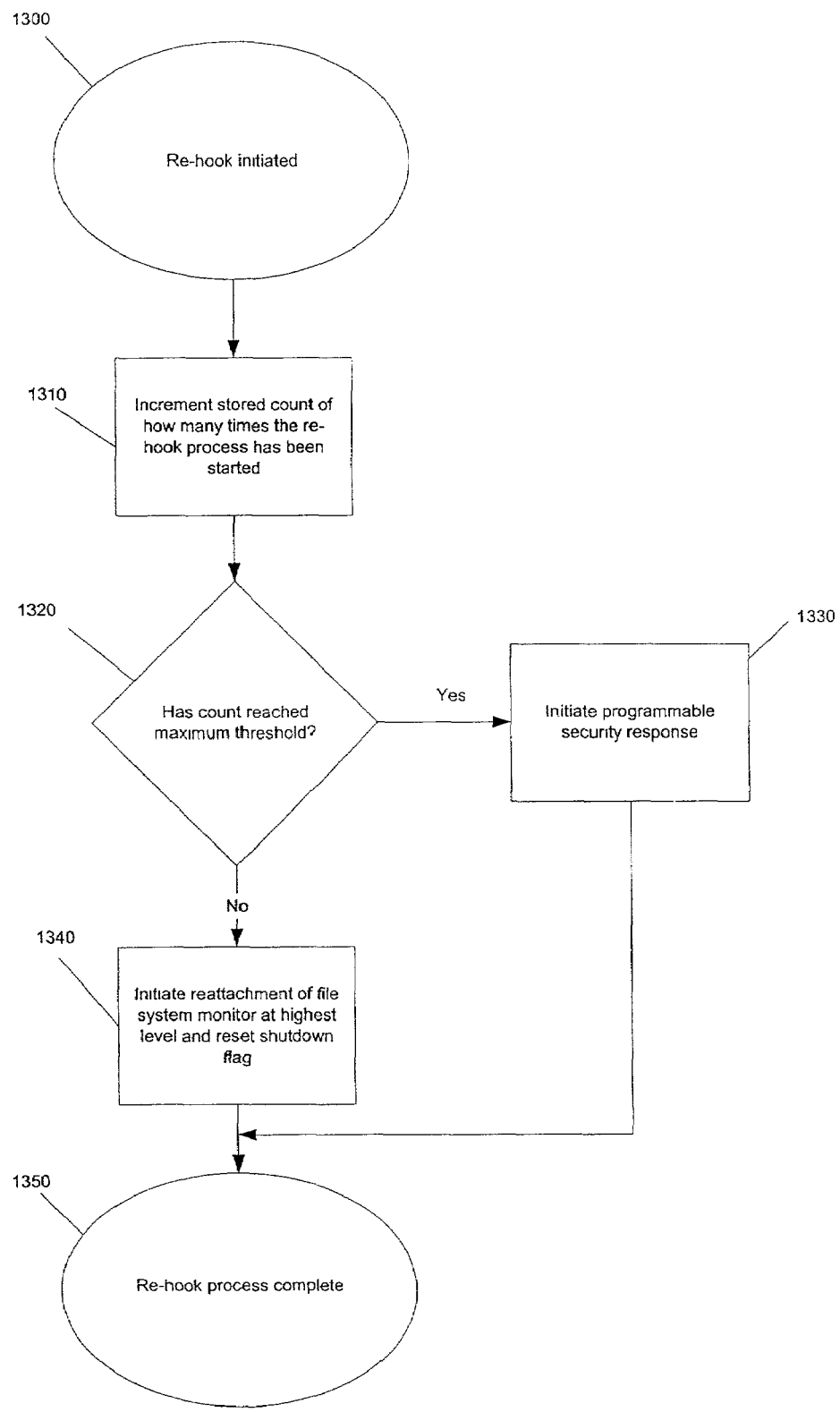
FIG. 14 is a flow chart illustrating the re-hooking steps of the stack positioning method of the present invention.

FIG. 14 is a flow chart of one embodiment of a re-hook process. At step 1300, the re-hook process of the present invention is initiated. Continuing to step 1310, the process increments a stored count of how many times the re-hook process has been started. Continuing to step 1320, the process determines whether the stored count has reached a maximum threshold. The maximum threshold is a predetermined value which triggers a programmable security response.

In embodiments where there is zero tolerance for attempts to circumvent data security, a maximum threshold value of one will be appropriate. In embodiments where some tolerance is acceptable, a maximum threshold value higher than one will be appropriate. In alternate embodiments, multiple or alternative programmable security responses may be enabled at different thresholds.

A wide range of programmable security responses may be found desirable. Programmable security responses include, without limitation, destroying the data that was requested, or, if such data is stored in a secure virtual file system, destroying both the data and the secure virtual file system. Further embodiments of programmable security responses include terminating open applications, destroying the file system monitor on the data storage device, halting the operation of the computer, and causing the computer to enter a state requiring reboot. The preceding are illustrative examples only, and should not be construed to limit the variety of programmable security responses according to the present invention.

Returning to step 1320, if the stored count has reached the maximum threshold, at step 1330, the programmable security response is initiated, and the process concludes at step 1350.

If the stored count has not reached the maximum threshold, at step 1340 the process initiates reattachment of the file system monitor 1050. This may be accomplished by initializing a new file system monitor 1050 at the functionally uppermost level in the stack. In an object-oriented environment such as Windows NT, there may be many attachments to a single device object, and it is not necessary to remove or detach the file system monitor 1050 from the stack, although it may be desirable to do so. Reattachment may, in an alternate embodiment, be accomplished by editing the calling chain to return the previously initialized file system monitor 1050 to the functionally uppermost level.

At step 1340, the process also unsets the flag indicating shutdown of filtering, to indicate that filtering may be resumed. This flag is the same flag, with reference to FIG. 13, that is set at step 1223 and checked at step 1210. The process then concludes at step 1350.

In another illustrative embodiment, the feature of stack positioning in accordance with any of the embodiments herein can be tied into a back-channeling process, such as any of the embodiments in FIGS. 6-8. An advantage is that the uppermost stack position ensures that the back-channeling is done directly to the calling process, not to any intermediate file system filters.

A further protection mechanism in accordance with the present invention is to monitor clock operation, as will be described below.

Some computer programs contain restrictions that limit the time of use of the program. These restriction may be either dictated by a license, agreed to conditions of use of a program, or defined by the owner or provider of the program. For example, trial versions of software typically permit use for a specified period, such as, for example, 30 days. One known method for setting the expiration period of the trial software is to record the system clock information, which includes date and time information, and set the expiration date to be the thirtieth day following that date. Another known method is to have the expiration date programmed into the computer code. Under this method, the program will operate only if the system clock date is earlier than the expiration date regardless of when the program is installed on the computer system.

According to either of these two methods, a user is prohibited from executing the computer program after the expiration date. Typically, an attempt to execute a program after expiration date generates a screen-message notifying the user that the program has expired. A known method to circumvent the expiration date parameter is to manually reset the system clock to a date and time that falls within the permitted time period, that is, to a time and date earlier than the expiration date.

Attempts have been made to address this problem by completely disabling a program independent of system clock information after a user tries to execute a program when the system clock date is later than the expiration field. However, this solution is harsh, in that it does not permit the user to correct the system clock and perhaps continue a permitted use of the software.

There is a need in the field of computer systems to prevent the circumvention of use-restrictions embedded in computer code, such as expiration parameters, without permanently disabling use or access to the program or data within it. The present invention addresses this need by providing a method and apparatus that monitors the system clock to prevent unauthorized access to data. The invention detects modifications or alterations to the system clock and disables clock-related permissions until the system clock is returned to its correct value.

Figure 15:
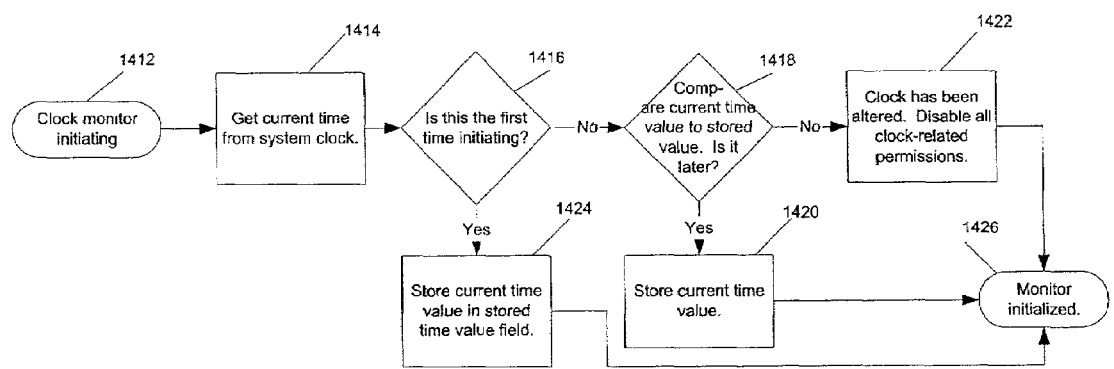
FIG. 15 is a flow diagram of a method for monitoring alterations or modifications of a system clock according to an embodiment of the invention.

Referring now to FIG. 15 there is shown a block diagram of a method for monitoring the system clock of a computer in accordance with a preferred embodiment of the present invention. According to this method, a clock monitor is in communication with a permissions database stored in a memory. The permissions database contains at least one clock-related permission field and a stored time value field having a stored time value. Each permission field contains at least one clock-related permission. The clock-related permissions are parameters which control access to data based on information from the system clock, such as time and date information, or the speed of the system clock. It is known in the art that computer systems operate substantially according to a system clock.

Clock-related permissions include, for example, specifying how long a user may access the data by date, hour or minute. One method of implementing this permission is to decrement the access time from the time a process accesses the data until the time the process expires. The access time is tracked internally; however, the speed of the system clock, derived from the ticks of the system processor, is used to decrement the access time. If, during the process, the access time is completely exhausted, the process would be automatically terminated. After the access time expires, the data would be overwritten and deleted. Another example of a clock-related permission is specifying a date on which the data will no longer be available. A user would have access to the data until the expiration date occurs. If a process has the data opened on the expiration date, the process would be automatically terminated and the data would be overwritten and deleted. Yet another example of a clock-related permission is specifying an authorization date on which the data will become accessible. According to this permission, a user would not be able to access the data until the authorization date has passed. Once the authorization date has passed, the user will have access to the data. Other examples of clock-related permissions include "no permissions" or "unrestricted use". The data subject to the clock-related permissions may be stored on a storage device, such as, for example, a hard disk, a floppy disk, a CD-ROM, or a magnetic tape, or may be embedded within the permissions database or computer program.

The clock monitor comprises computer code that, when executed, initiates the initialization of the clock monitor, step 1412. In an embodiment of the invention, the computer code is a computer program stored on a machine-readable medium, such as, for example, a magnetic disk or an optical disk. The computer code may be a single module of code or, preferably, may be broken up into a series of modules for performing the functions of the clock monitor. In one embodiment, common functions are performed more than once by a single module of code by issuing a call to perform the functions of the module of code. Upon initiation, the clock monitor reads the current time from the system clock, step 1414. The clock monitor then determines whether the permissions database is initialized, which includes whether it has been initialized on a prior occasion, step 1416. In one embodiment of the invention, the execution of a computer program causes the permissions database to initialize via a permission database driver. The database is considered "initialized" if the permissions database driver is loaded on the computer system. In this embodiment, the clock monitor computer code may be embedded within the computer program for initializing the permissions database. In another embodiment, the step of determining whether the permissions database is initialized involves reading the stored time value from the permissions database. If the stored time value is zero, then the database is not initialized. If the stored time value is other than zero, then the database is initialized.

If the permissions database is initialized, then the current time value from step 1414 is compared to the stored time value in the stored time value field in the permissions database, step 1418. If the current time value from step 1414 is later than the stored time value, the current time value is stored in the stored time value field, step 1420. If the current time value from step 1414 is earlier than the stored time value, the clock-related permissions are disabled, thereby preventing access to the data, step 1422.

If the permissions database is not initialized, the current time value of the system clock from step 1414 is stored in the stored time value field, step 1224. After either of steps 1420, 1422, or 1424, the clock monitor is initialized, step 1426, according to the method depicted in FIG. 15.

Figure 16:
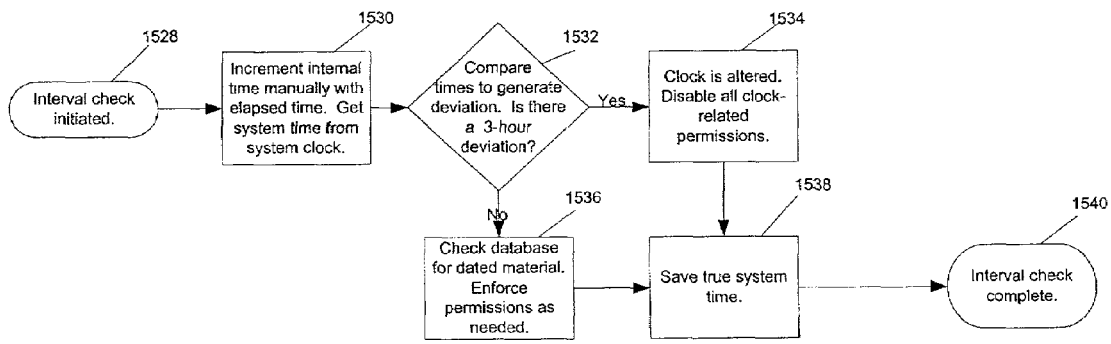
FIG. 16 is a flow diagram of a method for monitoring alterations or modifications of a system clock by checking system clock values at predetermined tracking intervals.

FIG. 16 shows a method according to one embodiment of the invention wherein, after the clock monitor is initialized, the system clock is checked at predetermined tracking intervals to verify the integrity of the system clock. The interval check is initiated in step 1528. An internal clock increments the current time value from step 1414 using the speed of the system clock and tracks a true system time. The true system time is the stored time value plus an internal elapsed time measured from the time the clock monitor was initialized. The internal elapsed time is preferably stored in the permissions database. At a predetermined tracking interval, the clock monitor reads the time value of the system clock, step 1530, and compares it to the true system time kept by the internal clock, step 1532. The predetermined tracking interval can be any time value but, preferably, is in the range of zero to sixty seconds. Most preferably, the predetermined tracking interval is one minute. Based on the comparison between the time value of the system clock, as read in step 1530, and the true system time, the clock monitor generates a time deviation, also in step 1532. The time deviation is compared against an acceptable deviation. The acceptable deviation is preferably predetermined and may be any value of time, such as, for example, a value of time within the range of zero seconds to three hours. Most preferably, the acceptable deviation is three hours.

If the time deviation is outside the acceptable deviation, the clock monitor concludes that the system clock value has been altered and disables all clock-related permissions, step 1534. If the time deviation is within the acceptable deviation, the clock monitor enforces the clock-related permissions, step 1536. In step 1538, the true system time is stored, preferably in the permissions database and the interval check is completed, step 1540.

In one embodiment, the steps of FIG. 16 are generally repeated if the clock-related permissions are disabled in step 1534, or in step 1422 of FIG. 15. If the time deviation generated in this iteration of the steps in FIG. 16 is within the acceptable deviation, the clock-related permissions are reenabled, permissions are enforced, as needed, the true system time is stored, preferably in the stored time value field of the permissions database, and the time value read from the system clock is stored in a last known good system time field in the permissions database.

In another embodiment, when the computer shuts down, the true system time is compared to the system clock value. If the system clock value is within the accepted deviation, the system clock value is stored in the stored time value field. This enables relatively small deviations to be accounted for and stored.

Another protection mechanism is port blocking. In computer systems, processes may access many system resources, such as serial ports or connections to the Internet. In a situation in which secured data is being accessed by a non-secured application, a means must be developed by which the non-secured application can be restricted from performing operations which might compromise the security of the data.

It is known to open secure data in a system which is completely isolated from outside communications, which has no connection to means by which an unsecured application may, by accident or sabotage, compromise the secured data. It is also known to open secure data with secure applications, which are known to be free from the risk of accident or sabotage that would compromise the secured data. These solutions prevent the use of popular software applications to open secured data, or the use of a computer which is not disconnected from outside communications, and thereby are limited in their usefulness.

The embodiment disclosed prohibits certain processes from utilizing the port resources of the computer on which they are running. These may be secured processes for example, ones which have opened secure data. In a preferred embodiment of the invention, the status of a process as secured is determined by the processes presence on a list of secured processes.

Figure 17:
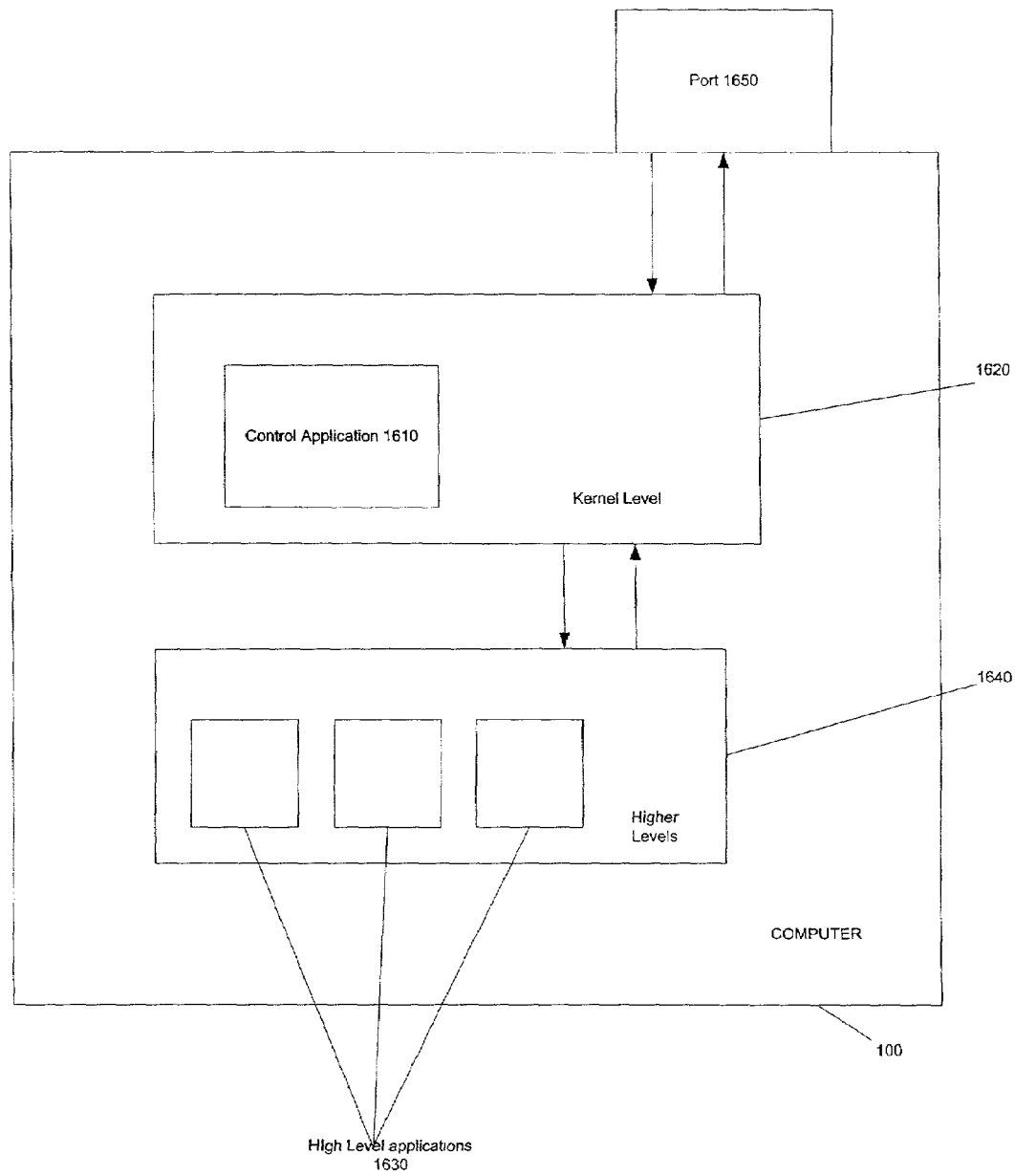
FIG. 17 is an schematic diagram of a computer system operating according to an illustrative embodiment of the port blocking method of the invention.

In a preferred embodiment, as shown in FIG. 17, in a computer 1600, a control application 1610 runs on the kernel (ring 0) level 1620 and applications 1630 run on higher levels 1640. When applications request access to port 1650, control application 1610 monitors and handles these access requests.

Figure 18:
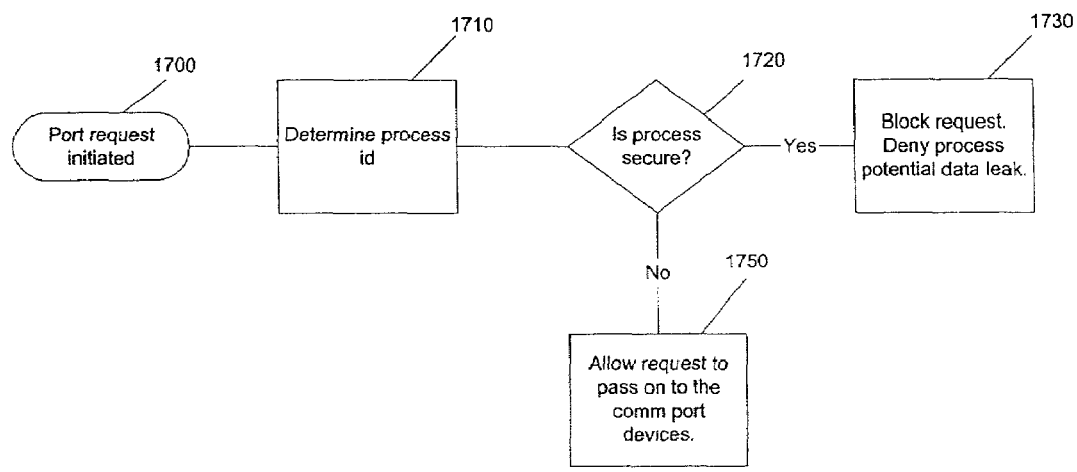
FIG. 18 is a flow chart of a port request in a computer system operating according to an illustrative embodiment of the port blocking method of the invention.

As shown in FIG. 18, in some computer systems, for example, Microsoft Windows NT and Windows 2000 operating systems, the port monitoring is able to intercept all port-related calls. When a port request is initiated 1700, control application (1610 in FIG. 17) intercepts that request, and determines the process id 1710. The control application (1610 in FIG. 17) in a preferred embodiment accesses a list of processes that are not allowed to open a port. The process id is used to determine whether the process is secure (not allowed to open a port) 1720. If it is secure, the request is blocked at 1730. If it is not secure, then the request is passed on to the port 1750.

Figure 19A:
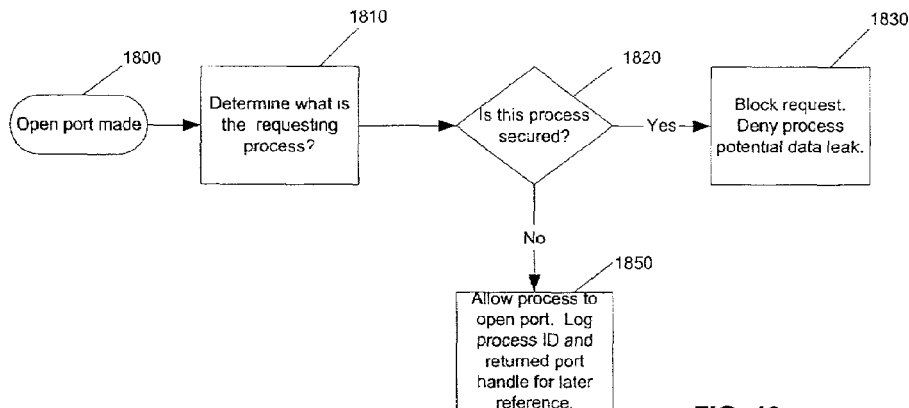
FIG. 19(a) is a flow chart of a port open request in a computer system operating according to an illustrative embodiment of the port blocking method of the invention.
Figure 19B:
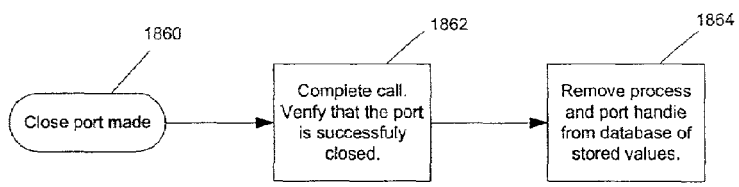
FIG. 19(b) is a flow chart of a port close request in a computer system operating according to an illustrative embodiment of the port blocking method of the invention.
Figure 19C:
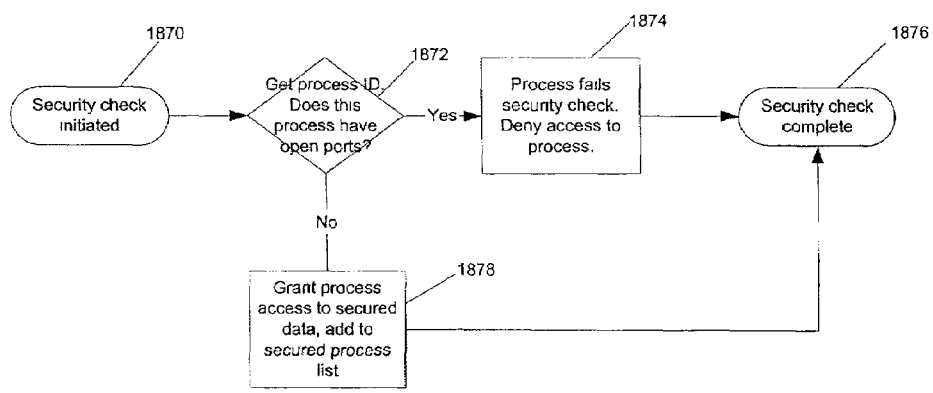
FIG. 19(c) is a flow chart of a security check in a computer system operating according to an illustrative embodiment of the port blocking method of the invention.

As shown in FIG. 19(*a*), in some computer systems, for example, Microsoft Windows 95 and 98 operating systems, the port monitoring is able to intercept only open and close calls. In order to ensure that a process which has access to a port does not then become a secure process, a check must be performed on any process which is to become secure. When an open port request is initiated 1800, control application (1610 in FIG. 17) intercepts that request, and determines the process id 1810. The control application (1610 in FIG. 17) in a preferred embodiment accesses a list of processes that are not allowed to open a port. The process id is used to determine whether the process is secure (not allowed to open a port) 1820. If it is secure, the request is blocked at 1830. If it is not secure, then the request is passed on to the port and the process ID and port handle are tracked 1850.

As shown in FIG. 19(*b*), when a close port request is initiated 1860, control application (1610 in FIG. 17) intercepts that request, and completes the call 1862. Then the process ID and port handle is removed from the database of tracked open ports 1864.

In addition to these operations on open port and close port requests, as shown in FIG. 19(*c*), when a process undergoes the security check which determines whether it will be secured, 1870, its process id is checked against the database of tracked open ports 1872. If the process has open ports, the process may not be made secure and the security check fails 1874, and the security check is completed 1876. If the process does not have open ports it will pass the security check and the process id will be added to the list of secured processes 1878.

A further illustrative embodiment of the invention is directed to a port blocking system wherein certain processes are restricted from using a port, according to the methods provided herein. Further disclosed is a secured data transmission system having a port blocking component to prohibit certain processes from using a port according to the methods provided herein. Still further disclosed is a computer-readable medium programmed to block port use according to the methods provided herein. Still further disclosed is a computer configured to include a port blocking system to block certain processes from using a port according to the methods provided herein.

Another protection mechanism similar to port blocking is network/TDI blocking.

The embodiment disclosed prohibits certain processes from utilizing the network resources of the computer on which they are running. These may be secured processes for example, ones which have opened secure data. In a preferred embodiment of the invention, the status of a process as secured is determined by the processes presence on a list of secured processes.

Figure 20:
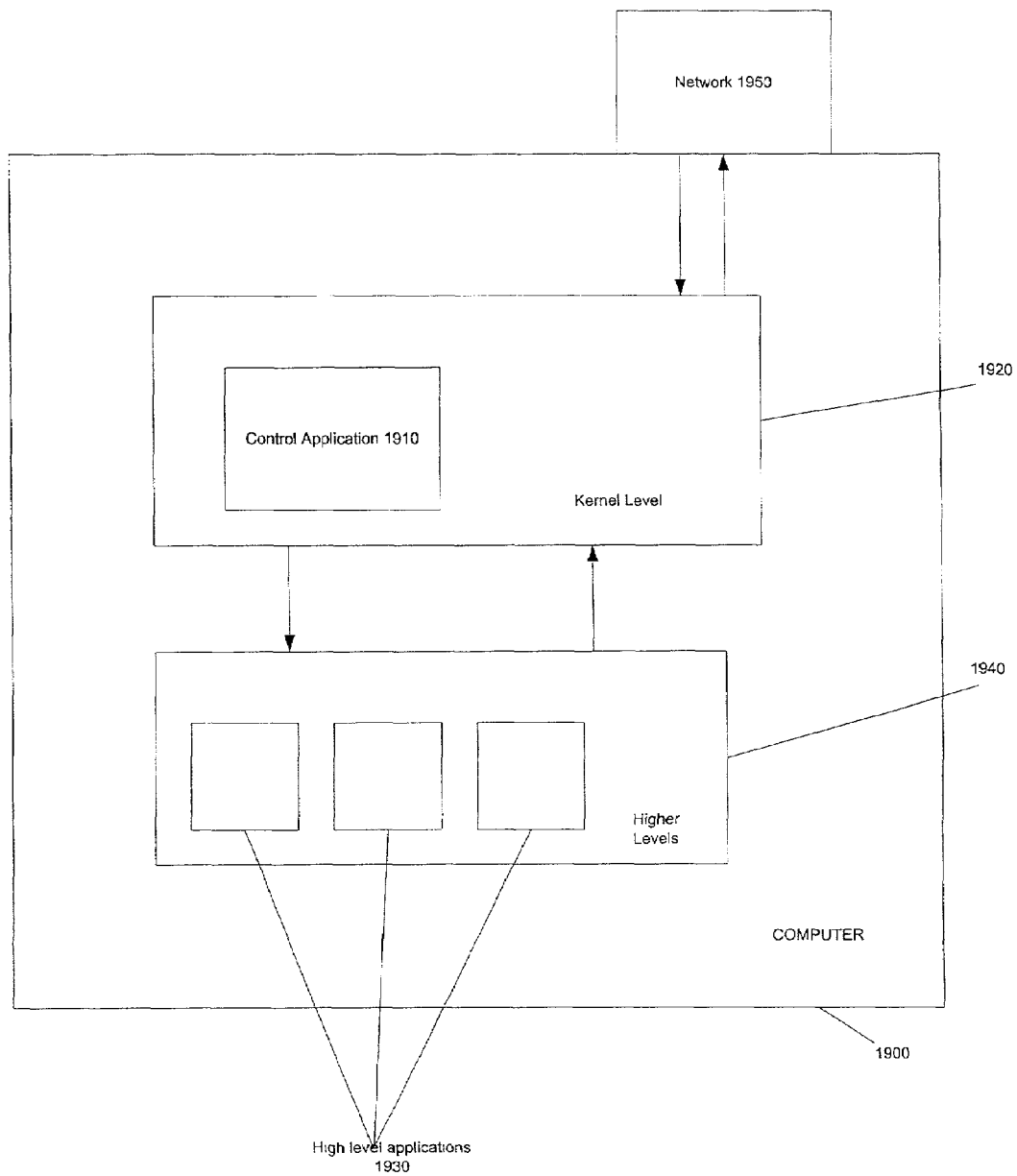
FIG. 20 is an schematic diagram of a computer system operating according to an illustrative embodiment of the network blocking method of the invention.

In a preferred embodiment, as shown in FIG. 20, in a computer 1900, a control application 1910 runs on the kernel (ring 0) level 1920 and applications 1930 run on higher levels 1940. When applications request access to network TDI interface 1950, control application 1910 monitors and handles these access requests.

Figure 21:
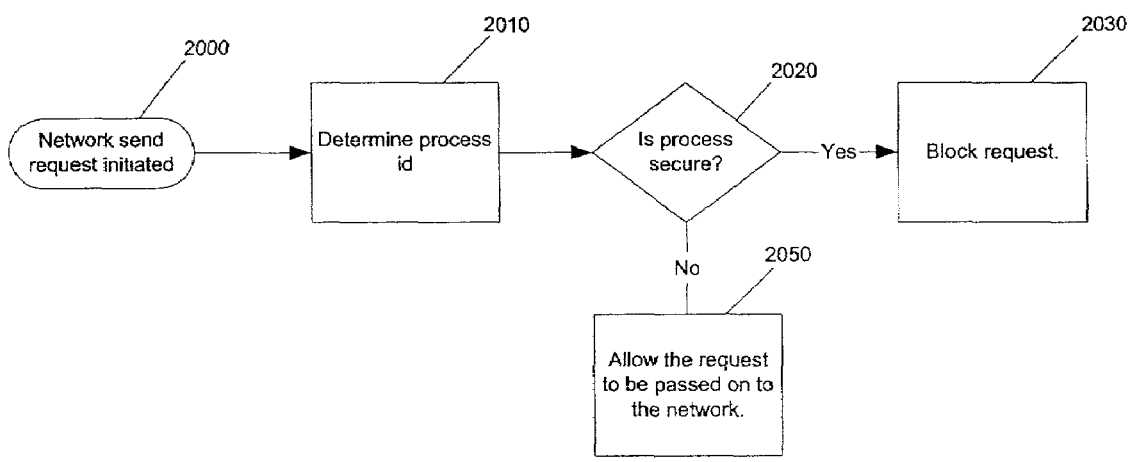
FIG. 21 is a flow chart of a network request in a computer system operating according to an illustrative embodiment of the network blocking method of the invention.

As shown in FIG. 21, network blocking is accomplished by not permitting a send request to be processed for secure applications. When a send request is initiated 2000, control application (1910 in FIG. 20) intercepts that request, and determines the process id 2010. The control application (1910 in FIG. 20) in a preferred embodiment accesses a list of processes that are not allowed to access the network. The process id is used to determine whether the process is secure (not allowed to access the network) 2020. If it is secure, the request is blocked at 2030. If it is not secure, then the request is passed on to the network 2050.

A further illustrative embodiment of the invention is directed to a network blocking system wherein certain processes are restricted from accessing a network, according to the methods provided herein. Further disclosed is a secured data transmission system having a network blocking component to prohibit certain processes from accessing a network according to the methods provided herein. Still further disclosed is a computer-readable medium programmed to block network use according to the methods provided herein. Still further disclosed is a computer configured to include a network blocking system to block certain processes from accessing a network according to the methods provided herein.

Figure 22:
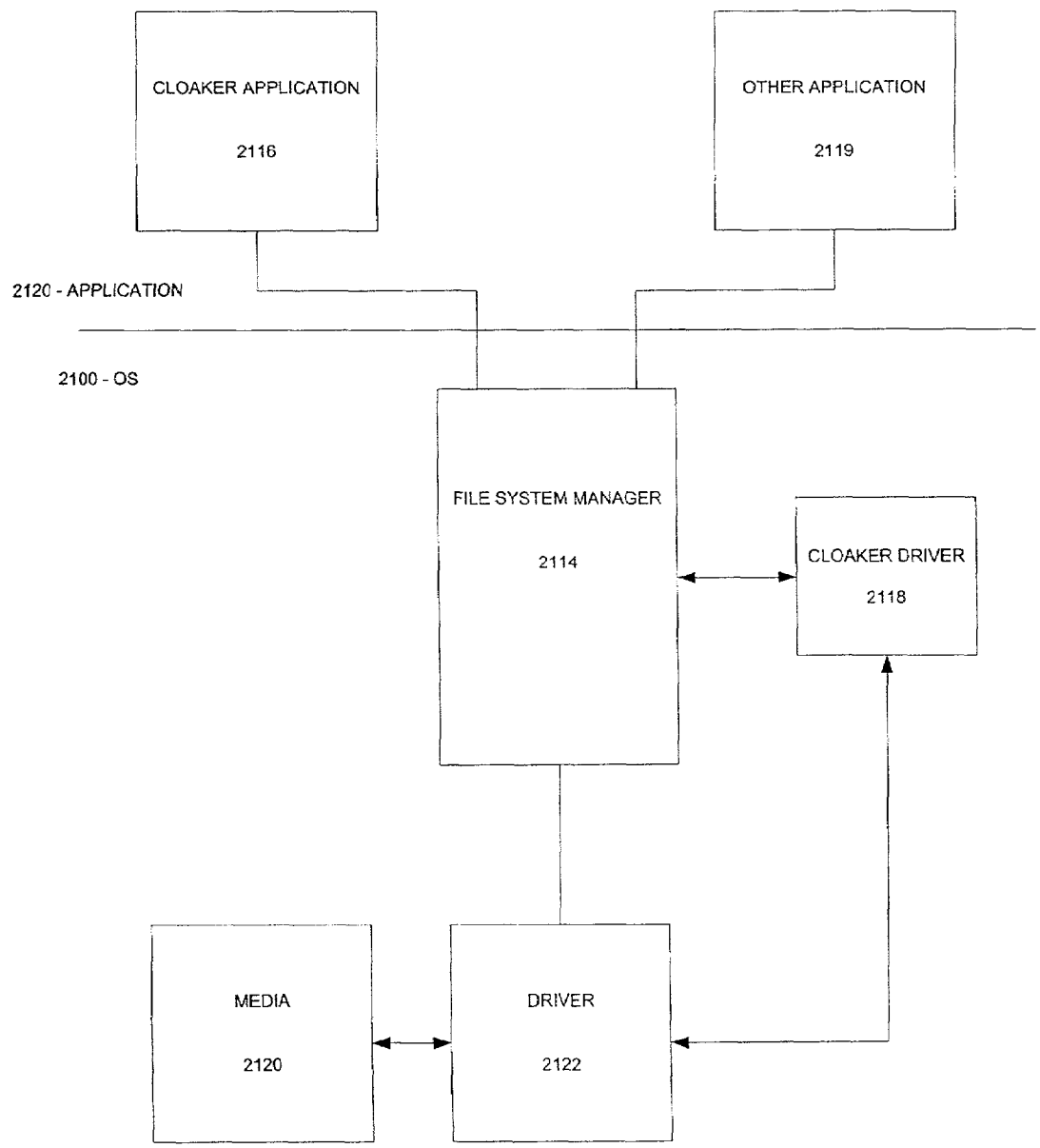
FIG. 22 is a diagram of the cloaker driver inserted to intercept calls from the file system in accordance with the principles of the invention.

Another protection mechanism relates to hiding or cloaking files. FIG. 22 is a block diagram of one embodiment of a system for hiding or cloaking files by monitoring file system calls. As shown, the system includes an operating system (OS) layer 2210 and an application layer 2112. In one implementation, operating system layer 2100 is WINDOWS 95 although Windows 98, NT, 2000, a Unix based system or indeed any operating system which allows entry points into the file system control may also utilize the same principles of the various embodiments of the invention. Operating system 2100 includes a file system 2114 (e.g., an installable file system, IFS) that handles calls from applications in application layer 2112. In general, device drivers become a device in operating system 2110, and applications in application layer 2112 use devices to perform tasks through a defined application program interface (API). In accordance with the principles of the invention, high level cloaker application 2116 is associated with a cloaker driver 2118. For example, cloaker application 2116 and cloaker driver 2118 can be components delivered by one software vendor and can cooperate to perform functions, such as a hiding or cloaking files as described below.

Cloaker driver 2118 operates to monitor and react to calls passing through file system 2114. In addition to cloaker application 2116, other high level applications 2119 can be present in application layer 2112 and can send calls through file system 2114. Such calls may originate, for example, from a word processing or other applications or from within the Windows file manager environment. File system calls of interest here are associated with commands "open", "find first", "find next", "delete", and "rename". For ease of description, these commands are also sometimes simply referred to as calls. Generally, operations of interest include any operations which are fundamental in opening, finding remaining or deleting a file. Thus, by way of example, but not by way of limitation, "read", "write", and "get attributes" calls are subsumed for purposes of the embodiment of the invention within the "open" call, since the "open" call will be generated with each of these calls. In a similar manner, for purposes of illustration and not by way of limitation, the "directory" call is subsumed within the "find first" and "find next" calls. Each media device 2120 (e.g., hard disk drive, ZIP drive, floppy drive, tape drive, writeable CD ROM drive or other fixed or removable storage media) generally has associated with it a low level driver 2122 that handles the interface with media device 2120.

In operation, croaker or monitor driver 2118 obtains and analyzes each call passing through file system 2114. Cloaker driver 2118 can gain access to file system calls, for example, by plugging into file system 2114 as a device driver without actually being associated with a particular device. Using this access, cloaker driver 2118 can assess whether the call originated from cloaker application 2116 or other applications 2119 and whether the call is a call of interest, e.g., an "open", "find first", "find next", "delete", or "rename". Cloaker driver 2118 can also decide whether to pass the call on to driver 2122 associated with media device 2120 or to reject or abort the call or to change the return variable or generate a return variable without passing the call down to subsequent layers. By such operations, the cloaker driver 2118 is able to hide files from the user in such a manner that they are completely invisible and will not be found from any application or Windows system command.

The cloaker application 2116 is implemented to permit the user to cloak or hide files. Running the cloaker application permits the user to select desired files for cloaking and then to apply the cloaking operation to such files which is done by passing the selected file names to the cloaker driver 2118 so that they may be added to a lookup table or database within the cloaker driver 2118. Preferably, the user is asked to select a password prior to initiating the cloaking process and only the use of this password permits the user to de-cloak the previously cloaked files. Most preferably, the password would be different from the Windows user password. In this manner two or more users could use the same computer hardware but have access to, and indeed even know of the existence of, different subsets of the stored files. User1 could keep confidential files hidden on the system from User2 and visa versa. Not only are the contents of the files hidden, but the very existence of the files are hidden since, the cloaked files, in one embodiment of the invention, will not show up in any directory listing nor can they be accessed in any manner by the operating system until they are de-cloaked by the user who must first enter the appropriate password.

As an added safety precaution, the files cloaked can be encrypted automatically after (or before) the file names are added to the cloaker driver's lookup table or database. After entering of the correct password, the encrypted file is decrypted upon file opening and encrypted again upon file closing. The cloaked file will remain encrypted when closed until it is no longer desired to be cloaked. When the authorized user removes the cloaking using the cloaker application 2116, as performed by removing the file name from the cloaker driver lookup table or database, the file will be automatically decrypted. There are many ways in which the cloaker application and cloaker driver may affect the encryption and decryption processes and the above description is merely one implementation. The basic usefulness of the encryption results from someone booting the system from a floppy disc so as to run the system on a different operating system which would mean that the cloaker driver program would not be executing. Encrypting the files would thus prevent unauthorized access to the file by rendering their content difficult if not impossible to decipher in the floppy boot situation.

Figure 23:
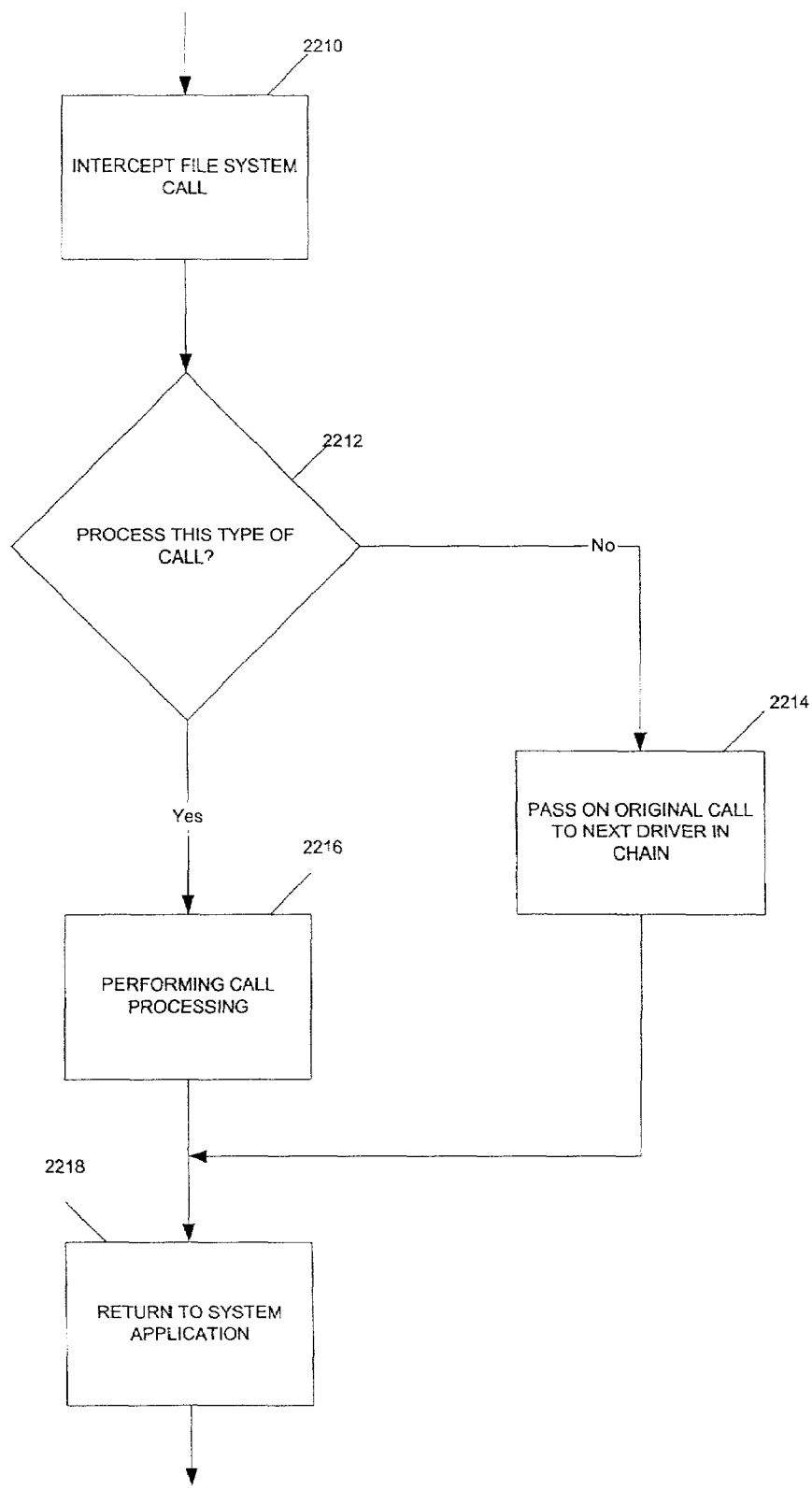
FIG. 23 is a flowchart of an embodiment of the invention in which call processing is performed on a selected type of call coming down the chain from the file system manager and returns coming up the chain to the file system manager.
Figures 26A, 26B:
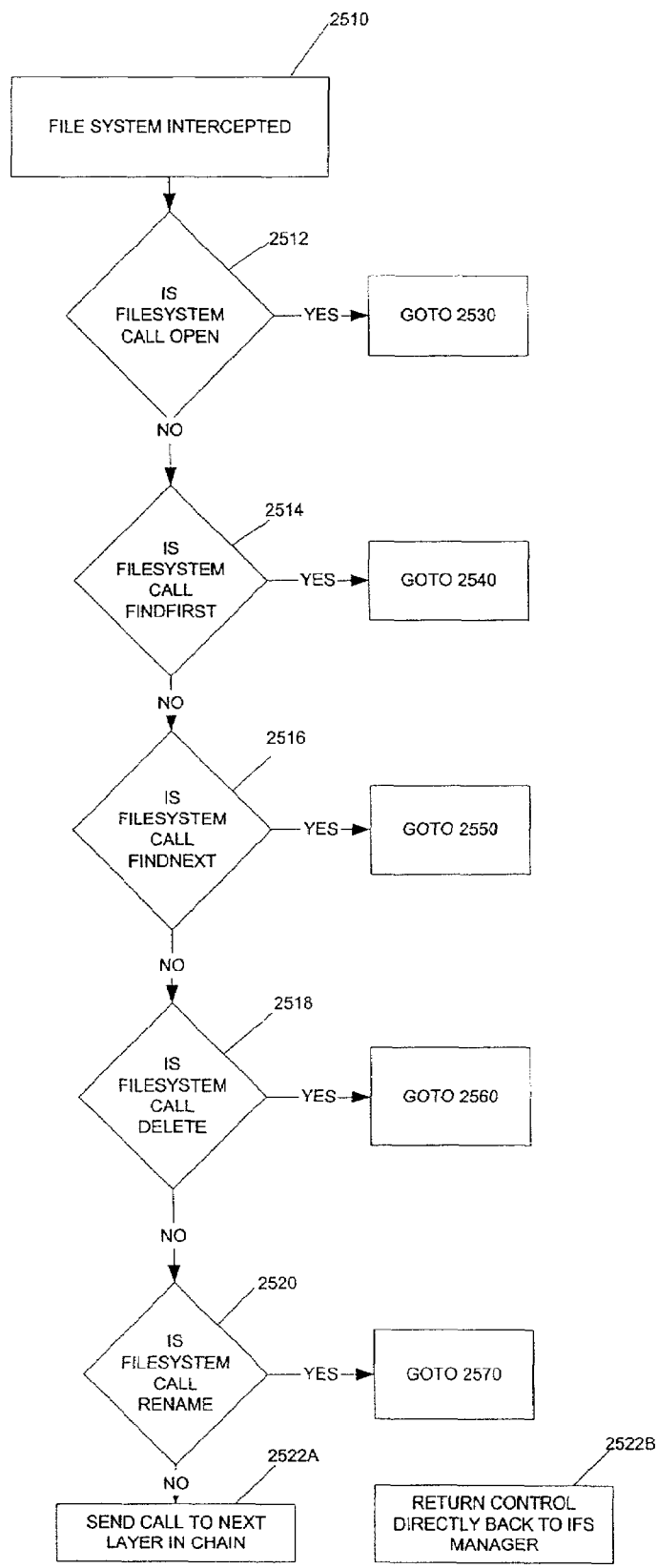
FIGS. 26A-26G are flowcharts of the processing call 5 and return routines of FIG. 2.
Figure 26C:
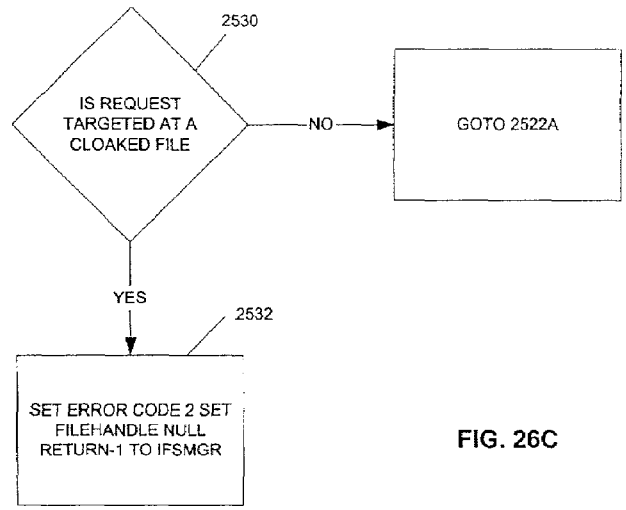
Figure 26D:
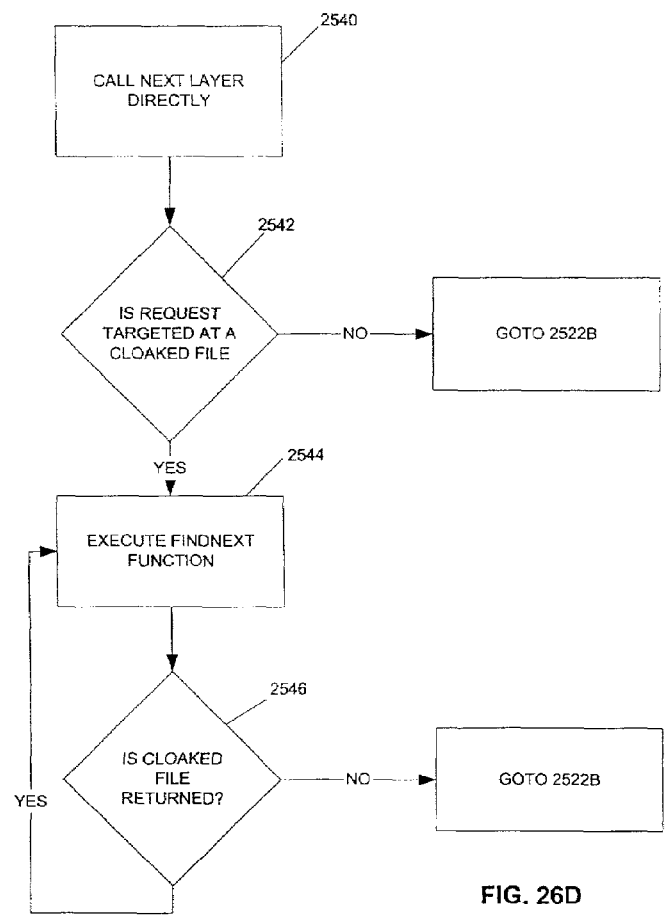
Figure 26E:
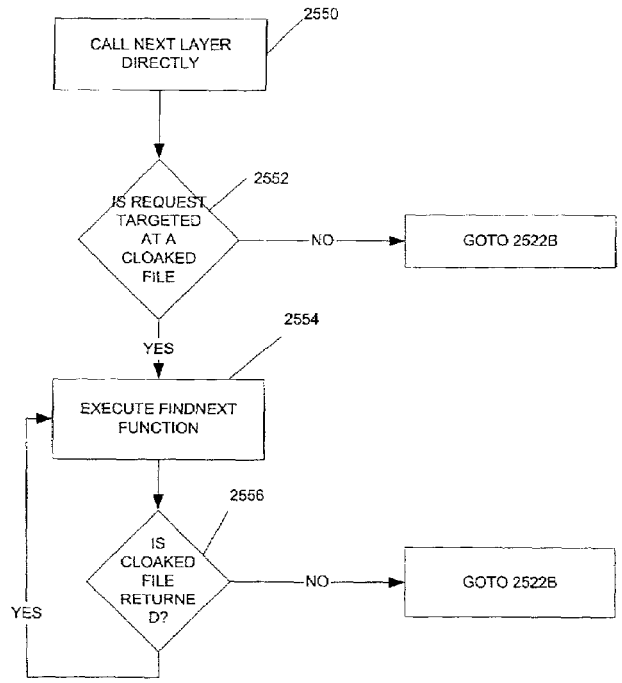
Figure 26F:
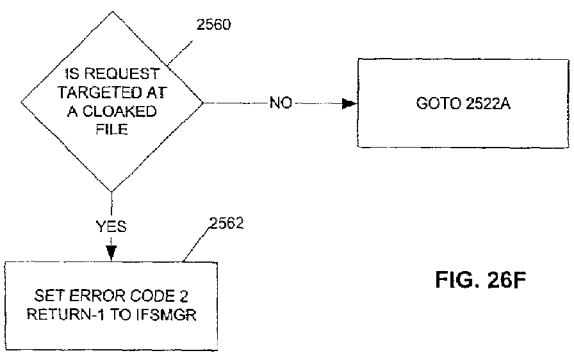
Figure 26G:
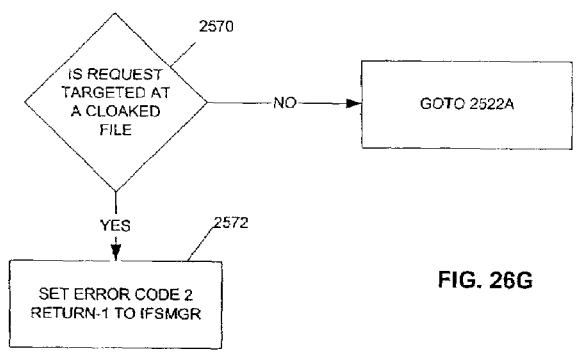

FIG. 23 is a flowchart of an embodiment of a method according to the present invention for monitoring file system calls to a file system structure of an operating system and for controlling the original call or returned variables. The method of FIG. 23 is implemented by the virtual cloaker software driver 2118 with the purpose of hiding or cloaking files that may be stored on media device 2220. In one embodiment, the method of FIG. 23 can be implemented using a vendor supplied driver (VSD) executing within the installable file system (IFS) of WINDOWS 95.

As shown in FIG. 23, in step 2210, a file system call is intercepted. In general, the file system call is intended to perform some function with respect to data stored on a media device 2220 but is intercepted before being able to complete that function. In step 2212 of FIG. 23, it is determined whether the type of call intercepted is one that should be processed. Generally, the calls of interest would consist of any calls that could find or identify a file which the user or a previous user cloaked. By cloaking, a file is rendered invisible from both the user's perspective and the operating system's perspective and can't be accessed, changed, modified, deleted, listed or even found by the operating system. Thus, once a file is cloaked, calls of interest would include "open", "find first", "find next", "delete", and "rename". Generally, if a file is cloaked, the call attempting to perform some action with reference to the cloaked file or its returned variable is controlled so as to hide or cloak the file. Such control may include generating a return variable such as an error code or other actions as explained below in relation to FIGS. 26A-26G. If such a call is not identified in step 2212, then in step 2214, the original call is passed on through the file system. If the call should be processed, i.e., it is one of the calls of interest, then in step 2216, some type of call processing is performed to ensure that the cloaked file is not made known to the user. The particular type of processing is dependent upon the type of call and is explained more fully in relation to FIG. 26A-26G.

According to the present invention, the call processing of step 2216 can be accomplished transparently both to the user and to the calling system application. After the call processing, the call is returned, in step 2218, to the calling system application as for example, application 2119 in FIG. 22.

FIG. 24 is a diagram of file system logical layers of the WINDOWS 95 installable file system (IFS) 2114. As shown in FIG. 3, the installable file system is made up.;6f thirty two logical layers, each containing one or more virtual devices through which block-device requests pass. For typical hardware, most of the logical layers are empty. For example, for hard disk drives, a file system request (or call) will usually only pass through about five virtual devices on the way to the hardware.

FIG. 25 is a diagram of a typical file system request chain or path within the file system logical layers of the WINDOWS 95 operating system. As shown in FIG. 25, a typical path begins at the IFS manager 2422 and moves to the file system driver 2424. The request then moves to a type specific driver 2426 and, in this case, to the vendor supplied cloaker driver 2118. After vendor supplied cloaker driver 2118, the request falls to a port driver 2122 and to the media drive 2120 (e.g., hard drive or other storage device). After the request is completed at the physical level, the request returns up the chain to the calling system application.

In FIG. 24, the numbers on the lefthand side represent the layers of abstraction with the smallest numbers representing higher layers of abstraction. The topmost layer is the entry point to the file system. Higher numbers are closer to the hardware, and the highest number (bottom layer) represents the virtual devices that access the hardware directly. An input/output (I/O) supervisor (IOS) manages requests as they pass through the file system hierarchy. Each virtual device on the chain can select requests based on the logical or physical drive to which the request is directed. The devices can also view the result of a request as it passes back up the chain to the application. Furthermore, the virtual device drivers (VxDs) on the chain can service requests themselves and not pass them to lower levels, or they can generate requests themselves.

Processes can occur at each level of the installable file system, but most block devices do not require an entry at each level in the chain. At the top of the logical layer structure, the IFS manager layer manages high-level I/O requests from applications. It takes a call directed at a specific logical drive and passes it down the correct call-down chain to the appropriate volume tracker, file system driver (FSD), and so on. Volume trackers work with groups of devices with identical removability rules. For example, a CD-ROM volume tracker ensures that a CD with a file system on it is in the drive before it will allow any requests to pass through to lower layers. File system drivers (FSDs) work with all devices of a particular type, such-as hard disks or CD-ROM devices. They take incoming logical requests generated by the IFS manager and translate them into physical requests to pass to lower levels. In addition, FSDs can initiate logical error recovery for devices such as disks.

Type specific drivers (TSDs) work with all devices of a particular type. They take a logical request generated by an FSD and translate it into a physical sector request. They generally reside in the same layer as their corresponding FSDs, but are lower in the chain. SCSI-izers are next in the chain and are used because SCSI devices require more complex request packets than other devices such as the more prevalent IDE/ESDI devices. SCSI-izers take a general physical request and create a SCSI Request Block. (SRB) that contains detailed, SCSI-specific information about the request such as the Logical Unit Number (LUN) and Target (SCSI targets can have up to seven LUNs hanging off them).

Vendor supplied drivers (VSDs) provide a special layer for third-party developers under WINDOWS 95. Consequently, the VSD layer functionality is determined by the VSD writer. conventional uses include: block-device monitors, low-level secondary disk caches (caching in flash memory, for example), data encryption, and RAID disk management.

SCSI port drivers take incoming requests and determine which SCSI miniport driver should field them. Multiple SCSI types can be loaded onto the same system, each of which may require a custom SCSI miniport driver. The SCSI port driver is also in charge of initializing the miniport drivers. SCSI miniport drivers (MPDs) are the hardware drivers for SCSI devices. They manage the interrupt and I/O port-level interaction with the device to carry out requests from above. They can also perform adapter-specific error recovery.

Port drivers (PDRs) (for non-SCSI hardware) carry out analogous functions as the SCSI port and miniport' drivers. They provide 32-bit disk access interacting directly with the hardware to perform I/O. The real mode mapper (RMM) is used in certain situations where WINDOWS 95 can not provide a port drive. With the introduction of plug-and-play BIDS, and by including many hardware specific port drivers, WINDOWS 95 can usually provide 32-bit access for most disk hardware. However, Windows 95 might be run on an older personal computer with esoteric hardware, so it must make allowances for the case where it can not provide a port driver to handle disk I/O in protected mode. A system might also use real-mode disk driver software that provides functionality not available in the WINDOWS 95 protected mode counterpart. For these situations, the last entry on the chain of protected mode virtual device drivers is an RMM instead of a port driver. RMMs call down to a real mode driver to perform hardware I/O and return results up the file system chain. Real mode drivers are hardware drivers required by the hardware or software configuration of a particular system. However, use of real mode drivers is discouraged 10 because performance can suffer (due to the overhead of transitions from protected to real mode and slower execution in real mode), but makes allowances for them for flexibility and backward compatibility.

In general, the upper layers of the file system structure are written by MICROSOFT as part of WINDOWS 95, while the lower layers are provided by disk drive manufacturers. Consequently, the layer typically used for development by third-party developers is the virtual supplies driver (VSD) layer. As mentioned above, according to the present invention, a VSD can be used to intercept file system calls and perform call processing so as to ensure that any cloaked file is hidden from the user.

In one implementation of the present invention, a 25 vendor supplied driver is used to intercept file system "open", "find first", "find next", "delete", and "rename" calls to as to hide cloaked files from the user. Interception of the these calls occurs in step 2210 of FIG. 23. The above calls are then identified, in step 2212, as ones for which call processing will be performed per step 2216.

FIGS. 26A-26G are flowcharts of one embodiment of call interception and processing applicable to processing the calls and returns of the "open", "find first", "find next", "delete", and "rename" calls. File system call interception is done in step 2510. After call interception, the call is evaluated to see if it is the type of call of interest. This evaluation is performed in steps 2512 through 2520. In step 2512, the cloaker driver determines if the call is an "open" call; in step 2514 if the call is a "find first" call; in step 2516 if the call is a "find next" call; in step 2518 if the call is a "delete" call; and in step 2520 if the call is a "rename" call. Any "no" determination moves down the flowchart 2512-2520. If none of the calls are of a type of interest, the call is forwarded to the next layer in step 2522A, and the call is thus passed on without modification by the cloaker driver 2118.

If in step 2512, the call is determined to be the "open" call, the file name is examined to determine if the file is cloaked. The cloaker driver 18 looks up the file name in a lookup table or database to see if the file has been previously cloaked. If the file is not cloaked, the cloaker driver 18 sends the call to the next layer in step 2522A. If the file is cloaked, the cloaker driver 2118 generates return variable in step 2532 which passes to the file system manager and ultimately indicates to the user that the file is not found or some error has taken place. For example, the cloaker driver 2118 can sets the error code to a value of 2 indicating a "file not found" message and sets the return variable to "−1" to indicate a failure of the call execution. As an added safeguard, the cloaker driver 2118 sets the file handle to NULL which indicates to the IFS manager that the handle does not exist. The net result of step 2532 is not only to prevent the file from opening, but to indicate to the user that the file itself is not existent in the system. Thus, assuming the user had a suspicion that a certain file, say "SECRET.doc", existed in the system, any attempt to access the file using the "open" command is defeated by returning the null handle and error messages per step 2532.

Step 2514 examines the "find first" call. If this call is found, it is passed down the system layers and upon return, the retrieved file name is examined in step 2542 to see if the request has targeted a cloaked file. If it is not cloaked, the driver proceeds to step 2522B and passes the call directly up the chain to the IFS manager. If in step 2542 the file is a cloaked file, the cloaker driver 2118 proceeds to step 2544 and executes a "find next" function. Upon return in step 2546, the return variables are examined to see again if the targeted file is cloaked. If it is not cloaked, the program proceeds to step 2522B as before. If the targeted file is cloaked, the program loops back to step 2544 to again execute another "find next" function. In this manner, the name and even the existence of the cloaked file is kept hidden from the user, and only the first found non-cloaked file will be displayed to the user.

A similar procedure as outlined above is performed for the "find next" call. Thus, if the "find next" call is identified in step 2516, the call is passed down the chain in step 2550 to return the file name, and if the name examined in step 2552 corresponds to a cloaked file, another "find next" call is passed down the chain in step 2554 without permitting the return of the first file name to the IFS manager. The return of this "find next" function is examined in step 2556, and if it does not point to a cloaked file, the program proceeds to step 2522B to pass the return to the IFS manager. If the return identifies a cloaked file in step 2556, the program loops again to step 2554 to generate yet another "find next" function. In this manner, the find next function never identifies to the OS the identity of a cloaked file.

The "find first" and "find next" calls are typically 5 used to list directories and thus the procedures outlined in the flowcharts effectively hides any cloaked files by preventing them from ever being displayed on a directory listing.

Step 2518 examines the "delete" call. If this call is found, a determination is made in step 2560 as to whether or not the targeted file is cloaked. If the file is not cloaked, step 2522A is performed to pass the call down to the next layer. If the targeted file is cloaked, an error message "file not found" is displayed by setting the error code to 2, by setting the return code to −1 indicate a failure and returning control back to the file system manager. In this manner, the user is not able to delete the targeted file and indeed, the system acts as if the file doesn't even exist—exactly the desired outcome to cloak a file.

In step 2520, the "rename" call is examined. If this call is found, the cloaker driver 2118 proceeds to step 2570 to determine if the targeted file is cloaked. If the file is not cloaked, the call is passed down to the next layer in step 2522A. If the file is cloaked, a return variable is generated in step M to set the error code to 2 and to return −1 as done in set 2562.

Is should be understood that the cloaker operations are performed in real-time whenever the user initiates a procedure that results in one of the "open", "find first", "find next", "delete", and "rename" calls being generated.

The monitoring of the file calls and returns as indicated above is performed by the cloaker driver 2118. Generally, the files and returns are part of an "IFS request packet" with the request traveling down from the IFS manager to the lower level drivers and the return or return variables inserted into the packet and sent up the chain toward the IFS manager from the lower level drivers.

Extending the principles illustrated in FIGS. 26A-26G to the Windows NT environment is straightforward for the "open", "delete", and "rename" calls. For "find first" and "find next" however, more processing is required in order to manipulate the index buffers which are returned describing the list of files in the directories. The NTFS file system acts in a transactional database manner and indexes its files for quick look-up and display purposes. Such indexes are prefabricated. Thus, to cloak files, the files must be removed from the memory segments once the index runs are returned to the cloaker driver.

The embodiment of the invention-shown in FIGS. 26A-26G essentially prevents the user of the operating system from learning of the very existence of any files which are cloaked. However, in some applications, it may be desirable to permit the user to list the cloaked file in the directory but to otherwise not be able to access the files. The file is said to be access-prohibited. In essence, the user is denied effective access to the file in that the user can only learn of existence of the file by viewing the file name in a directory listing. In this embodiment, the directory listing is not password protected, but access beyond viewing the file is password protected so as to permit only the person with access authorization to access the files. The cloaked file in this embodiment is preferably encrypted to ensure that the file content remains unavailable. Such an embodiment has application in permitting anyone to screen computers or memory devices searching for sensitive files without fearing that the sensitive files will be accessible to the screening operator.

The implementation of the above embodiment of the invention merely requires one to remove the find open and find next calls in steps 2514 and 2516 respectively. In this manner directory listing will be possible but open, delete and rename processes will not be permitted.

Yet another embodiment of the invention utilizes permissions or restrictions applicable to a given process or application and to selected procedures within the application. The file is said to be use-restricted. For example, one may utilize this embodiment of the invention to permit a word processing program to read a file and otherwise edit and copy a file but not to delete a file.

In this embodiment, the monitoring system of FIGS. 26A-26G would be modified to remove all call monitoring except for the delete call monitoring in steps 2518, 2560, 2522A and 2562. An added logical inquiry would determine if the monitored call or request packet contained a designated word processing application such as Word. If the cloaker driver determined that the requesting application was Word, and that a delete call was send from the file system manager, then the sequence would branch to the delete monitoring steps 2518, 2560, 2522A and 2562. In this manner, the embodiment of the invention does not cloak a file but rather restricts use of the file at least as to one feature the would normally be available in a given application.

The cloaker application 2116 permits the user to select (de-select) which files are to be stored in (removed from) the database or lookup table of the croaker driver 2118. The cloaker application 2116 also presents a user interface for insertion of user passwords, encryption options an other types of permissions applicable in the cloaked, access-prohibited and use-restricted modes of operation. The cloaker application initially list all the files in a selected directory and permits the user to highlight those files which are desired to be cloaked. The highlighting effectively selects the files to be cloaked. By entering the selection (pressing enter or an "o.k." command in a dialog box) the user causes the selected files to be stored in the cloaker driver database or lookup table. The user preferably is required to enter a password so that the user will be able to de-cloak the file at a later time or add new files to be cloaked. The password may be entered initially but may alternatively be entered after file selection, but at any rate is entered before the execution of the driver program which monitors the calls from the file system manager. To de-cloak-files, the user re-enters her password which is recognized by the cloaker application which then extracts the file names listed in the cloaker driver database (or lookup table) so they may be displayed preferably during a normal list directory command. Files which are cloaked are distinguished in the directory listing as by highlighting or other means so the user will know which files to de-select thereby removing them from the database or lookup table and thus de-cloaking them. At the same time other files may be selected for cloaking, access prohibition and/or use-restriction.

The modes of cloaking, access prohibition and use-restriction may be selected for each file using dialog boxes or other inputs from the GUI of the cloaker application. The program flow executes each mode on a per file basis. Thus files A and B may be cloaked, file may be access prohibited and files D and E use restricted. Initial selections of the mode/file combinations are made by the user during a file/mode selection process using the application program. In yet another mode of operation, the files to be hidden need not be selected by the user of the operating system, but could be pre-selected by a third party vendor selling some application for installation on the operating system. The third party vendor may want to keep certain data or .exe files from being accidentally deleted by the user of the operating system and yet have these files available for access by the application. For example application X may contain files Y and Z which the vendor desires to be cloaked, i.e., rendered invisible to the operating system, except if application X desires access. In this case application X contains a cloaker driver which cloakes files Y and Z from the operating system except as to application X. This operation is essentially a use-restriction of the files Y and -Z. If application X tries to access files Y and Z, the operating system is able to provide full access and use permissions through the file manager. If the user tries to gain access of any kind outside of application X, such actions are negated and the operating system acts as if the files do not exist (i.e., they can not be found). One application other than preventing accidental deletion of a file by the user is to prohibit file copying by the user. Such application is important j,-n many applications such as the Internet distribution of audio and video content files. In this case application A can "play" the cloaked file because application A has use permissions. The user, however, is not able to otherwise manipulate the file (move, copy, rename, delete, list directory) through the file system manager of the operating system.

Of course, the cloaker driver may be utilized to give the user certain use permissions other than through application A, as for example the list directory and delete commands but prohibit other commands to prevent duplication or retransmission of the file over the Internet.

The cloaker drive of the various embodiments of the invention may be downloaded to the user via the Internet or provided to the user via CD. In the download situation, the program is stored on a server memory and downloaded in the normal course of e-commerce.

As explained above, cloaking or hiding a file prevents the file from being listed on a directory listing and otherwise prevents the operating system of a computing device from accessing the file. Thus, the file may not be opened, deleted, renamed or otherwise accessed from the file system of the computer operating system. The cloaker driver identifies calls from and returns to the file manager wherein at least of the calls and returns is associated with a specific file identification data such as the file name. This association may be a direct reference to the name in the call or return packet or an indirect reverence to pointers which in turn identify the file name or identification data so as to uniquely identify the file. In this manner, the operations to be negated (open, find first, find next, delete, and rename) may be uniquely associated with a specific file whose identification may be checked against the cloaker driver database or lookup table so as to apply the negation only to those files which are selected to be cloaked, access-prohibited or use-restricted.

The following illustrates a preferred embodiment of a packager in accordance with the invention. As indicated earlier, a packager 12 preferably operates in combination with a client or receiver 14.

A known problem with current technologies is that the author of an electronic message is unable to retain control over what happens to the message after it is transmitted across the network. For example, the recipient may forward the message to another user, print the message, store the message for later viewing, or copy the message to the clipboard. An author may not want a sensitive email or message transmitted to a third party, or a copy of the message stored or printed for future reference. However, current technologies do not completely address this need.

Some email programs allow an author to designate a message as "private." This setting limits a recipients ability to modify an original message and forward it to a third party with the appearance that the message, as modified, was transmitted by the author. However, this setting does not limit a recipient's ability to forward, copy to the clipboard, store or print the message in its original form.

There exists a need in the field of electronic and digital communications to have a method and apparatus that allows an author to set permissions on a communication which restrict the recipient's ability to use the transmitted information. Furthermore, there is also a need for method and apparatus that allows the author to insure that only the intended recipient receives the message. The current invention addresses this need by providing a method and apparatus for generating an encrypted package of data comprising a file of data, a unique identifier, and one or more permissions governing use of the file. The package may also contain the recipient's unique identifier and a client software package to be installed on the recipient's computer system upon receipt of the package.

Another method of the invention adds to the above-described method the steps of receiving the computer executable file at a client computer system having an operating system and executing the computer executable file at the client computer system. Executing the file comprises the steps of determining whether the operating system is a compatible operating system, and if so, executing a client software on the client computer system. The execution of the client software creates a client permissions database and a vault on the client computer system. After executing the client software, the method further comprises the step of determining whether the encrypted package is valid, and if so, recording the package global unique identifier in the client permissions database, extracting the file of data and the one or more permissions from the package of data, storing the file of data in the vault and storing the one or more permissions in the client permissions database. If the package is not valid, the method sets a state in the computer executable file to indicate that the package is installed.

Figure 27:
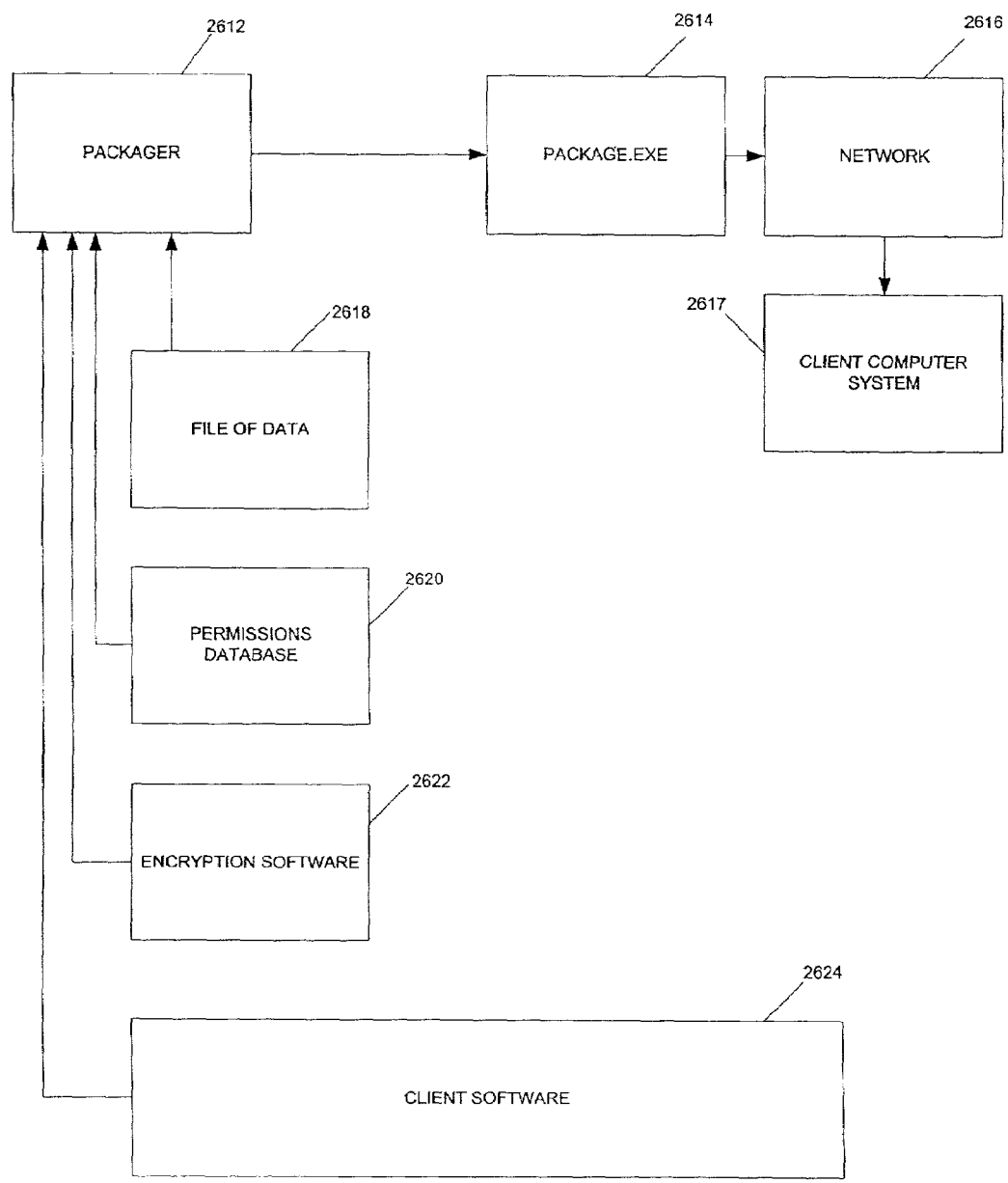
FIG. 27 is a flow diagram of a system that communicates a package of information according to an embodiment of the invention.

Referring now to FIG. 27 there is shown a block diagram of a system that communicates a package of information in accordance with a preferred embodiment of the present invention. A packager 2612 generates a computer executable file, such as "package.exe" 2614 for transmission over a network 2616 to a client computer system 2617 for access by a client. The computer executable file 2614 comprises a package of information collected by the packager 2612.

According to one embodiment of the invention, the package of information includes a file of data 2618 and a permissions database 2620. In another embodiment of the invention, the package of information further includes encryption software 2622 and, optionally but not necessarily, client software 2624. Preferably, the client software has a version designation. Packager 2612 generates a package global unique identifier (PGUID) for each package of information and includes it in the package of information. In a preferred embodiment, the package of information, including the PGUID are encrypted by encryption software 2622. The PGUID may be, for example, a string of alpha-numeric symbols.

According to a method of the invention, packager 2612 receives the file of data 2618 and the permissions database 2620. The permissions database 2620 has one or more author-configurable permissions associated with the file of data 2618 that govern use of the file of data 2618. One function of these permissions is to restrict sharing of the file of data 2618. Exemplary author-configurable permissions include access count, access time, expiration date, authorization date, clipboard permission, print permission, unlimited access permission, application permission, and a system-events permission.

The access account permission specifies the number of times a user may be allowed to access the file of data 2618. In an embodiment, one access count is defined as allowing one process on the client computer system 2617 to access the file of data 2618 for the life of the process. The access time permission specifies the total amount of time in which a client may access a file. Once a process on the client computer system 2617 opens the file of data 2618, the access time is decremented until the process terminates or, if the access time is completely exhausted before termination of the process, the process is automatically terminated.

The expiration date permission specifies a date on which the file of data will no longer be accessible. A client will have unlimited access to the file, subject to any other permissions on the file of data 2618, until the expiration date occurs. If any processes on the client computer system 2617 have the file of data 2618 open on the expiration date, the processes are automatically terminated. On the expiration date, the file content is overwritten and deleted. Preferably, the expiration date permission is also removed from the permissions data base.

The authorization date permission specifies a date on which the file of data 2618 will become accessible. Subject to other permissions on the file of data 2618, a user will not be able to access the file of data 2618 until that date has passed. All of these access permissions can be configured and enforced independently or in combination.

The clipboard permission specifies whether the client can copy the file of data 2618 or a portion of the file, such as, for example, to the Windows clipboard. The clipboard permission may also be configured to prevent the client from forwarding the file of data to another computer system. The print permission specifies whether the client can print the file of data 2618. The unlimited access permission grants the client unlimited access to the file of data 2618. Preferably, the file of data 2618 is read-only, which allows a client with unlimited access permission to view the file of data 2618 for an unlimited amount of time. However, the client will not be permitted to do anything more unless other permissions are associated with the file of data 2618, such as, for example, print permission, and clipboard permission.

The application permission determines whether one or more of a list of applications is running on the client computer system 2617 and disables access to the file of data if one of the applications is running. Alternatively, the application permission may disable access to the file of data if one of the applications is not running. The system-events permission analyzes the client computer system 2617 to determine which system-events have occurred and determines whether to permit access to the file of data 2618 based on the system-events that have occurred.

In a preferred embodiment, the packager 2612 can define a password to limit access to the package. The package of information will not be accessed until the client enters the appropriate password at the client computer system 2617. In another embodiment, the packager 2612 may receive a recipient global unique identifier (RGUID) and include it in the package of information. The RGUID identifies the client to whom the author wishes to transmit the file of data 2618 and may be manually entered into the package by the author or selected from a list of clients stored in the packager 2612.

The package of information is concatenated into the computer executable file 2614 for transmission over the network 2616 to the client computer system 2617.

Figure 28B:
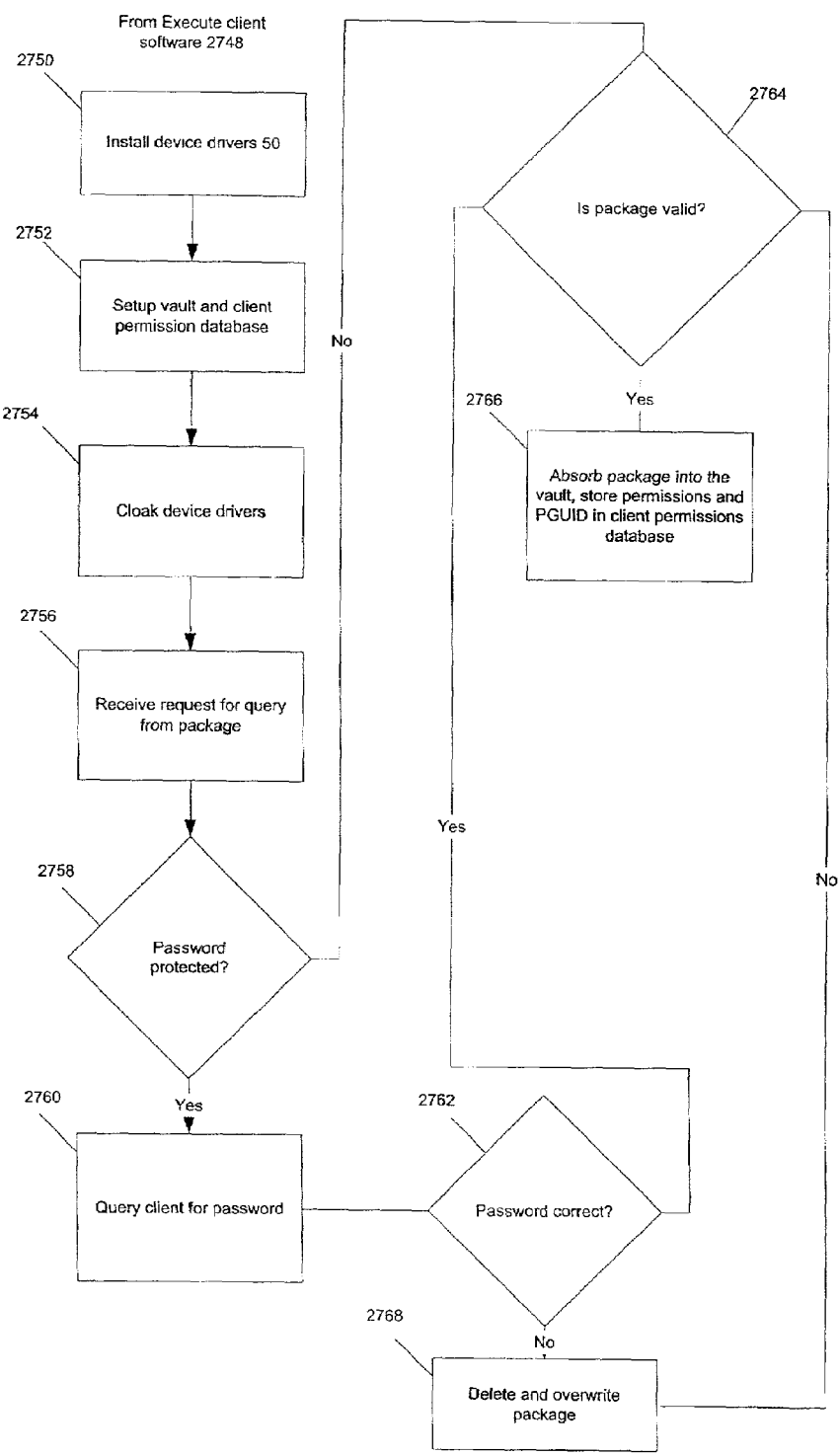

Referring now to FIGS. 28A-28B, there is shown a method for communicating a package of information after the computer executable file 2714 is generated, according to an embodiment of the invention. According to this method, the computer executable file 2714, which comprises code to carry out the method, is executed at the client computer system 2717, step 2730. In the embodiment in which the package is password protected, the client is prompted for the password. In step 2732, the client computer system 2717 determines whether the operating system is a compatible operating system. If the operating system is not compatible, the package is deleted and overwritten, step 2734. Compatible operating systems include but are not limited to Windows 95, 98, NT and 2000. Optionally, as shown in step 2736 of FIG. 28, the client computer system 2717 determines whether a second package of information is already loaded on the client computer system 2717, and if so, terminates the second package, step 2738. In step 2740, the system 2717 determines whether the client software 2724 is installed. If the client software is not installed, the client software 2724 is extracted from the package and installed on the client computer system 2717, step 2742. If the client software is installed, the system 2717 compares the version of the client software in the package to the version of the software installed, step 2744. If the version of the client software in the package is later than the version installed on the system 2417, the installed client software is upgraded by extracting the newer version from the package and installing it on the system 2717, step 2742. In another embodiment, the client software 2724 can be extracted from the package and installed without checking for an installed version.

In step 2748, the client software 2724 is executed creating a client permissions database and a vault on the client computer system. The vault is a virtual disk environment fully integrated with the operating system, yet sequestered from the operating system such that novel operating rules can be implemented and in which files of data can be examined, without risk to the system as a whole. In the embodiment shown in FIG. 28, the client software 2724 is comprised of one or more device drivers and one or more win32 modules which are installed on the client computer system 2717 upon execution of the software, step 2750. At least one of the device drivers or win32 modules creates the client permission database and the vault, step 2752. In a preferred embodiment, the win32 module the device driver is a modified win32 executable driver. The device drivers and win32 modules also carry out other functions of the software 2724, such as, for example, verifying whether the permissions structure has been altered. Once all the device drivers and win32 modules are loaded, they are cloaked, in part to prevent hacking into the vault, step 2754. After the installation of the client software, the operating system is modified such that the modified win32 executable driver is automatically initialized when the system 2717 is powered-up.

At least one of the device drivers communicates with the computer executable file 2714. In one embodiment, one of the win32 modules receives a request to query the package of information, step 2756. The win32 module then determines whether the package of information is password protected, step 2758, and if so, queries the client for a password, step 2760. If the package is not password protected, or it is password protected and the correct password is entered, step 2762, then the win32 module determines whether the package is valid, step 2764. If the package is valid, the file of data is absorbed into the vault, the one or more permissions are stored in the client permissions database, and the client permissions database is updated with the PGUID, step 2766.

Preferably, the validity of a package is determined by reading the PGUID from the package and checking the client permissions database for the PGUID. If the PGUID is in the client permissions database, the package was already received into the vault at another time and the package is invalid. If this occurs, a state in the computer executable file 2714 is set to indicate that the package has already been installed. Setting the state may be, for example, changing a data bit or setting a flag. If the PGUID is not in the client permissions database, the package is new to the vault, and is valid.

In the embodiment having a RGUID in the package of information, the validity of a package is determined by checking the client permissions database for the RGUID. If the RGUID is in the client permissions database, the package is intended for the client receiving the package, and the package is valid. If the RGUID is not in the client permissions database, the package is not intended for the client, and the computer executable file 2714 is deleted and overwritten, step 2868.

After the file of data is absorbed into the vault, the client software 2724, preferably via one of the device drivers, deletes and overwrites the computer executable file 2714.

In one embodiment, after the package is determined to be valid, but before absorbing the file of data into the vault, the device driver queries the client to create an association to the file of data in the vault. The association is preferably a file, most preferably a "tag" file, which is a substantially zero-byte length file. The client can name the file in a conventional manner. To the client, the file appears to represent the actual file of data in the vault, but it is not. If the client access the properties of the tag file, a dialog box displays the one or more permissions associated with the file of data.

Once a file name has been chosen and the client has deciphered and transferred the data to the vault, the data is available for access by opening the file of data. This can be done by any user-specified process. If the user double-clicks the file, the application associated with that file-type will automatically start and attempt to open the file via a calling process. The client software 2724 intercepts the calling process and performs a security check on the calling process. The security check verifies that the calling process has not created a data hole to "leak" data within the file of data. "Leaking data" means transferring data out of a system in which it is desired to have the data secured. For applications wherein data security is important, there is a need to limit data leakage.

If the calling process passes the security check, a dialog is displayed to the client to verify the client's request for the field of data. The permissions set, comprising one or more permissions, is displayed and any warnings are presented to the client for approval. Warnings include, for example, that all unsaved data will be lost once the field of data is accessed. Once the client agrees, as shown in FIG. 27, the environment of client computer system 2617 changes drastically. No process running of the system 2617 will be able to modify anything on the system 2617. These restrictions remain in place until the process accessing the file of data quits or is terminated by, for example, an expiration permission.

Another protection mechanism is directed to spoofing, as will be described herein.

Data security is a serious concern of computer users and owners of intellectual property. It is increasingly common to use measures such as encryption to secure data files, to protect data from loss or unauthorized activity.

It is known to store secured files, such as encrypted files, alongside unsecured files in the same file system. The encrypted file appears in the file directory like any other file, with relevant file attributes such as name and size. However, the data contained in the file is unintelligible to user applications until decrypted. Furthermore, the encryption process is likely to result in the size of the file becoming larger or smaller than the original unencrypted data. In such a case, a request to the file system to determine the file size would not reliably return the actual size of the original data. From the user's point of view, this type of data security lacks the desirable feature of transparency.

It is also known to store secured files in a special physical or virtual location apart from the ordinary file system. Such locations may include remote networked devices, encrypted or password-protected file systems, or other virtual secured file systems. This type of data security prevents the user from freely intermingling secured and unsecured files in a single file directory, even though the files may be logically related to one another. Although a user may set up, in the unsecured directory, symbolic links or shortcuts to secured files in another location, such an exercise for authorized persons adds an undesirable layer of obfuscation and effort to the process of conveniently accessing secured data.

It should also be understood that the terms "device driver" or "driver," as used herein, include any computer-implemented instructions for directly or indirectly accessing or controlling hardware devices, including, without limitation, device drivers, virtual device drivers (VxDs), instructions using NT kernel mode architecture, instructions using Win32 driver model (WDM), and other instructions, in any computer language, directed to any computer, computer architecture, network, or operating system.

The terms "information" and "data" as used herein are each intended to include the broadest definition of the other, and each include text, audio and video data. By way of further example, the term "information" can mean raw data, processed data, or a combination of raw and processed data.

Figure 29:
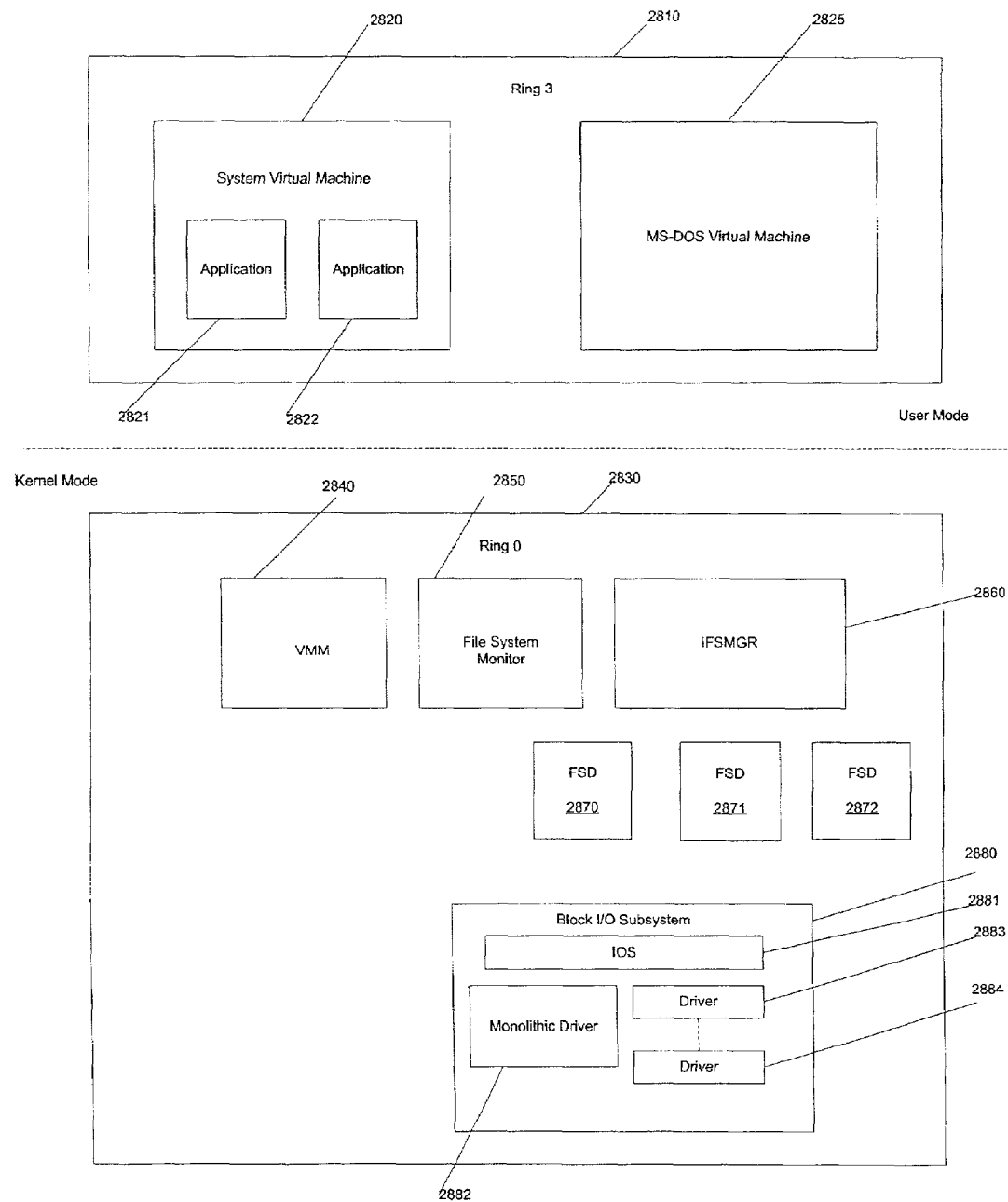
FIG. 29 is a diagram of the system architecture layout of the Windows 9x operating system.

Although the embodiment illustrated in the figures comprises a device driver described for illustrative purposes as a "file system monitor," the term "file system monitor" as used herein refers generally to a device driver of any kind using the file spoofing of the present invention. Device drivers within the scope of the invention may perform any sort of useful function that may be performed by a device driver, including, without limitation, general-purpose monitoring, permission monitoring, filtering, encryption, decryption, virus detection, data mirroring, I/O functions directed toward any device, and other functions, and are not limited to either monitoring or to functions related to file systems. Any device driver which accomplishes file spoofing appropriately falls within the scope of the present invention One embodiment of the present invention may be implemented on a Windows 9x operating system. Referring now to FIG. 29, components of the Windows 9x operating system are divided between user mode code 2800 and kernel mode code 2830, which provide different levels of system protection. For one embodiment, the user mode code 2800 includes a system virtual machine 2820 capable of running 16-bit and 32-bit software applications 2821-2822, and a plurality of MS-DOS virtual machines 2825. In this embodiment, the kernel mode code 2830 comprises low-level operating system services and virtual device drivers, such as a virtual machine manager 2840, a file system monitor 2850 of the present invention, and an installable file system manager 2860.

Beneath the installable file system manager 2860 are a plurality of file system drivers 2870-2872 for file systems such as FAT and NTFS. Beneath the file system drivers 2870-2872 is a block I/O subsystem 2880. The block I/O subsystem 2880 includes an I/O supervisor 2881 which manages requests as they pass through the file system hierarchy, a monolithic driver 2882 for port I/O, and a layered plurality of device drivers 2883-2884.

In this embodiment, the first device driver 2850 intercepts all I/O requests from user mode code 2810 and from applications 2821-2822 running in user mode 2810, before the I/O requests are sent to the installable file system manager 2860. The first device driver 2850 is able to monitor and, if desired, filter all file system activity occurring in the installable file system manager 2860, file system drivers 2870-2872, and block I/O subsystem 2880. By means of a call during system initialization to IFSMGR_InstallFileSystemApiHook, the first device driver 2850 is hooked into such calls when the operating system is started or restarted, at which time it is inserted into a functionally uppermost position on the stack of all file system requests. From the installable file system manager 2860 down through each driver in the layered plurality 2883-2884, an I/O request is passed from the highest level to the lowest level, and the devices can also view the result of a request as it passes back up the stack to the source of the I/O request. Each device driver on the stack may service an I/O request itself and not pass the I/O request to lower levels, or may, if desired, itself generate a new I/O request. Such device drivers may implement functions that require waiting, such as for an interrupt, or for a device to become available. During such waiting periods the device driver simply returns to its caller, allowing the calling application or device driver to perform other work in parallel with the I/O request. In the alternative, the calling application or device driver can simply wait ("block") until the I/O request is complete.

Figure 30:
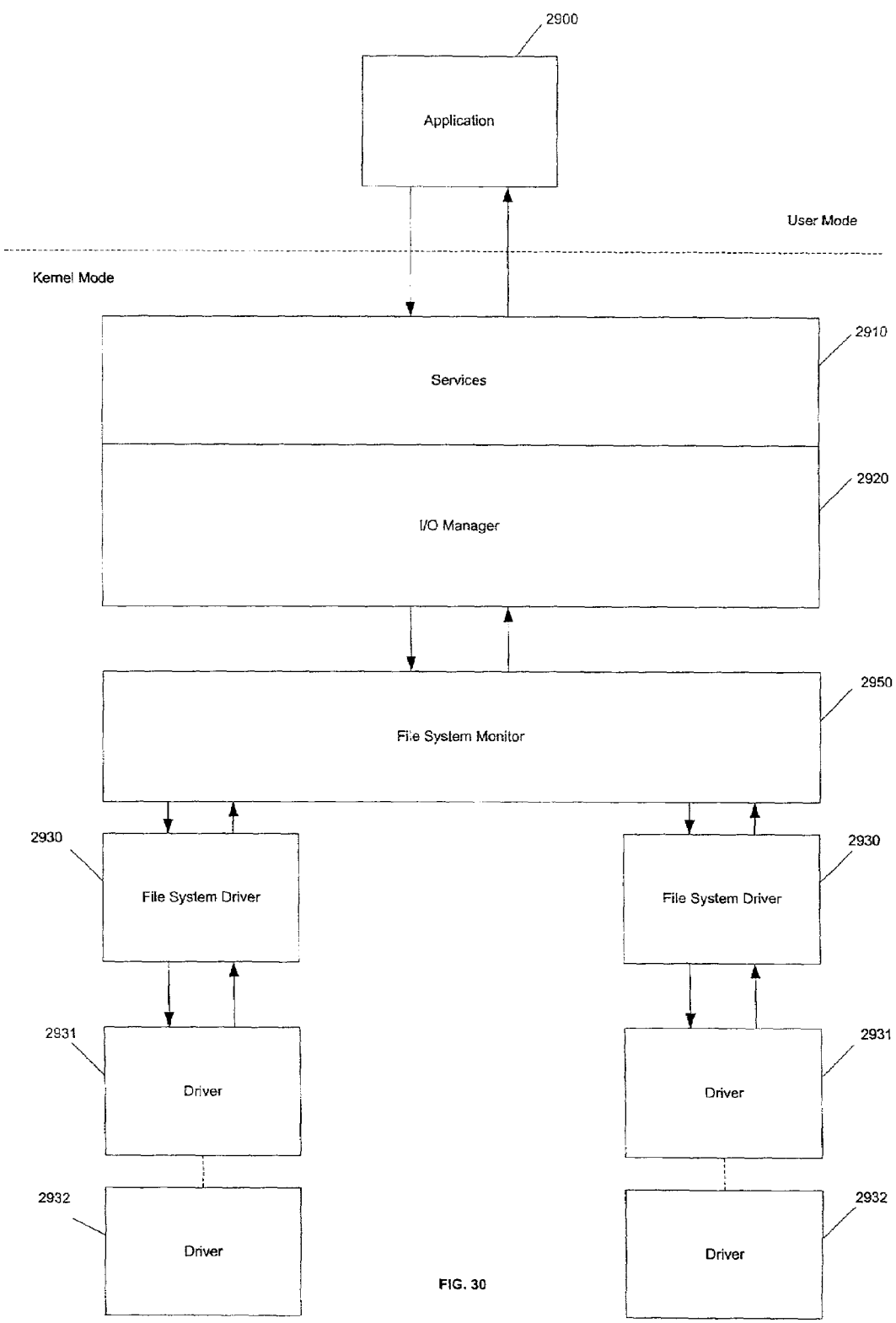
FIG. 30 is a diagram of the system architecture layout of the Windows NT operating system.

In another embodiment, illustrated with reference to FIG. 30, the present invention may be implemented on a Windows NT operating system. As is well known in the art, an application 2900 running in user mode under Windows NT may send an I/O request to operating system services 2910. I/O manager 2920 receives I/O requests, and coordinates the transfer of I/O request packets among various drivers. In the alternative, the various drivers may communicate directly with each other without using an I/O manager 2920 or other device to coordinate transfer of information among the various drivers.

The conventional input/output system of operating systems such as Windows NT comprises a plurality of device drivers 2930-2932 for processing I/O requests. Such device drivers are illustrated, for example, by file system drivers 2930, and a layered plurality of device drivers 2931-2932. The I/O manager 2920 typically delivers I/O request packets to the file system driver 2930 responsible for managing the target of the I/O request. However, as is known in the art, a file system monitor 2850 can attach to other device drivers 2930-2932 in an object-oriented fashion. Thereupon, the I/O manager 2920 routes I/O request packets intended for the target device driver 2930-2932 to the file system monitor 2950 that has attached to the target device driver 2930-2932. In this illustrative embodiment, the file system monitor 2950 attaches to each of the plurality of file system driver objects 2930.

Figure 31:
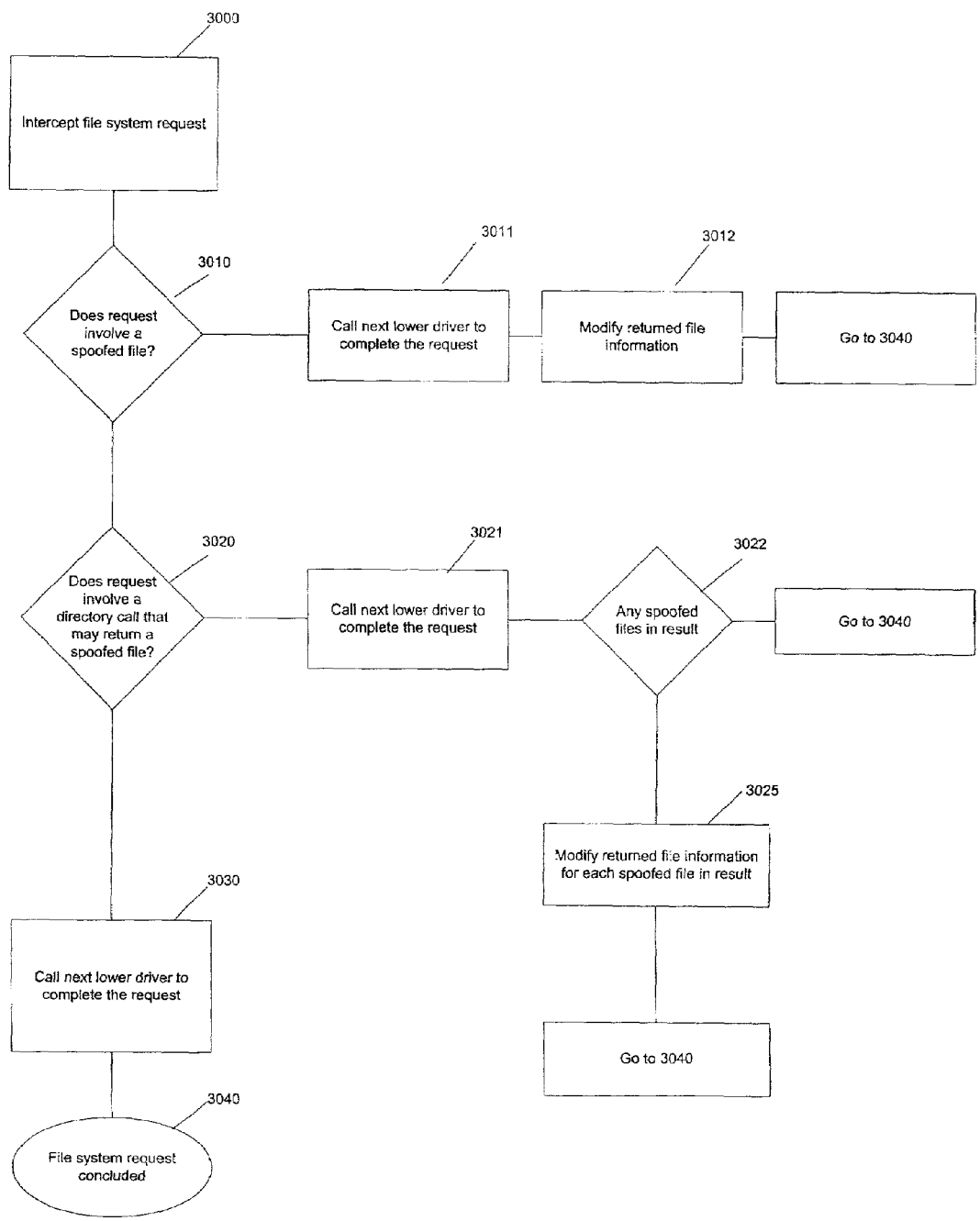
FIG. 31 is a flow chart illustrating an embodiment of the file spoofing method of the present invention.

FIG. 31 is a flow chart of one embodiment of a method for providing data security in a file system monitor 2950 using file spoofing.

As shown in FIG. 31, the file spoofing process of the present invention is initiated, in step 3000, each time a file system request is detected. In step 3010, the process determines whether or not the file system request involves a spoofed file. The determination of step 3010 is performed for any file system request that specifies a named file as the object of the request. Such file system requests include FILE_OPEN to open a file, FILE_DELETE to delete a file, and FILE_RENAME to rename a file. In the Windows NT operating systems, such file system requests also include FILE_QUERY_INFORMATION to query file information, and FILE_SET_INFORMATION to set file information. Each of these calls requires a file name to be specified. In the determination of step 3010, the specified file name is checked to determine whether the file is a spoofed file.

A spoofed file is a file which has been secured by placing the data in a secured file location where such data is not readily accessible to the user, such as, by way of illustration and not limitation, a secure or encrypted virtual file system, while maintaining a tag file in a user-accessible part of the file system to serve as a placeholder. To save disk space, the tag file may be zero bytes in length. In one embodiment, from the point of view of the user, the tag file transparently appears to contain the secured data, and the file spoofing process will enable any file system request to reach the secured file location.

To determine whether a file is a spoofed file, the process checks the file name against a database of all spoofed files, and if the file is a spoofed file, the process determines the secured file associated with the tag file. In an alternate embodiment, the process may rely on data stored in the tag file.

If the determination of step 3010 is that the file request involves a spoofed file, the process continues at step 3011 and completes the file system request. In one embodiment, the process calls the next lower driver to complete the file system request for the tag file. In an alternate embodiment, the process rewrites the file system request to refer to the secured file instead of the tag file, and calls the next lower driver to complete the file system request for the secured file.

The process continues at step 3012 by modifying the information returned by the file system request. File attributes, such as file size, are part of the information returned by file system requests. The process removes selected file attributes of the tag file from the return information, and substitutes the corresponding file attributes of the secured file. For example, where the file size of a tag file is zero, the user will instead see the file size of the corresponding secured file.

The process then concludes at step 3040.

Returning to step 3010, if the determination of step 3010 is that the file request does not involve a spoofed file, the process continues at step 3020 and determines whether the file system request involves a directory call that may return a spoofed file. Such file system requests in Windows 9× include FIND_OPEN or FIND_FIRST to find a first matching file, and FIND_NEXT to find a next matching file. In the Windows NT operating systems, such file system requests include DIRECTORY_CONTROL, which provides a buffer of matching file names.

If the determination of step 3020 is that the file system request involves a directory call that may return a spoofed file, the process continues at step 3021 and completes the file system request. In one embodiment, the process calls the next lower driver to complete the file system request for the tag file. In an alternate embodiment, the process rewrites the file system request to refer to the secured file instead of the tag file, and calls the next lower driver to complete the file system request for the secured file.

The process continues at step 3022 by determining whether the information returned by the file system request refers to any spoofed files. Requests to find a first matching file or a next matching file will each return a single file. A request to the Windows NT file system for directory control will return a buffer of file names, each of which must be considered. If no spoofed files are returned, the process concludes at step 3040.

If any spoofed files are returned, the process continues at step 3025 by modifying the information returned by the file system request. File attributes, such as file size, are part of the information returned by file system requests. The process removes selected file attributes of the tag file from the return information, and substitutes the corresponding file attributes of the secured file. For example, where the file size of a tag file is zero, the user will instead see the file size of the corresponding secured file. The process then concludes at step 3040.

Returning to step 3020, if the determination of step 3020 is that the file system request does not involve a directory call that may return a spoofed file, the process continues at step 3030 and completes the file system request, and concludes at step 3040.

It is understood, therefore, that the present invention is susceptible to many different variations and combinations and is not limited to the specific embodiment shown in this application. In addition, it should be understood that each of the segments disclosed in the various embodiments all do not need to be provided in a single embodiment, but rather can be provided in any desired combination of segments where desired. It will also be appreciated that a system in accordance with the invention can be constructed in whole or in part from special purpose hardware or from conventional general purpose computer hardware or any combination thereof, any portion of which may be controlled by a suitable program. Any program may in whole or in part comprise part of or be stored on a system in a conventional manner, or remain whole or in part be provided into the system over a network or other mechanism for transferring information in a conventional manner. Accordingly, it is understood that the above description of the present invention is susceptible to considerable modifications, changes and adaptation by those skilled in the art, and that such modifications, changes and adaptations are intended to be considered within the scope of the present invention, which is set forth by the appended claims. The invention having been described, it will be apparent to those skilled in the art that the same may be varied in many ways without departing from the spirit and scope of the invention. Any and all such modifications are intended to be included within the scope of the following claims.

We claim:

1. A method for maintaining data security comprising:
creating a package associated with a vault, the package comprising data bundled together with one or more permissions for regulating use of the data, the one or more permissions comprising one or more usage rule sets; and
providing a receiver for processing the package and storing the data in the vault, the vault being dedicated hard drive space whose existence and contents are invisible to a user, wherein the existence and contents of the hard drive space are invisible to the user by an assignment of false file names and locations as seen by the user.

2. A method according to claim 1, wherein the step of processing the package further comprises opening the package and verifying the receiver for processing of the package.

3. A method according to claim 2 further comprising searching for at least one driver for reading the package.

4. A method according to claim 1 further comprising:
a port request detection step of detecting a port request for use of a port sent by a process;
a process identification step of determining the identity of said requesting process;
a process check step of determining if said process should be permitted to access said port; and
a permit/deny step of allowing said port request to be fulfilled if said process should be permitted to access said port and denying said port request if said process should not be permitted to access said port.

5. The method of claim 4 wherein said process check step comprises: a secure process list check step of determining whether said process appears on a list of secure processes.

6. The method of claim 4 further comprising:
a tracking step of tracking said port request.

7. A method according to claim 1, wherein the step of creating a package comprises:
receiving a file of data for packaging; receiving a permissions database having one or more permissions associated with the file of data, the one or more permissions governing a client's use of the file;
generating a package global unique identifier; generating a package of data comprising the file, the one or more permissions and the global unique identifier; encrypting the package; and
generating a computer executable file comprising the encrypted package.

8. The method of claim 7 wherein the one or more permissions are selected from the group consisting an access count permission, an access time permission, an expiration date permission, an authorization date permission, a clipboard permission, a print permission, an unlimited access permission, an application permission, and a system-events permission.

9. The method of claim 8 further comprising the step of setting a password for access to the computer executable file.

10. The method of claim 9 wherein the package of data further comprises a recipient global unique identifier and further comprising the step of receiving the recipient global unique identifier after the step of generating a package global unique identifier.

11. The method of claim 10 wherein the package of data further comprises a client software.

12. A method according to claim 1 further comprising:
receiving a file of data for packaging;
receiving a package permissions database having one or more permissions associated with the file of data, the one or more permissions governing a client's use of the file;
generating a package global unique identifier;
generating a package of data comprising the file of data, the one or more permissions, the global unique identifier, and a client software;
encrypting the package;
generating a computer executable file comprising the encrypted package;
receiving the computer executable file at a client computer system having an operating system;
executing the computer executable file at the client computer system comprising the steps determining whether the operating system is a compatible operating system, and if so, executing a client software on the client computer system, the execution of the client software creating a client permissions database and a vault on the client computer system; and
determining whether the encrypted package is valid, and if so, recording the package global unique identifier in the client permissions database, extracting the file of data and the one or more permissions from the package of data, storing the file of data in the vault and storing the one or more permissions in the client permissions database, and if not, setting a state in the computer executable file to indicate that the package is installed.

13. The method of claim 12 further comprising the step of determining whether a second package is loaded on the computer system, and if so, terminating the second package, before the step of executing a client software on the client computer system.

14. The method of claim 13 wherein the step of determining whether the package is valid comprises the steps of searching the client permissions database for the package global unique identifier and, concluding that the package is valid if the package global unique identifier is not in the client permissions database, and concluding that the package is invalid if the package global unique identifier is not in the client permissions database.

15. The method of claim 14 wherein the package further comprises the client software having a version designation and, before the step of executing the client software, determining whether a second version of the client software is installed on the client computer system, and if not, extracting the client software from the package and installing the client software on the client computer system.

16. The method of claim 15 wherein if a second version of the client software is installed on the client computer system, determining whether the version designation of the client software installed on the client computer system is earlier than the second version, and if so, extracting the client software from the package and installing the client software on the client computer system.

17. The method of claim 15 wherein the client software comprises one or more device drivers and the client permissions database and the vault are generated by at least one of the one or more device driver.

18. The method of claim 12 wherein the client software comprises one or more device drivers and the client permissions database and the vault are generated by at least one of the one or more device driver.

19. The method of claim 12 wherein the package further comprises a receiver global unique identifier, and wherein the step of determining whether the encrypted package is valid comprises the steps of searching the client permissions database for a second receiver global unique identifier, and if not found, concluding that the package is invalid, and if found, comparing the receiver global unique identifier to the second receiver global unique identifier, determining whether they match, and if so, concluding that the package is valid, and if not, concluding that the package is invalid.

20. The method of claim 12 wherein the one or more permissions are selected from the group consisting an access count permission, an access time permission, an expiration date permission, an authorization date permission, a clipboard permission, a print permission, an unlimited access permission, an application permission, and a system-events permission.

21. The method of claim 12 wherein the computer executable file is password protected.

22. A method according to claim 1 further comprising detecting violation of said one or more permissions.

23. A method according to claim 22 wherein the step of providing a receiver further comprises providing internal security.

24. A method according to claim 23, wherein the internal security comprises creating a tag file corresponding to the data and mapping the tag file against the data in a virtual table, with the virtual table including an actual file name of the data and a corresponding tag name for the tag file, wherein the virtual table and the data are stored in the vault.

25. A method according to claim 23, wherein the step of providing internal security comprises identifying an anchor address corresponding to an original location for at least one of the vault, a driver used for reading of the package and a database storing the permissions, combining the addresses together to provide a key for regulating system operation and identifying when the key will not operate.

26. A method according to claim 23, wherein the step of creating a package further comprises verifying the operation of the receiver when the package is opened.

27. A method according to claim 23, wherein the internal security comprises the monitoring of a registry comprising:
  requesting a handle for a registry key to a calling process; requesting a registry key value for the handle; and obtaining security clearance to complete the requests.

28. The method of claim 27 further comprising after requesting a handle for a registry key to a calling process:
  determining a process ID and registry key; determining whether the process is secured by checking a secured process list;
  if the process is secured, determining whether the registry key is on a rejection list;
  if the registry key is on the rejection list, denying the process access to the registry key; and
  if the process is not on the secured list or if the registry key name is not on the rejection list, completing the request.

29. The method of claim 27 further comprising after requesting a registry key value for the handle:
  determining a process ID and registry key value;
  determining whether the process is secured by checking the secured process list;
  if the process is secured, determining whether the registry key is on the rejection list;
  if the registry key is on the rejection list, denying the process access to the registry key value;
  if the process is not on the secured list, completing the request;
  if the registry key is not on the rejection list and the process is on the secured process list,
  processing the value request and determining whether the value is on the rejection list;
  if the value is not on the rejection list allowing the request to be completed; and
  if the value is on the rejection list denying access to the registry key value.

30. The method of claim 27 further comprising after modifying and deleting handles and values:
  determining a process ID;
  determining whether the process is secured by checking whether the process is on the secured process list;
  if the process is not on the secured process list, completing the request; and
  if the process is on the secured process list, not allowing the request to be completed.

31. A method according to claim 23, wherein the step of providing internal security comprises a method for monitoring shared memory comprising:
  providing a call to reserve a memory page for a requesting process;
  filtering the reserve call according to whether the page can be shared;
  providing a call to commit the memory page for the requesting process or for a subsequent requesting process; and
  filtering the commit call according to whether the page can be shared and whether the process can be secured.

32. The method of claim 31 wherein filtering the reserve call comprises:
  determining whether the page can be shared based on request parameters;
  if the page cannot be shared, allowing the request to be completed; and
  if the page can be shared, tracking the reserve call by creating a record and entering the record into a shared memory list.

33. The method of claim 32 wherein the record includes a process ID, page number and share count.

34. The method of claim 31 wherein filtering the commit call comprises:
  determining, by accessing a shared memory list, if the page is shared by another process;
  if the page is shared, determining whether either of the sharing processes are secured by accessing a secured process list;
  if either process is secured, disallowing page sharing;
  if both processes are not secured, creating a new shared memory record, updating the share count for processes sharing the page and updating the shared memory list with information contained in the new record; and
  if the page is not shared, completing the commit request.

35. The method of claim 34 wherein the record includes a process ID, page number and share count.

36. The method of claim 31 further comprising:
  providing a call to free the memory page of all address spaces;
  determining whether the process is secured by checking a secured process list;
  if the process is secured, overwriting the page to delete secured data, and deleting all records in the shared memory list with a page number the same as the overwritten page; and
  if the process is not secured deleting all records from a shared memory list with a page number corresponding to the unsecured process page.

37. A method according to claim 23 wherein the step of providing internal security further comprises:
  a vault provision step of providing a vault system for segregating vault data from other system data; and
  a file system security driver provision step of providing a file system security driver which intercepts file system calls, and for each specific one of said intercepted file system calls, determines whether said specific one of said intercepted file system calls is from a process accessing said vault data, and, if said specific one of said intercepted file system calls is from a process accessing said vault data, permitting the file system call to create or modify data only within said vault system.

38. The method of claim 37, wherein said file system security driver provision step further comprises a file request handling step of, for each specific one of said intercepted file system calls which is a file read/write call, comprising the steps of:
- determining whether said read/write request is a request for data from among said vault data;
- if said read/write request is a request for data from among said vault data, allowing access if process making said request is allowed to access said vault data; and
- if said read/write request is a request for data not from among said vault data, allowing access if said process making said request is not allowed to access said vault data, and allowing access if said read/write request is a read request.

39. The method of claim 37, wherein said file system security driver provision step further comprises a file information request step, comprising the step of:
- determining whether said file information request is a request regarding data from among said vault data, and if not, passing said file information request to said operating system, and if so, discerning correct file size and returning said correct file size.

40. The method of claim 37, wherein said file system security driver provision step further comprises a file change request step, comprising the step of:
- determining whether said file change request is a request regarding data from among said vault data, and if so performing said file change request on said vault data, and if not, checking to see if the requesting process is a secured process, and if not, passing said file change request to said operating system, and if so, blocking the request.

41. The method of claim 37, wherein said file system security driver provision step further comprises:
- a file open handling step of, for each specific one of said intercepted file system calls which is a file open call, comprising the steps determining whether said file open call is a request for data from among said vault data; and
- if said file open call is a request for data from among said vault data, performing a check on process making said request to see if said process is already a secured process which has previously opened said data from among said vault data, and if so, allowing access to said vault data, and performing an access check on process making said request, and then processing the request by allowing access to said process which is not already a secured process if said access check is passed but not allowing access at all if said access check is not passed;
- if said file open call is not a request for data from among said vault data, performing a check on said process making said request to see if said process is already a secured process, and passing the request onto an operating system if said process making said request is not a secured process, and, if said process making said request is a secured process, determining if file referred to in said file open call exists, and if it does, opening said file for read only, and if it does not, creating said file in said vault data;
- a file read/write request handling step of, for each specific one of said intercepted file system calls which is a file read/write call, comprising the steps of:
  - determining whether said read/write request is a request for data from among said vault data;
  - if said request is a request for data from among said vault data, allowing access if process making said request is allowed to access said vault data; and
  - if said request is a request for data not from among said vault data, allowing access if said process making said request is not allowed to access said vault data, and allowing access if said read/write request is a read request;
- a file information request step, comprising the step of:
  - determining whether said file information request is a request regarding data from among said vault data, and if not, passing said file information request to said operating system, and if so, discerning correct file size and returning said correct file size; and
- a file change request step, comprising the steps determining whether said file change request is a request regarding data from among said vault data, and if so performing said file change request on said vault data, and if not, checking to see if the requesting process is a secured process, and if not, passing said file change request to said operating system, and if so, blocking the request.

42. The method of claim 37, where said file system security driver provision step further comprises a file open handling step of, for each specific one of said intercepted file system calls which is a file open call, comprising the steps of:
- determining whether said file open call is a request for data from among said vault data; and
- if said file open call is a request for data from among said vault data, performing a check on process making said request to see if said process is already a secured process which has previously opened said data from among said vault data, and if so, allowing access to said vault data, and performing an access check on process making said request, and then processing the request by allowing access to said process which is not already a secured process if said access check is passed but not allowing access at all if said access check is not passed;
- if said file open call is not a request for data from among said vault data, performing a check on said process making said request to see if said process is already a secured process, and passing the request onto an operating system if said process making said request is not a secured process, and, if said process making said request is a secured process, determining if file referred to in said file open call exists, and if it does, opening said file for read only, and if it does not, creating said file in said vault data.

43. The method of claim 42, wherein said processing the request by allowing access to said process which had not previously been granted access to said vault data comprises the step of:
- querying user to determine if said user would like to open said data from among said vault data, and opening said data from among said vault data only if said user would like to open said data.

44. The method of claim 43, wherein said processing the request by allowing access to said process which had not previously been granted access to said vault data comprises the step of:
- recording said allowed access and monitoring total accesses allowed.

45. The method of claim 42, wherein said processing the request by allowing access to said process which had not previously been granted access to said vault data comprises the step recording said process which had not previously been granted access to said vault data making said request in a list of processes allowed to access said vault data.

46. The method of claim 42, wherein said step of creating said file in said vault data comprises the step of:
sending said secured process a stand-in file handle; creating a corresponding vault file handle; and storing said stand-in file handle and said corresponding vault file handle.

47. The method of claim 42, wherein said step of opening said file for read only comprises the steps modifying any file request flags of said file open call which indicating modification of the file is permitted; and passing said modified file open call to said operating system.

48. A method according to claim 23, wherein the step of providing internal security further comprises monitoring a system clock of a computer to prevent unauthorized access to data comprising the steps of:
initializing a clock monitor comprising the steps of:
reading a first time value from the system clock; determining whether a permissions database having one or more clock-related permission field each field comprising one or more clock-related permissions, and a stored time value field comprising a stored time value, is initialized on the computer system;
if the permissions database is initialized, comparing the first time value to the stored time value and, if the first time value is later than the stored time value, storing the first time value in the stored time value field, if the first time value is earlier than the stored time value, disabling the one or more clock-related permissions, whereby disabling the clock-related permissions prevents access to the data; and
if the permissions database is not initialized, storing the first time value in the stored time value field.

49. The method of claim 48 wherein the clock-related permissions comprise date-related permissions.

50. The method of claim 48 wherein the step of determining whether the permissions database is initialized comprises the step of:
reading the stored time value from the stored time value field in the permissions database, and if the stored value is zero, concluding that the permissions database is not initialized, and if the stored time value field is other than zero, concluding that the permissions database is initialized.

51. The method of claim 48 further comprising the steps of:
tracking a true system time, which is the stored time value plus an internal elapsed time measured from initialization of the clock monitor;
after a predetermined tracking interval, reading a second time value from the system clock;
comparing the second time value with the true system time and generating a time deviation based on the comparison;
if the time deviation is not within an acceptable deviation, disabling the one or more clock-related permissions;
if the time deviation is within the acceptable deviation, enforcing the clock-related permissions; and
storing the true system time.

52. The method of claim 51, after the step of if the time deviation is not within an acceptable deviation, disabling one or more clock-related permissions, further comprising the steps of:
reading a third time value from the system clock;
comparing the third time value with the internal elapsed time;
generating a second time deviation based on the comparison; and
if the second time deviation is within the acceptable deviation, reenabling the clock-related permissions, storing the true system time in the stored time value field, and storing the third time value a last known good system time value field in the permissions database.

53. The method of claim 51 wherein the predetermined tracking interval is substantially in the range of zero seconds to sixty seconds.

54. The method of claim 51 wherein the accepted deviation is substantially in the range of zero seconds to three hours.

55. The method of claim 48 further comprising the steps of:
tracking a true system time, which is the stored time value plus a true system time measured from initialization of the clock monitor;
reading a second time value from the system clock;
comparing the second time value with the true system time and generating a time deviation based on the comparison; and
if the time deviation is within an acceptable deviation, storing the second time value in the stored time value field.

56. The method of claim 55 further comprising the step of powering down the computer.

57. The method of claim 55 wherein the accepted deviation is substantially in the range of zero seconds to three hours.

58. The method according to claim 23, wherein providing internal security comprises providing data security in a first device driver operably installed in a computer operating system having a layered plurality of device drivers for accessing data in a data storage device, the method for providing data security comprising the steps of:
detecting an I/O request to said first device driver;
determining whether said first device driver is functionally uppermost in the layered plurality of device drivers;
if said first device driver is functionally uppermost in the layered plurality of device drivers, performing the I/O request in said first device driver; and
if said first device driver is not functionally uppermost in the layered plurality of device drivers, denying the I/O request in said first device driver, and allowing the I/O request to be performed by a next lower-level device driver in the layered plurality of device drivers.

59. The method of claim 58 wherein said first device driver is a file system monitor.

60. The method of claim 58 wherein the data is stored in a secure virtual file system, and wherein the step of performing the I/O request further comprises the step of implementing data security measures.

61. The method of claim 58 wherein the data is stored in encrypted form, and wherein the step of performing the I/O request further comprises the step of decrypting the data.

62. The method of claim 58 wherein the step of performing the I/O request further comprises the step of checking the data for viruses.

63. The method of claim 58 wherein the step of determining whether said first device driver is functionally uppermost in the layered plurality of device drivers further comprises the steps of:
determining whether said first device driver has been previously called;
if said first device driver has not been previously called, detecting an initial calling module address, storing said initial calling module address, and concluding that said first device driver is functionally uppermost in the layered plurality of device drivers;

if said first device driver has been previously called, detecting a second calling module address, comparing said second calling module address to the initial calling module address, and concluding that said first device driver is functionally uppermost in the layered plurality of device drivers only if the initial calling module address matches the second calling module address.

64. The method of claim 58 wherein the step of denying the I/O request in the secure first device driver comprises the steps of:
setting a first device driver shutdown flag; and
initiating a re-hook process.

65. The method of claim 58 further comprising, after the step of detecting an I/O request to said first device driver, the steps of:
checking whether a first device driver shutdown flag is set; and
if said first device driver shutdown flag is set, omitting further steps in said first device driver, and allowing the I/O request to be performed by a next lower-level device driver in the layered plurality of device drivers.

66. The method of claim 65 wherein the step of initiating a re-hook process further comprises the steps of:
counting the number of times the re-hook process has been initiated;
checking whether the number of times has reached a predetermined maximum threshold;
if the number of times has reached a predetermined maximum threshold, initiating a programmable security response;
if the number of times has not reached a predetermined maximum threshold, initiating re-attachment of said first device driver functionally uppermost in the layered plurality of device drivers;
if said first device driver has been reattached functionally uppermost in the layered plurality of device drivers, unsetting said first device driver shutdown flag; and concluding the re-hook process.

67. The method of claim 66 wherein the programmable security response comprises the step of destroying the data.

68. The method of claim 66 wherein the data is stored in a secure virtual file system, and wherein the step of destroying the data further comprises the step of destroying the secure virtual file system.

69. The method of claim 66 wherein the programmable security response comprises the step of terminating open applications.

70. The method of claim 66 wherein the programmable security response comprises the step of destroying said first device driver on the data storage device.

71. The method of claim 66 wherein the programmable security response comprises the step of halting the operation of the computer.

72. The method of claim 66 wherein the programmable security response comprises the step of causing the computer to enter a state requiring reboot.

73. A method according to claim 23, wherein the step of providing internal security further comprises:
a port request detection step of detecting a port request for use of a port sent by a process;
an open port process identification step of, if said port request is an open port request, determining the identity of said requesting process;
an open port process check step of, if said port request is an open port request, determining if said process should be permitted to open said port;
an open port permit/deny step of, if said port request is an open port request, allowing said open port request to be fulfilled and tracking said open port request if said process should be permitted to open said port and denying said port request if said process should not be permitted to open said port;
a close port process completion step of, if said port request is a close port request, completing said port request; and
a close port logging step of logging the closing of said port.

74. The method according to claim 73 where said open port process check step comprises:
a secure process list check step of determining whether said process appears on a list of secure processes.

75. The method according to claim 73 where said tracking of said open port request comprises keeping a log of process ID and returned port handle for said open port request, and said close port logging step of tracking the closing of said port comprises removing from said log said record of process ID and returned port handle for that port close request.

76. The method according to claim 75 further comprising:
a security check step comprising the steps of checking whether a process has open ports, and denying security clearance for a process with open ports, and allowing security clearance for a process with no open ports.

77. The method according to claim 76 wherein said open port process check step of comprises determining if said process identity appears on a secured process list, and where said step of allowing security clearance for a process with no open ports comprises the step of placing said process on said secured process list.

78. A method according to claim 23, wherein the step of providing internal security further comprises:
a network request detection step of detecting a network request for use of a network sent by a process;
a process identification step of determining the identity of said requesting process;
a process check step of determining if said process should be permitted to access said network; and
a step of allowing said network request to be fulfilled if said process should be permitted to access said network and denying said network request if said process should not be permitted to access said network.

79. The method according to claim 78 wherein said process check step comprises: a secure process list check step of determining whether said process appears on a list of secure processes.

80. The method according to claim 79, wherein said network requests interface is the Transport Data Interface.

81. A method according to claim 23, wherein the step of providing internal security comprises:
detecting a file system request; completing said file system request;
receiving return information from said file system request;
determining whether said file system request is for a tag file associated with a secured file; and
if so, modifying said return information to reflect a file attribute of the secured file.

82. The method of claim 81 wherein said file attribute is file size.

83. The method of claim 81 wherein the step of determining further comprises the steps of:
determining whether said return information identifies a plurality of tag files associated with a plurality of secured files; and
if so, modifying said return information to reflect a file attribute of the plurality of secured files.

84. The method of claim 81 wherein the secured file is stored in encrypted form.

85. The method of claim 81 wherein the secured file is stored in a secure virtual file system.

86. The method of claim 81 wherein the secured file is stored on a remote networked device.

87. The method of claim 81 wherein the file system request is to open a file.

88. The method of claim 81 wherein the file system request is to delete a file.

89. The method of claim 81 wherein the file system request is to rename a file.

90. The method of claim 81 wherein the file system request is to query file information.

91. The method of claim 83 wherein the file system request is to set file information.

92. The method of claim 83 wherein the file system request is to find a first matching file.

93. The method of claim 83 wherein the file system request is to find a next matching file.

94. The method of claim 83 wherein the file system request is directory control.

95. A system for maintaining data security comprising:
   a receiver for processing a package associated with a vault, with the package comprising data;
   the vault located within the receiver for storing the data, the vault being dedicated hard drive space whose existence and contents are invisible to a user, wherein the existence and contents of the hard drive space are invisible to the user by an assignment of false file names and locations as seen by the user; and
   internal security for protecting the data stored in the vault, wherein the internal security comprises one or more selected from the group consisting of:
   a) a tag file corresponding to the data, and a virtual table mapping the tag file against the data by using an actual file name for the data and a tag name for the tag file, wherein the virtual table and data are stored in the vault;
   b) an anchor address corresponding to an original location for at least one of the vault, a driver used for reading of the package and a database storing one or more permissions associated with the package, combining the addresses together to provide a key for regulating system operation and identifying when the key will not operate;
   c) a registry monitoring system comprising:
      a handle for a registry key to a calling process;
      a registry key value for the handle;
      a process ID and registry key;
      security clearance to complete the requests;
      wherein the process is secured by checking a secured process list;
      if the process is secured, determining whether the registry key is on a rejection list;
      if the registry key is on the rejection list, denying the process access to the registry key; and
      if the process is not on the secured list or if the registry key name is not on the rejection list, completing the request;
   d) a shared memory system comprising:
      a call to reserve a memory page for a requesting process;
      the reserve call filtered according to whether the page can be shared;
      a call to commit the memory page for the requesting process or for a subsequent process;
      the commit call filtered according to whether the page can be shared and whether the process can be secured;
   e) a vault system for segregating vault data from other system data; and
      a file system security driver which intercepts file system calls, and for each specific one of said intercepted file system calls, determining whether said specific one of said intercepted file system calls is from a process accessing said vault data, and, if said specific one of said intercepted file system calls is from a process accessing said vault data, permitting the file system call to create or modify data only within said vault system;
   f) a system for monitoring a system clock of a computer to prevent unauthorized access to data comprising:
      reading a first time value from the system clock;
      determining whether a permissions database having one or more clock-related permission field each field comprising one or more clock-related permissions, and a stored time value field comprising:
         a stored time value, is initialized on the computer system;
         if the permissions database is initialized, comparing the first time value to the stored time value and, if the first time value is later than the stored time value, storing the first time value in the stored time value field, if the first time value is earlier than the stored time value, disabling the one or more clock-related permissions, whereby disabling the clock-related permissions prevents access to the data; and
         if the permissions database is not initialized, storing the first time value in the stored time value field;
   g) detecting an I/O request to said first device driver;
      determining whether said first device driver is functionally uppermost in the layered plurality of device drivers;
      if said first device driver is functionally uppermost in the layered plurality of device drivers, performing the I/O request in said first device driver; and
      if said first device driver is not functionally uppermost in the layered plurality of device drivers, denying the I/O request in said first device driver, and allowing the I/O request to be performed by a next lower-level device driver in the layered plurality of device drivers;
   h) a port request detection step of detecting a port request for use of a port sent by a process;
      a process identification step of determining the identity of said requesting process;
      a process check step of determining if said process should be permitted to access said port; and
      a step of allowing said port request to be fulfilled if said process should be permitted to access said port and denying said port request if said process should not be permitted to access said port;
   i) a port request detection step of detecting a port request for use of a port sent by a process;
      an open port process identification step of, if said port request is an open port request, determining the identity of said requesting process;
      an open port process check step of, if said port request is an open port request, determining if said process should be permitted to open said port;
      an open port step of, if said port request is an open port request, allowing said open port request to be fulfilled and tracking said open port request if said process should be permitted to open said port and denying said port request if said process should not be permitted to open said port;

a close port process completion step of, if said port request is a close port request, completing said port request; and a close port logging step of logging the closing of said port; and j) a network request detection step of detecting a network request for use of a network sent by a process;

a process identification step of determining the identity of said requesting process;

a process check step of determining if said process should be permitted to access said network; and a step of allowing said network request to be fulfilled if said process should be permitted to access said network and denying said network request if said process should not be permitted to access said network.

96. A system according to claim 95, further comprising a port blocking system, wherein said port blocking system operates to detect a port request for use of a port sent by a process; determine the identity of said requesting process; determine if said process should be permitted to access said port; and allow said port request to be fulfilled if said process should be permitted to access said port and deny said port request if said process should not be permitted to access said port.

97. A system according to claim 95, further comprising a network blocking system, wherein said network blocking system operates to determine the identity of said requesting process; determine if said process should be permitted to access said network; and allow said network request to be fulfilled if said process should be permitted to access said network and deny said network request if said process should not be permitted to access said network.

98. A system according to claim 95, wherein the system comprises a device driver for accessing data, the device driver operably installed in an operating system on an electronic computer, wherein said device driver:

detects a file system request; completes said file system request;

receives return information from said file system request;

determines whether said file system request is for a tag file associated with a secured file; and if so, modifies said return information to reflect a file attribute of the secured file.

99. The system of claim 98 wherein said file attribute is file size.

100. The system of claim 99 wherein said device driver further determines whether said return information identifies a plurality of tag files associated with a plurality of secured files; and if so, modifies said return information to reflect a file attribute of the plurality of secured files.

101. The system of claim 100 wherein said first device driver is a file system monitor.

102. The system of claim 100 wherein the secured file is stored in encrypted form.

103. The system of claim 100 wherein the secured file is stored in a secure virtual file system.

104. The system of claim 100 wherein the secured file is stored on a remote networked device.

105. The system of claim 100 wherein the file system request is to open a file.

106. The system of claim 100 wherein the file system request is to delete a file.

107. The system of claim 100 wherein the file system request is to rename a file.

108. The system of claim 100 wherein the file system request is to query file information.

109. The system of claim 100 wherein the file system request is to set file information.

110. The system of claim 109 wherein the file system request is to find a first matching file.

111. The system of claim 109 wherein the file system request is to find a next matching file.

112. The system of claim 109 wherein the file system request is directory control.

113. A system according to claim 95 comprising:

a machine readable medium having information packaging software that generates a computer executable file comprising a package of information, the package of information comprising:

a file of data; a permissions database having one or more permissions associated with the file of data;

an encryption software;

a network in communication with the machine readable medium;

a client computer system in communication with the network, the computer system adapted to receive the package of information and execute the computer executable file, the computer system having a client permissions database and a vault adapted to receive the package of information.

114. The system of claim 113 wherein the package of information further comprises a package global unique identifier, and the client computer system further comprises a module of computer code adapted to read the package global unique identifier, search the client permissions database for the package global unique identifier, and reject the package if the package global unique identifier is found in the client permissions database.

115. The system of claim 114 wherein the package of information further comprises a recipient global unique identifier, and the client computer system further comprises a module of computer code adapted to read the recipient global unique identifier, search the client permissions database for the recipient global unique identifier, and reject the package if the recipient global unique identifier is not found in the client permissions database.

116. The system of claim 115 wherein the one or more permissions are selected from the group consisting an access count permission, an access time permission, an expiration date permission, an authorization date permission, a clipboard permission, a print permission, an unlimited access permission, an application permission, and a system-events permission.

117. A computer program product for monitoring data security embodied in a computer-readable memory medium that when read out directs a system to perform at least one of:

creating a package associated with a vault, the package comprising data bundled together with one or more permissions for regulating use of the data, the one or more permissions comprising one or more usage rule sets; and opening the package and storing the data in the vault for restricted access of the data, the vault being dedicated hard drive space whose existence and contents are invisible to a user, wherein the existence and contents of the hard drive space are invisible to the user by an assignment of false file names and locations as seen by the user.

118. A computer program product according to claim 117 further directing the system to:

detect a port request for use of a port sent by a process;

determine the identity of said requesting process;

determine if said requesting process should be permitted to access said port; and allow the port request if said process should be permitted to access said port and deny the port request if said process should not be permitted to access said port.

119. A computer program product according to claim 117 further directing the system to detect violations of said one or more permissions.

120. A computer program product according to claim 119 further directing the system to:
protect secure data by implementing a network blocking system which operates to determine an identity of said requesting process;
determine if said process should be permitted to access said network; and
allow said network request to be fulfilled if said process should be permitted to access said network and deny said network request if said process should not be permitted to access said network.

121. A computer program product according to claim 119 further directing the system to create a tag file corresponding to the data in the vault and to map the tag file against the data in a virtual table, with the virtual table stored in the vault and including an actual file name of the data and a corresponding tag name for the tag file.

122. A computer program product according to claim 119, further directing the system to provide internal security including identifying an anchor address corresponding to an original location for at least one of the vault, a driver used for reading of the package and a database storing the permissions, combining the addresses together to provide a key for regulating system operation and identifying when the key will not operate.

123. A computer program product according to claim 119 further directing the system to monitor a registry via:
requesting a handle for a registry key to a calling process;
requesting a registry key value for the handle; and
obtaining security clearance to complete the requests.

124. A computer program product according to claim 119 further directing the system to monitor shared memory via:
providing a call to reserve a memory page for a requesting process;
filtering the reserve call according to whether the page can be shared;
providing a call to commit the memory page for the requesting process or for a subsequent requesting process; and
filtering the commit call according to whether the page can be shared and whether the process can be secured.

125. A computer program product according to claim 119 further directing the system to:
provide a vault system for segregating vault data from other system data; and
provide a file system security driver which intercepts file system calls, and for each specific one of said intercepted file system calls, determines whether said specific one of said intercepted file system calls is from a process accessing said vault data, and, if said specific one of said intercepted file system calls is from a process accessing said vault data, permitting the file system call to create or modify data only within said vault system.

126. A computer program product according to claim 119, further directing the system to monitor a system clock of a computer to prevent unauthorized access to data by:
initializing a clock monitor via:
reading a first time value from the system clock;
determining whether a permissions database having one or more clock-related permission fields, each field comprising one or more clock-related permissions, and having a stored time value field comprising a stored time value, is initialized on the system;
if the permissions database is initialized, comparing the first time value to the stored time value and, if the first time value is later than the stored time value, storing the first time value in the stored time value field, if the first time value is earlier than the stored time value, disabling the one or more clock-related permissions, whereby disabling the clock-related permissions prevents access to the data; and
if the permissions database is not initialized, storing the first time value in the stored time value field.

127. A computer program product according to claim 119 further directing the system to:
detect an I/O request to a first device driver;
determine whether said first device driver is functionally uppermost in a layered plurality of device drivers;
if said first device driver is functionally uppermost in the layered plurality of device drivers, perform the I/O request in said first device driver; and
if said first device driver is not functionally uppermost in the layered plurality of device drivers, deny the I/O request in said first device driver, and allow the I/O request to be performed by a next lower-level device driver in the layered plurality of device drivers.

128. A computer program product according to claim 119 further directing the system to:
detect a port request for use of a port sent by a process;
if said port request is an open port request, determine the identity of said requesting process;
if said port request is an open port request, determine if said process should be permitted to open said port;
if said port request is an open port request, allow the open port request and track said open port request if said process should be permitted to open said port and deny said port request if said process should not be permitted to open said port;
if said port request is a close port request, complete said port request; and
log the closing of said port.

129. A computer program product according to claim 119 further directing the system to:
detect a network request for use of a network sent by a process;
determine an identity of said requesting process;
determine if said process should be permitted to access said network; and
allow the network request if said process should be permitted to access said network and deny the network request if said process should not be permitted to access said network.

130. A computer program product according to claim 119 comprising a package of information comprising:
a file of data;
a permissions database having one or more permissions associated with the file of data, the one or more permissions governing a client's use of the file;
a package global unique identifier; and a receiver global unique identifier.

131. The computer program product of claim 130 wherein the one or more permissions are selected from the group consisting of an access count permission, an access time permission, an expiration date permission, an authorization date permission, a clipboard permission, a print permission, an unlimited access permission, an application permission, and a system-events permission.

132. The computer program product of claim 131 further comprising a client software.

133. A computer program product according to claim 119 further comprising a device driver program for directing the system to access data, said device driver program comprising instructions for directing the system to:
  detect a file system request;
  complete said file system request;
  receive return information from said file system request;
  determine whether said file system request is for a tag file associated with a secured file; and
  modify said return information to reflect a file attribute of the secured file, if said file system request is for a tag file associated with a secured file.

134. The computer program product of claim 133 wherein the device driver program further comprises instructions for directing the system to:
  determine whether said return information identifies a plurality of tag files associated with a plurality of secured files; and
  modify said return information to reflect a file attribute of the plurality of secured files, if said return information identifies a plurality of tag files associated with a plurality of secured files.

135. A computer program product according to claim 119 further directing the system to:
  protect secure data by implementing a port blocking system which operates to detect a port request for use of a port sent by a process;
  determine an identity of said requesting process;
  determine if said process should be permitted to access said port; and allow said port request to be fulfilled if said process should be permitted to access said port and deny said port request if said process should not be permitted to access said port.

136. A system for maintaining security during transmission of data between at least two computers comprising:
  a first computer having a system for creating a package associated with a vault, the package comprising data bundled together with one or more permissions selected from a list of available permissions for regulating use of the data, the one or more permissions comprising one or more usage rule sets; and
  a second computer having a system for receiving the package from the first computer, opening the package upon verification and storing the data in the vault, the vault being dedicated hard drive space whose existence and contents are invisible to a user, wherein the existence and contents of the hard drive space are invisible to the user by an assignment of false file names and locations as seen by the user.

137. A system according to claim 136 further comprising internal security, wherein the internal security comprises a plurality of:
  detecting violation of said one or more permissions;
  creating a tag file corresponding to the data and mapping the tag file against the data in a virtual table, with the virtual table including an actual file name of the data and a corresponding tag name for the tag file, wherein the virtual table and the data are stored in the vault;
  identifying an anchor address corresponding to an original location for at least one of the vault, a driver used for reading of the package and a database storing the permissions, combining the addresses together to provide a key for regulating system operation and identifying when the key will not operate; monitoring a registry comprising:
    requesting a handle for a registry key to a calling process;
    requesting a registry key value for the handle; and
    obtaining security clearance to complete the requests;
  monitoring shared memory comprising:
    providing a call to reserve a memory page for a requesting process;
    filtering the reserve call according to whether the page can be shared;
    providing a call to commit the memory page for the requesting process or for a subsequent requesting process; and
    filtering the commit call according to whether the page can be shared and whether the process can be secured;
  providing a vault system for segregating vault data from other system data;
  providing a file system security driver which intercepts file system calls, and for each specific one of said intercepted file system calls, determines whether said specific one of said intercepted file system calls is from a process accessing said vault data, and, if said specific one of said intercepted file system calls is from a process accessing said vault data, permitting the file system call to create or modify data only within said vault system; monitoring a system clock of a computer to prevent unauthorized access to data comprising:
  initializing a clock monitor comprising the steps reading a first time value from the system clock;
  determining whether a permissions database having one or more clock-related permission field each field comprising one or more clock-related permissions, and a stored time value field comprising a stored time value, is initialized on the computer system;
  if the permissions database is initialized, comparing the first time value to the stored time value and, if the first time value is later than the stored time value, storing the first time value in the stored time value field;
  if the first time value is earlier than the stored time value, disabling the one or more clock-related permissions, whereby disabling the clock-related permissions prevents access to the data;
  if the permissions database is not initialized, storing the first time value in the stored time value field;
  detecting an I/O request to said first device driver;
  determining whether said first device driver is functionally uppermost in the layered plurality of device drivers;
  if said first device driver is functionally uppermost in the layered plurality of device drivers, performing the I/O request in said first device driver; and
  if said first device driver is not functionally uppermost in the layered plurality of device drivers, denying the I/O request in said first device driver, and allowing the I/O request to be performed by a next lower-level device driver in the layered plurality of device drivers;
  detecting a port request for use of a port sent by a process;
  determining the identity of said requesting process;
  determining if said process should be permitted to access said port; allowing said port request to be fulfilled if said process should be permitted to access said port and denying said port request if said process should not be permitted to access said port;
  detecting a port request for use of a port sent by a process;

if said port request is an open port request, determining the identity of said requesting process;

if said port request is an open port request, determining if said process should be permitted to open said port;

if said port request is an open port request, allowing said open port request to be fulfilled and tracking said open port request if said process should be permitted to open said port and denying said port request if said process should not be permitted to open said port;

if said port request is a close port request, completing said port request;

logging the closing of said port;

detecting a network request for use of a network sent by a process;

determining the identity of said requesting process;

determining if said process should be permitted to access said network; and allowing said network request to be fulfilled if said process should be permitted to access said network and denying said network request if said process should not be permitted to access said network;

detecting a file system request; completing said file system request;

receiving return information from said file system request;

determining whether said file system request is for a tag file associated with a secured file; and if so, modifying said return information to reflect a file attribute of the secured file.

* * * * *